US012636854B2

(12) United States Patent
Condo et al.

(10) Patent No.: US 12,636,854 B2
(45) Date of Patent: May 26, 2026

(54) MULTILAYER FILM

(71) Applicant: 3M INNOVATIVE PROPERTIES COMPANY, St. Paul, MN (US)

(72) Inventors: Peter D. Condo, Lake Elmo, MN (US); David Scott Thompson, Bayport, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 792 days.

(21) Appl. No.: 17/795,654

(22) PCT Filed: Jan. 25, 2021

(86) PCT No.: PCT/IB2021/050547

§ 371 (c)(1),
(2) Date: Jul. 27, 2022

(87) PCT Pub. No.: WO2021/152446

PCT Pub. Date: Aug. 5, 2021

(65) Prior Publication Data

US 2023/0057101 A1 Feb. 23, 2023

Related U.S. Application Data

(60) Provisional application No. 62/967,440, filed on Jan. 29, 2020.

(51) Int. Cl.
*B32B 5/16* (2006.01)
*B32B 7/023* (2019.01)
(Continued)

(52) U.S. Cl.
CPC ................ *B32B 5/16* (2013.01); *B32B 7/023* (2019.01); *B32B 27/08* (2013.01); *B32B 27/308* (2013.01);
(Continued)

(58) Field of Classification Search
CPC .... C08J 7/042; C08J 2377/00; C08J 2379/08; C08J 2383/07; C08J 2383/08;
(Continued)

(56) References Cited

U.S. PATENT DOCUMENTS 5,415,942 A * 5/1995 Anderson ......... B32B 17/10018 428/447
5,604,019 A 2/1997 Bland et al.
(Continued)

FOREIGN PATENT DOCUMENTS

JP 2002241583 A 8/2002
JP 4022107 B2 12/2007
(Continued)

OTHER PUBLICATIONS

Cui, "Polymer Nanocomposites from Organoclays: Structure and Properties", 2011, Macromolecular Symposia, vol. 301, No. 1, pp. 9-15.

(Continued)

*Primary Examiner* — Tamra L. Dicus
(74) *Attorney, Agent, or Firm* — Clifton F. Richardson

(57) ABSTRACT

A multilayer film includes pluralities of first layers and polymeric second layers arranged along a thickness direction of the multilayer film. The first and second layers having different compositions. At least one layer of the multilayer film includes at least one polymer and metal oxide nanoparticles dispersed in the at least one polymer. The at least one polymer includes a first polymer including (meth)acrylic acid monomer units. The metal oxide nanoparticles are surface modified with a carboxylic acid silane surface modifying agent.

15 Claims, 7 Drawing Sheets

(51) Int. Cl.

| | |
|---|---|
| ***B32B 27/08*** | (2006.01) |
| ***B32B 27/30*** | (2006.01) |
| ***B32B 27/36*** | (2006.01) |

(52) U.S. Cl.

CPC .......... *B32B 27/36* (2013.01); *B32B 2250/42* (2013.01); *B32B 2264/1021* (2020.08); *B32B 2305/30* (2013.01); *B32B 2307/42* (2013.01); *B32B 2307/732* (2013.01); *B32B 2551/08* (2013.01)

(58) Field of Classification Search

CPC .. C08J 7/0427; C08J 2377/10; C08J 2433/14; C08J 2483/04; C08J 7/046; C09D 183/06; C09D 183/08; G02B 1/14; C08G 77/06; C08G 77/14; C08G 77/20; C08G 69/32; C08G 73/10; C08G 77/26; B32B 7/022; B32B 27/00

See application file for complete search history.

(56) References Cited

U.S. PATENT DOCUMENTS

| | | | | |
|---|---|---|---|---|
| 5,882,774 | A | 3/1999 | Jonza et al. | |
| 6,040,061 | A | 3/2000 | Bland et al. | |
| 6,083,617 | A * | 7/2000 | Aoyama .................. | C08K 3/34 428/404 |
| 6,179,948 | B1 | 1/2001 | Merrill et al. | |
| 6,368,699 | B1 | 4/2002 | Gilbert et al. | |
| 6,498,683 | B2 | 12/2002 | Condo et al. | |
| 6,783,349 | B2 | 8/2004 | Neavin et al. | |
| 6,818,163 | B1 | 11/2004 | Fibiger et al. | |
| 6,952,312 | B2 | 10/2005 | Weber et al. | |
| 6,967,778 | B1 | 11/2005 | Wheatley et al. | |
| 8,168,302 | B2 | 5/2012 | Hebrink et al. | |
| 8,592,013 | B2 | 11/2013 | Kainz et al. | |
| 8,987,369 | B2 | 3/2015 | Bekiarian et al. | |
| 9,162,406 | B2 | 10/2015 | Neavin et al. | |
| 9,776,381 | B2 | 10/2017 | Liu et al. | |
| 2011/0319521 | A1 | 12/2011 | Lundgard et al. | |
| 2016/0145806 | A1 | 5/2016 | Rhee | |
| 2019/0112714 | A1 | 4/2019 | Hirano et al. | |
| 2021/0163716 | A1 * | 6/2021 | Condo ..................... | G02B 1/14 |
| 2021/0292598 | A1 * | 9/2021 | Condo ..................... | G02B 1/04 |
| 2022/0195217 | A1 * | 6/2022 | Condo ..................... | C09D 7/70 |

FOREIGN PATENT DOCUMENTS

| | | | |
|---|---|---|---|
| JP | 2008105919 | A | 5/2008 |
| JP | 4596122 | B2 | 12/2010 |
| JP | 2014071419 | A | 4/2014 |
| JP | 2015021029 | A | 2/2015 |
| JP | 2016090878 | A | 5/2016 |
| JP | 2016103015 | A | 6/2016 |
| JP | 2017097381 | A | 6/2017 |
| JP | 2018024717 | A | 2/2018 |
| JP | 2019019232 | A | 2/2019 |
| JP | 2019183044 | A | 10/2019 |
| KR | 20190017895 | A | 2/2019 |
| WO | 20120138364 | A1 | 10/2012 |
| WO | 2014025762 | A1 | 2/2014 |
| WO | 2017015885 | A1 | 2/2017 |
| WO | 2019145860 | A1 | 8/2019 |
| WO | 2020026085 | A1 | 2/2020 |
| WO | 2020026113 | A1 | 2/2020 |

OTHER PUBLICATIONS

International Search Report for PCT Application No. PCT/IB2021/050547, mailed on Apr. 13, 2021, 4 pages.

Lertngim, "Preparation of Surlyn Films Reinforced with Cellulose Nanofibres and Feasibility of Applying the Transparent Composite Films for Organic Photovoltaic Encapsulation", Royal Society Open Science, 2017, vol. 4 Issue 10, 170792, pp. 1-9.

Shah, "Blown Films of Nanocomposites Prepared from Low Density Polyethylene and a Sodium Ionomer of Poly (Ethylene-Co-Methacrylic Acid)", 2006, Polymer, vol. 47, No. 17, pp. 6187-6201.

Shah, "Comparison of Nanocomposites Prepared from Sodium, Zinc, and Lithium Ionomers of Ethylene/Methacrylic Acid Copolymers", 2006, Macromolecules, vol. 39, No. 9, pp. 3327-3336.

Shah, "Morphology and Properties of Nanocomposites Formed from Ethylene/methacrylic Acid Copolymers and Organoclays", 2007, Polymer, vol. 48, No. 4, pp. 1047-1057.

Shah, "Nanocomposites from Poly(Ethylene-Co-methacrylic Acid) Ionomers: Effect of Surfactant Structure on Morphology and Properties", 2005, Polymer, vol. 46, No. 8, pp. 2646-2662.

Spencer, "Effects of Acid Neutralization on the Morphology and Properties of Organoclay Nanocomposites Formed From K+ and Na+ Poly(Ethylene-co-methacrylic Acid) lonomers", 2012, Polymer, vol. 53, No. 2, pp. 555-568.

Yoo, "Fracture Behavior of Nanocomposites Based on Poly(Ethylene-Co-Methacrylic Acid) lonomers", 2007, Polymer, vol. 48, No. 16, pp. 4867-4873.

* cited by examiner

MULTILAYER FILM

CROSS REFERENCE TO RELATED APPLICATIONS

This application is a national stage filing under 35 U.S.C. 371 of PCT/IB2021/050547, filed Jan. 25, 2021, which claims the benefit of Provisional Application No. 62/967,440, filed Jan. 29, 2020, the disclosures of which are incorporated by reference in their entirety herein.

BACKGROUND

A multilayer window film can be applied to window glass to increase the shatter resistance of the glass.

A multilayer optical film can reflect light by optical interference.

SUMMARY

The present disclosure generally relates to multilayer films. The multilayer films can be window films adapted to be bonded to glass to increase the shatter resistance and safety of the glass and/or the multilayer films can be multilayer optical films that reflect light of at least one polarization state in a least one wavelength range. The multilayer films typically include at least one nanocomposite layer and at least one other layer. The nanocomposite layer includes at least one polymer and metal oxide nanoparticles dispersed in the at least one polymer. The at least one polymer includes a first polymer including (meth)acrylic acid monomer units. The at least one polymer may further include a second polymer blended with the first polymer. In some embodiments, the nanocomposite layer is replaced with a layer of the at least one polymer (e.g., a suitable blend of the first and second polymers without the metal oxide nanoparticles). The metal oxide nanoparticles are surface modified with a carboxylic acid silane surface modifying agent. A nanocomposite layer of a multilayer film can be a transparent elastomeric nanocomposite layer. In some embodiments, the nanocomposites described herein can have high transmission and low haze up to very high nanoparticle loading. In some embodiments, the nanocomposites also exhibit improved mechanical properties such as improved impact resistance and/or tensile modulus.

In some aspects, a multilayer film including pluralities of first layers and polymeric second layers arranged along a thickness direction of the multilayer film is provided. The first and second layers have different compositions. Each first layer includes at least one polymer and metal oxide nanoparticles dispersed in the at least one polymer. The at least one polymer includes a first polymer including (meth) acrylic acid monomer units. The metal oxide nanoparticles are surface modified with a surface modifying agent including a carboxylic acid silane of Formula 1:

Formula 1

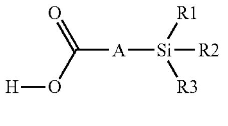

where:

R1 is a $C_1$ to $C_{10}$ alkoxy group;

R2 and R3 are independently selected from the group consisting of $C_1$ to $C_{10}$ alkyl and $C_1$ to $C_{10}$ alkoxy groups; and A is a linker group selected from the group consisting of $C_1$ to $C_{10}$ alkylene or arylene groups, $C_1$ to $C_{10}$ aralkylene groups, $C_2$ to $C_{16}$ heteroalkylene or heteroarylene groups, and $C_2$ to $C_{16}$ amide containing groups.

In some aspects, a multilayer film including a first layer and a plurality of alternating polymeric layers disposed on the first layer is provided. The first layer includes at least one polymer and metal oxide nanoparticles dispersed in the at least one polymer. The at least one polymer includes a first polymer including (meth)acrylic acid monomer units. The metal oxide nanoparticles are surface modified with a surface modifying agent including a carboxylic acid silane of Formula 1.

These and other aspects will be apparent from the following detailed description. In no event, however, should this brief summary be construed to limit the claimable subject matter.

DETAILED DESCRIPTION

Figure 1:
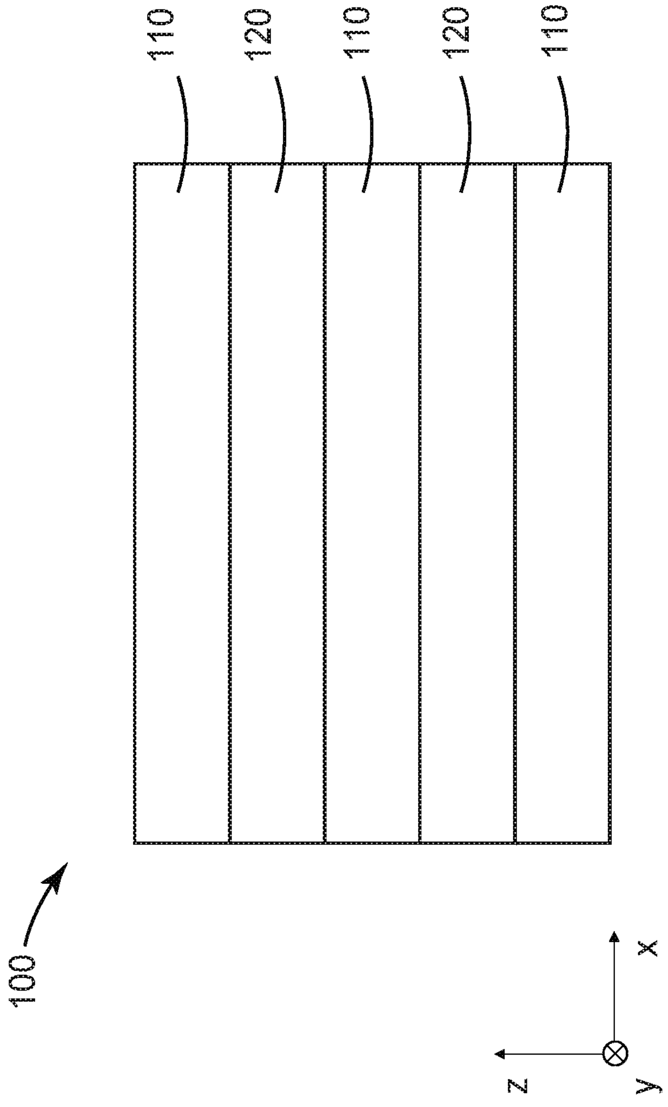
FIGS. 1-4 are schematic cross-sectional views of illustrative multilayer films according to some embodiments of the present disclosure.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Disclosed herein are multilayer films where at least one layer of the film includes a nanocomposite described herein. The multilayer films can be window films adapted to be bonded to glass to increase a shatter resistance of the glass and/or the multilayer films can be multilayer optical films that reflect light of at least one polarization state in a least one wavelength range.

The multilayer films, according to some embodiments, can be used, for example, in architectural applications or in vehicle applications. For example, an architectural window film can be or include a hurricane film bonded to window glass (e.g., to an inner glass surface, an outer glass surface, or between glass layers) for mechanical protection (e.g., shatter resistance) and can optionally also include an infrared solar rejection film. In vehicle (e.g., automobiles) applications, the multilayer film can be disposed between layers of windshield glass, for example, for one or more of mechanical properties, infrared radiation reflection, or reflection of a projected head-up display image as described further elsewhere herein. The multilayer film can also be used as reflectors in automobile or other applications. Other uses of the multilayer films, according to some embodiments, include equipment concealment reflective film which can be used to create a camouflage effect that reduces the visual impact of cellular antennas or other structures, for example.

The nanocomposites described herein typically include an ionic elastomer. The use of an ionomeric elastomer in an outer layer of a multilayer film can improve bonding of the film to a glass or other surface, for example. This allows the multilayer film to be bonded directly to a glass (e.g., window or windshield), for example.

The multilayer films are often formed by coextrusion of multiple layers followed, in some cases, by stretching the film to orient some of the layers. The nanocomposites described herein typically include an ionic elastomer and nanoparticles dispersed in the ionic elastomer. The nanoparticles can be used to alter the melt rheology (e.g., melt flow index) for coextrusion processing with the other layers of the multilayer film. Alternatively, or in addition, a blend of ionomers may be used where the polymers of the blend are selected (e.g., a two monomer unit copolymer and a terpolymer), at least in part, to alter the melt rheology for coextrusion processing with the other layers of the multilayer film.

An alternative to a nanocomposite layer is a layer formed from the at least one polymer described herein (e.g., a blend of two or more ionomers), according to some embodiments. The nanocomposite or ionomer blend provides improved tear resistance, according to some embodiments, in window film and/or in multilayer optical films.

Multilayer optical films are described in U.S. Pat. No. 5,882,774 (Jonza et al.); U.S. Pat. No. 6,179,948 (Merrill et al.); and U.S. Pat. No. 6,498,683 (Condo et al.), for example. A multilayer optical film can be adapted to provide a desired reflection over a predetermined wavelength range for a predetermined polarization state by suitably selecting layer materials for their refractive indices and suitably adjusting layer thickness, as is known in the art.

In some embodiments, a multilayer film described herein can be a visible light mirror film (e.g., having an average reflectance of at least 70% for substantially normally incident unpolarized light over a wavelength range extending at least from 450 nm to 650 nm), an infrared mirror film (e.g., having an average reflectance of at least 70% for substantially normally incident unpolarized light over a wavelength range extending at least from 800 nm to 900 nm or at least from 900 nm to 1000 nm), a reflective polarizer (e.g., having an average reflectance at least 20% or at least 30% higher for a first polarization state than for an orthogonal second polarization state for substantially normally incident light over a wavelength range extending at least from 450 nm to 650 nm), or a notch optical filter, for example. A notch optical filter can be a notch mirror (e.g., having an average reflectance of at least 70% for substantially normally incident unpolarized light over at least one wavelength range that is at least 5 nm wide and no more than about 100 nm wide), or a notch reflective polarizer (e.g., having an average reflectance at least 30% higher for a first polarization state than for an orthogonal second polarization state for substantially normally incident light over at least one wavelength range that is at least 5 nm wide and no more than about 100 nm wide), or a notch optical filter can have a notch transmission band for at least one polarization state, for example.

The multilayer films can be used in liquid crystal displays as a back reflector in a backlight, or as a reflective polarizer between the backlight and the liquid crystal display panel, for example. As another example, the multilayer film can be incorporated between glass layers in an automobile windshield to reflect a projected heads-up display image to a viewer. In such cases, the multilayer film is typically a reflective polarizer (e.g., with an average reflectance for substantially normally incident visible light in a block polarization state of about 30 to about 70 percent and an average reflectivity for substantially normally incident visible light in a pass polarization state of less than about 10 percent; such multilayer films are described in U.S. Pat. No. 6,952,312 (Weber et al.) and International Appl. Publ. No. WO 2019/145860 (Haag et al.), for example).

Multilayer window films and/or tear resistant films are described in U.S. Pat. No. 5,604,019 (Bland et al.); U.S. Pat. No. 6,040,061 (Bland et al.); and 9,776,381 (Liu et al.), for example. In some cases, such films include layers which are oriented and/or stiff and include layers that are substantially isotropic and/or ductile. The combination of layers with different mechanical properties can result in improved tear resistance of the film and/or improved shatter resistance of a stack including the film disposed on a glass.

In some embodiments, a multilayer film described herein is a multilayer window film adapted to increase a shatter resistance of a window glass. In some embodiments, a multilayer film of the present disclosure includes a multilayer window film for shatter resistance and a multilayer optical film (e.g., an infrared mirror film) to reduce solar heating. The window film and multilayer optical film can be integrally formed (e.g., coextruded together) or may be formed separately and joined with an adhesive layer, for example.

In some embodiments, at least one layer of the multilayer film (e.g., a skin layer or protective boundary layer of a multilayer optical film, and/or the low index layers of a multilayer optical film, and/or the ductile layers of a tear resistant film or a window film) includes a nanocomposite of the present disclosure, or includes an ionomer blend of the present disclosure.

Conventional ionic elastomers possess some of desired properties such as high visible transmission and low haze, chemical resistance, and flexibility. However, conventional ionic elastomeric polymers lack the mechanical features or tensile modulus, for example, desired for some applications.

Particulate fillers have been incorporated into polymers to improve mechanical properties. However, the vast majority of commercially available filled polymers are opaque and thus are unsuitable for use in optical articles. Additionally, rigid particulate fillers can adversely affect the flexibility properties of the polymers with which they are combined.

One technique for providing modified properties is to blend polymeric materials. This approach can be problematic as the preparation of blends to improve one property, such as flexibility, can adversely affect other properties, such as optical properties. This is especially true for optical properties, since the vast majority of polymer blends have at least some degree of immiscibility. A lack of miscibility can dramatically affect optical properties such as visible light transmission, haze and clarity. Even polymers that have the same or similar monomeric composition can be immiscible, if, for example, the polymers have differing degrees of branching. Thus, modification of a polymeric composition by blending the polymeric composition with another polymer, even a seemingly similar polymer, is not a trivial undertaking, especially when the blended composition has desired optical properties. It has been unexpectedly found that blends of different polymers including similar content of (meth)acrylic acid monomer units provide improved mechanical properties while maintaining desired optical properties (e.g., high optical transparency and/or low optical haze).

The terms "miscible" or "miscibility" refer to at least two polymers that are compatible with each other such that blends of the at least two polymers do not phase separate so as to form phase separated microdomains that are large enough to produce significant scattering of visible light (wavelengths of about 400 to about 700 nm).

The terms "immiscible" or "immiscibility" refer to at least two polymers that are incompatible with each other such that blends of the at least two polymers phase separate so as to form phase separated microdomains that are large enough to produce significant scattering of visible light (wavelengths of about 400 to about 700 nm) resulting in unacceptable haze.

The multilayer films of the present disclosure achieve the contradictory goals of flexibility, optical performance (e.g., desired transparency or reflectance) and improved mechanical properties, according to some preferred embodiments. The nanocomposite layers of the multilayer film typically include a polymeric matrix and a surface-modified nanoparticle filler. The polymeric matrix, which may also be referred to as a polymeric phase, includes at least one polymer (e.g., a polymer or a blend of polymers).

The nanocomposite layers of the present disclosure utilize metal oxide nanoparticles, which are particles with an average diameter that is in the nanometer range. These particles give improved mechanical properties to the nanocomposites, and because of their small size, according to some embodiments, the nanoparticles do not appreciably scatter visible light. The nanoparticles can be surface modified to achieve compatibility with the at least one polymer to avoid agglomeration or aggregation of the nanoparticles in the nanocomposite which would lead to inferior optical properties. The surface modifying agent is typically a carboxylic acid-functional silane. While not wishing to be bound by theory, it is believed that the acid-functional groups on the surface modifying agent improve the compatibility of the particles with the acid-functional (meth)acrylic polymer(s) of the at least one polymer. Some of the acid-functional groups on the surface-modified nanoparticles may also be neutralized like at least some of the acid-functional groups on the (meth) acrylic polymer(s). Acid-functional groups in the surface modifying agent are preferred for dispersibility of the nanoparticles in water. The acid groups of the acid silane, when added to the basic surface unmodified nanoparticle solution (for example, NALCO 2327), are at least partially neutralized which renders the silane soluble in the aqueous phase such that the surface of the silica can be modified readily. Furthermore, it has been found that in the coating and melt processing of the ionic elastomer nanocomposite materials that the acid silane on the surface of the particles can allow for interaction of the nanoparticles with the ionic groups of the elastic ionomer polymers leading to excellent compatibility of the nanoparticles in the host polymer matrix.

FIG. 1 is a schematic cross-sectional view of a multilayer film 100 including pluralities of first layers 110 and second layers 120 arranged along a thickness direction (z-direction) of the multilayer film 100. Each first and second layer 110 and 120 extend along orthogonal first and second directions (x- and y-directions). The thickness direction is orthogonal to the first and second directions. The first and second layers can be sequentially arranged in any suitable manner. In the illustrated embodiment, the first and second layers 110 and 120 alternate along the thickness direction. In other embodiments, the first and second layers may be arranged in a non-alternating sequence.

In some embodiments, each first layer 110 is a nanocomposite layer, as described further elsewhere herein. In some embodiments, each second layer 120 is a polymeric layer. Suitable materials for the second layers 120 include polyethylene naphthalate (PEN), polyethylene terephthalate (PET), or copolymers or blends thereof, for example. Other suitable materials for the second layers 120 include other polyesters, including for example, polycarbonate, polyacrylate, and naphthalate and terephthalate-containing polymers, such as, for example, polybutylene naphthalate (PBN), polypropylene naphthalate (PPN), polybutylene terephthalate (PBT), and polypropylene terephthalate (PPT), and blends or copolymers of any of the above each other or with non-polyester polymers. Other suitable materials are described in U.S. Pat. No. 6,498,683 (Condo et al.) and U.S. Pat. No. 8,168,302 (Hebrink et al.), for example. In some embodiments, each second layer 120 includes a polyester including terephthalate monomer units and ethylene glycol monomer units.

The multilayer film 100, or other multilayer films described herein, can be substantially planar as schematically illustrated in FIG. 1 or can be curved into a desired shape by thermoforming, for example.

Figure 2:
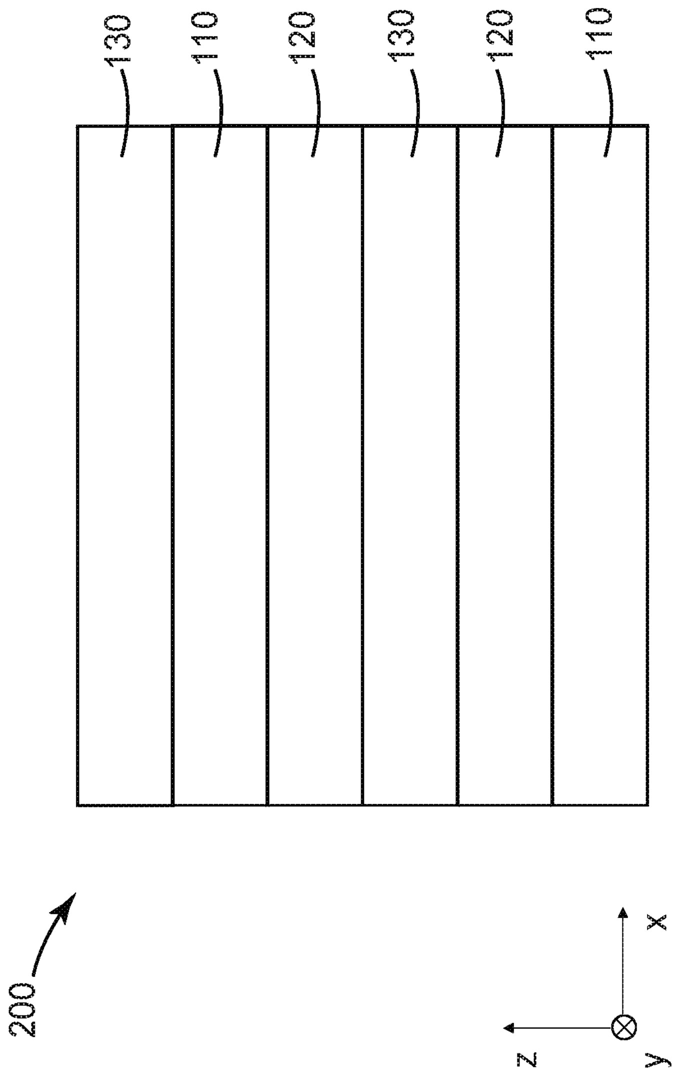

FIG. 2 is a schematic cross-sectional view of a multilayer film 200 including pluralities of first layers 110 and second layers 120 arranged along a thickness direction (z-direction) of the multilayer film 200. The multilayer film 200 can further include at least one third layer 130.

In some embodiments, the multilayer film 200 includes a plurality of polymeric third layers 130 arranged along the thickness direction with the first and second layers 110 and 120.

In some embodiments, the multilayer film 100 and/or 200 is a window film adapted to increase the shatter resistance of glass. In some embodiments, the multilayer film has a luminous transmittance for substantially normally incident unpolarized light of at least 70 percent, or at least 80 percent, or at least 90 percent. Luminous transmittance can be determined according to ASTM D1003-00 "Standard Test Method for Haze and Luminous Transmittance of Transparent Plastics". The term "luminous" indicates an average over wavelengths weighted according to the spectral luminous efficiency function V( ) established by the Commission Internationale de l'Éclairage (CIE, 1987).

The multilayer films 100 and 200 may have more layers than are schematically shown. In some embodiments, the multilayer film includes 30 or fewer layers. For example, in some embodiments, the first and second layers number from 4 to 30, or 5 to 25, or 5 to 20 in total. In some embodiments, a total of 5 layers are included and the thickness of the layers are in a range of 20 micrometers to 100 micrometers, or 35 micrometers to 175 micrometers, or 50 micrometers to 250 micrometers. In some embodiments, a total of 7 layers are included and the thickness of the layers are in a range of 20 micrometers to 140 micrometers, or 25 micrometers to 175 micrometers, or 30 micrometers to 210 micrometers. In some embodiments, a total of 13 layers are included and the thickness of the layers are in a range of 10 micrometers to 130 micrometers, or 15 micrometers to 195 micrometers, or 20 micrometers to 260 micrometers.

In some embodiments, the multilayer film is adapted to transmit and reflect light primarily by optical interference. For example, the layers 110 and 120 may be interference layers arranged into optical repeat units having an optical thickness selected to reflect a desired wavelength of light. As is known in the art, multilayer optical films including alternating layers can be used to provide desired reflection and transmission bands by suitable selection of layer materials for their refractive indices and suitable selection of layer thicknesses. Multilayer optical films and methods of making multilayer optical films are described in U.S. Pat. No. 5,882,774 (Jonza et al.); U.S. Pat. No. 6,179,948 (Merrill et al.); U.S. Pat. No. 6,783,349 (Neavin et al.); U.S. Pat. No. 6,967,778 (Wheatley et al.); and U.S. Pat. No. 9,162,406 (Neavin et al.), for example. A multilayer film, or the interference layers of a multilayer film, may be described as reflecting or transmitting light primarily by optical interference when the reflectance and transmittance of the film or interference layers can be reasonably described by optical interference or reasonably accurately modeled as resulting from optical interference.

Interference layers are typically less than about 500 nm thick. In some embodiments, each of the first and second layer 110 and 120 has an average thickness less than 500 nm, or less than 400 nm, or less than 300 nm. In some embodiments, each of the first and second layers 110 and 120 has an average thickness in a range of 10 nm to 200 nm or 10 nm to 100 nm.

The number of layers can be fewer than, high than, or substantially higher than schematically illustrated in FIGS. 1-2. For example, in some embodiments, the first and second layers number at least 50 in total. The total number of layers can be 50 to 1000, or 50 to 400, or 100 to 300, for example. A larger number of layers may be desired to provide a higher reflectivity and/or to reflect over a broader wavelength range, for example. In some embodiments, a multilayer optical film has a thickness in a range of 30 to 250 micrometers, or 50 to 200 micrometers, for example.

In some embodiments, the first layers are substantially optically isotropic. For example, $|nx-ny|$ and/or $|nz-\frac{1}{2}(nx+ny)|$ of the first layers can be less than 0.03 or less than 0.02 where nx, ny and nz are refractive indices along the x-, y- and z-directions, respectively. The refractive indices can be determined at 532 nm, for example. In some embodiments, the second layers are birefringent. For example, $|nx-ny|$ and/or $|nz-\frac{1}{2}(nx+ny)|$ of the second layers can be greater than 0.05 or greater than 0.1.

In embodiments, where a low index layer of a multilayer optical film includes a nanocomposite layer of the present description, the average nanoparticle size can preferably be in the range of 4-20 nm. The preferred nanoparticle size is such that the nanoparticles have an average diameter of less than half of the nanocomposite layer thickness after the film is oriented. In some embodiments, the nanoparticles may be present in the nanocomposite layer in a range of 2%-25%, 2%-20% or 2%-15% weight percent, for example.

In some embodiments, a multilayer film includes pluralities of first and second layers which provide a desired tear resistance and/or anti-shatter property, for example, and further includes further includes a plurality of alternating polymeric layers disposed on the pluralities of first and second layers. For example, the multilayer film of FIGS. 1-2 can provide a desired tear resistance and/or anti-shatter property and can optionally further include a plurality of alternating polymeric layers disposed on the illustrated layers to provide a desired reflectance in a desired wavelength range.

Figure 3:
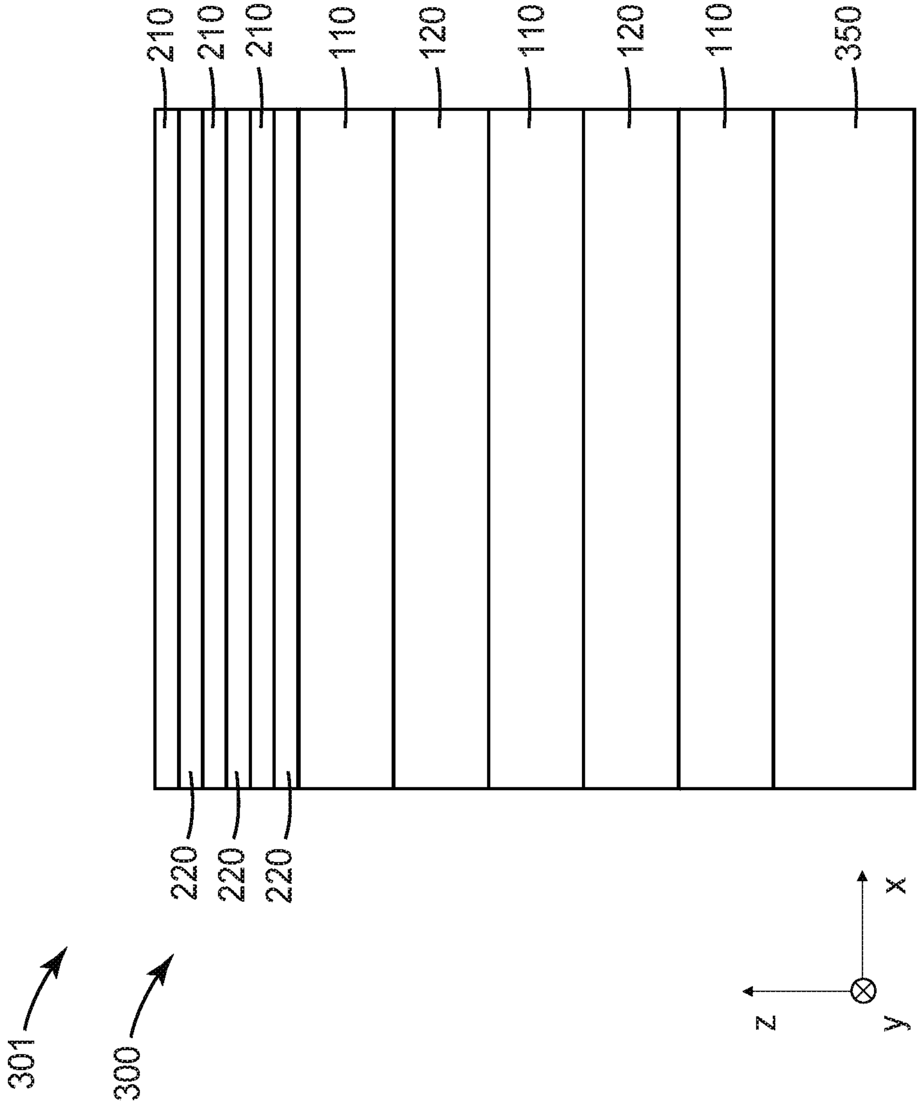

FIG. 3 is a schematic cross-sectional view of an optical stack 301 including a multilayer film 300 disposed on a glass layer 350. The multilayer film 300 includes pluralities of first and second layers 110 and 120 and includes a plurality of alternating polymeric layers 210 and 220 disposed on the pluralities of first and second layers 110 and 120. In some embodiments, the multilayer film 300 is a window film and the glass layer 350 is a window glass where the plurality of alternating polymeric layers 210 and 220 are adapted to reflect infrared light and where the pluralities of first and second layers 110 and 120 are adapted to provide a desired shatter resistance to the glass layer 350.

An additional glass layer can be disposed on the plurality of alternating polymeric layers 210 and 220 opposite the layers 110 and 120. In some embodiments, the multilayer film further includes a plurality of additional layers (e.g., corresponding to 110 and 120) is disposed between the additional glass layer and the alternating polymeric layers 210 and 220. The additional layers can be included for enhanced shatter resistance, for example. In some embodiments, the multilayer film 300 is disposed on a glass layer, or between glass layers, for both strength (e.g., anti-shatter) and reflective properties (e.g., for a heads-up display and/or for solar infrared rejection). In other embodiments, a multilayer film (e.g., multilayer film 100 or 200 where optically thick layers are used, for example) is disposed on a glass layer, or between glass layers, primarily for strength. In other embodiments, a multilayer film (e.g., multilayer film 400, described elsewhere, where interference layers are used, for example) is disposed between glass layers primarily for reflective properties (e.g., for a heads-up display and/or for solar infrared rejection). In embodiments where the multilayer film is disposed on a glass layer or disposed between glass layers, it is typically preferred that the layer(s) of the multilayer film immediately adjacent the glass layer(s) include a nanocomposite or ionomeric layer described herein.

In some embodiments, at least the first layers 110 include a nanocomposite of the present disclosure. In some embodiments, one of the layers 210 and 220 and/or optional skin or protective boundary layers (not shown in FIG. 3; see, e.g., FIG. 4) formed with the layers 210 and 220 includes a nanocomposite of the present disclosure.

Figure 4:
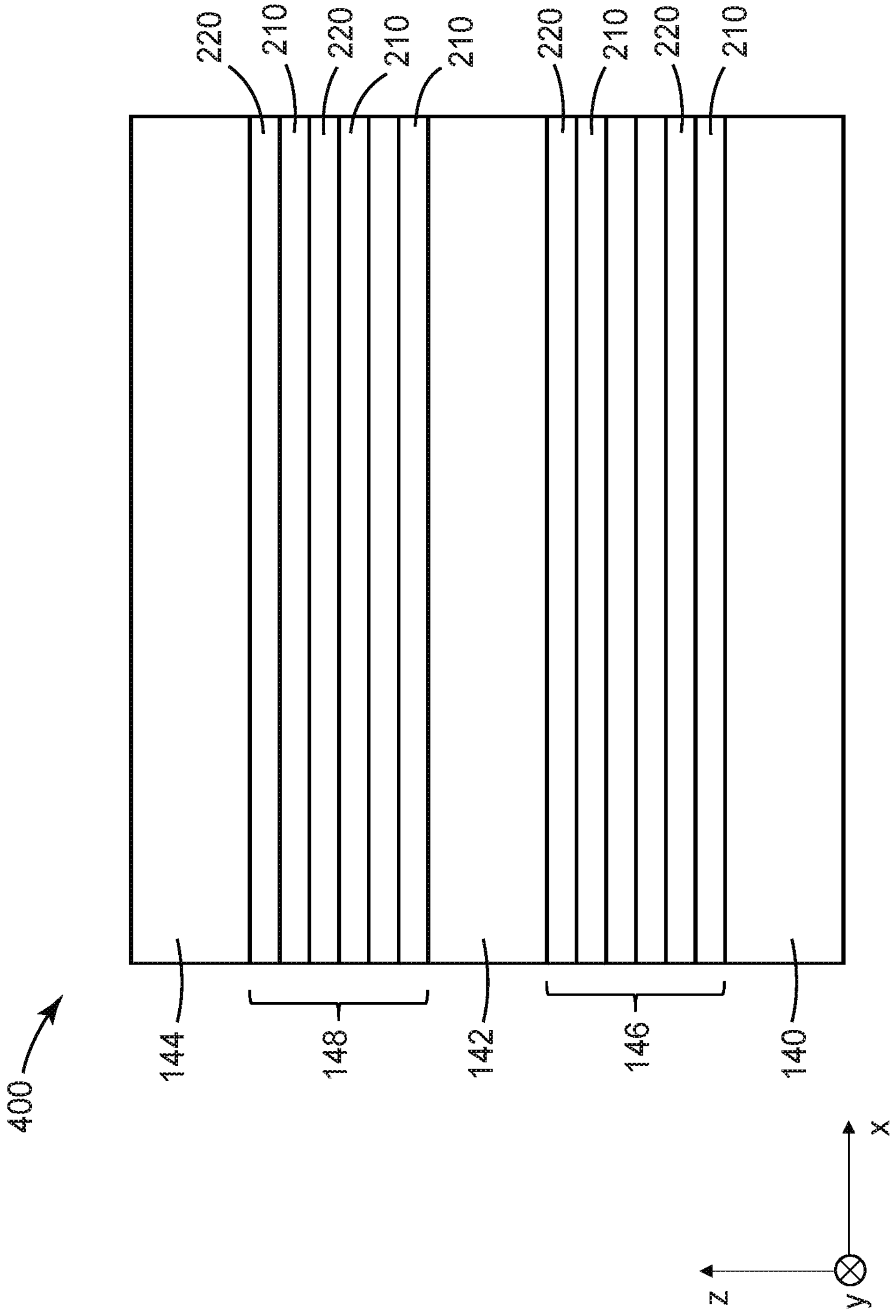

FIG. 4 is a schematic cross-sectional view of multilayer film 400 including a first layer (any one of layers 140, 142 and 141 can be regarded as the first layer in the illustrated embodiment) and a plurality of alternating polymeric layers 210 and 220 disposed on the first layer. In some embodiments, each of the alternating polymeric layers 210 and 220 has an average thickness of less than 500 nm or less than 400 nm. In some embodiments, each of the layers 140, 142 and 144 has a thickness greater than 1 micrometer or greater than 2 micrometers. The first layer includes a nanocomposite of the present disclosure. In some embodiments, two of the layers 140, 142 and 141 include a nanocomposite of the present disclosure. In some embodiments, each of the layers 140, 142 and 141 includes a nanocomposite of the present disclosure. The layers 140, 142, and 144 may be protective boundary layers or skin layers. As is known in the art, protective boundary layers can be added as outer layers of packets of interference layers to protect the interference layers during the processing of the film.

In some embodiments, the plurality of alternating polymeric layers 210 and 220 include sub-pluralities of the alternating layers separated by one or more optically thick (e.g., average thickness greater than about 1 micrometer) layers. In some embodiments, the multilayer film 400 includes a first layer 140 and a second layer 142, where at least a sub-plurality 146 of the plurality of alternating polymeric layers is disposed between the first and second layers 140 and 142. Alternatively, the layer 142 can be omitted (e.g., there can be a single packet of alternating layers), the layer 144 can be considered to be the second layer with the plurality of alternating polymeric layers disposed between the first and second layers.

The first layer includes a nanocomposite of the present disclosure. For example, the first layer can include at least one polymer and metal oxide nanoparticles dispersed in the at least one polymer, where the at least one polymer includes a first polymer including (meth)acrylic acid monomer units, and where the metal oxide nanoparticles are surface modified with a carboxylic acid silane surface modifying agent (e.g., according to Formula 1 described elsewhere). In some embodiments, the at least one polymer further includes a second polymer different from the first polymer blended with the first polymer, where the second polymer includes (meth)acrylic acid monomer units. In some embodiments, the second layer includes at least one polymer, where the at least one polymer of the second layer includes a first polymer including (meth)acrylic acid monomer units. In some embodiments, the second layer further includes metal oxide nanoparticles dispersed in the at least one polymer of the second layer, where the metal oxide nanoparticles of the second layer are surface modified with a carboxylic acid silane surface modifying agent (e.g., according to Formula 1 described elsewhere). In some embodiments, the at least one polymer of the second layer further includes a second polymer different from the first polymer of the second layer blended with the first polymer of the second layer, where the second polymer of the second layer includes (meth)acrylic acid monomer units.

In some embodiments, the alternating polymeric layers include alternating first (210) and second (220) interference layers. Each first interference layer includes at least one polymer (e.g., one polymer or a blend of first and second polymers), where the at least one polymer of the first interference layer includes a polymer including (meth) acrylic acid monomer units. In some such embodiments or in other embodiments, each second interference layer includes an oriented polyester. For example, each second interference layer can include a polyester including terephthalate monomer units and ethylene glycol monomer units. In some embodiment the first layers 210 are less birefringent than the second layers 220. In some embodiments, the first layers 210 are substantially optically isotropic. In some embodiments, the first layers 210 are lower index layers and the second layers 220 are higher index layers.

In some embodiments, a nanocomposite described herein is used in a layer where it is desired that the layer have a low refractive index and/or remain unoriented. For example, the nanocomposite can be used as the lower index layer when alternating higher and lower index layers are used in a multilayer optical film. In some embodiments, the nanoparticles (e.g., silica nanoparticles) included in the nanocomposite have a lower index than the polymer or polymer blend of the nanocomposite. Thus, in some embodiments, the nanoparticles lower the effective refractive index of the nanocomposite layer. Alternatively, or in addition, the nanoparticles can inhibit orientation of the layer that would increase the refractive index and that could otherwise occur when the film is stretched to orient the higher index layers.

Figure 5:
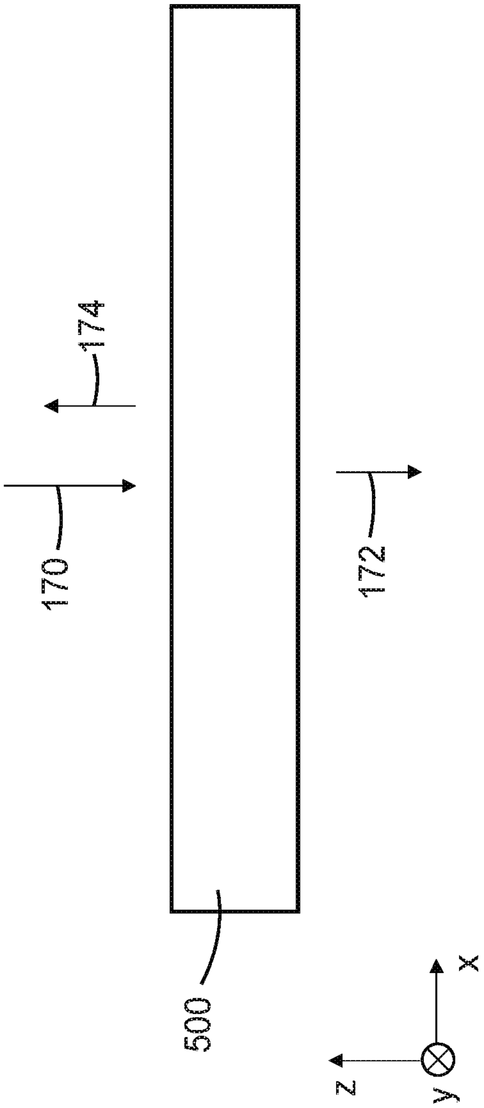
FIG. 5 is a schematic illustration of light substantially normally incident on a film.

FIG. 5 is a schematic cross-sectional view of a multilayer film 500 of the present disclosure schematically illustrating substantially normally incident (e.g., within 20 degrees, 10 degrees, or 5 degrees of being normally incident) light 170. A portion of the light 170 is reflected as light 174 and a portion of the light 170 is transmitted as light 172.

In some embodiments, a multilayer film has an average optical transmittance for substantially normally incident unpolarized light of at least 70 percent over a wavelength range extending at least from 450 nm to 650 nm. In some such embodiments, or in other embodiments, the multilayer film has an average optical transmittance for substantially normally incident unpolarized light of no more than 50 percent over a wavelength range extending at least from 900 nm to 1000 nm. In some embodiments, the average optical transmittance for substantially normally incident unpolarized light is at least 70 percent over a wavelength range extending at least from 450 nm to 650 nm, and the average optical transmittance for substantially normally incident unpolarized light is no more than 30 percent over the wavelength range extending at least from 900 nm to 1000 nm.

Figure 6:
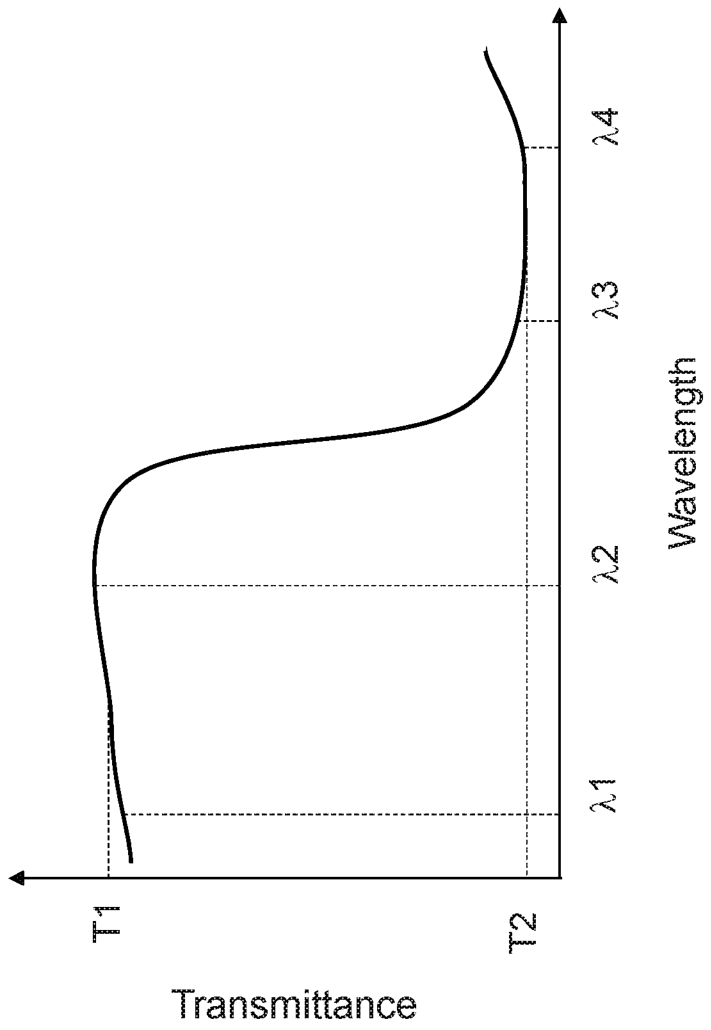
FIG. 6 is a schematic plot of transmittance versus wavelength of a multilayer film according to some embodiments.

FIG. 6 is a schematic plot of transmittance versus wavelength of a multilayer film according to some embodiments. The illustrated transmittance can be for substantially normally incident light. The multilayer film has an average transmittance of T1 over a wavelength range of $\lambda$1 to $\lambda$2, and an average transmittance of T2 over a wavelength range of $\lambda$3 to $\lambda$4. The wavelengths are such that $\lambda 1<\lambda 2<\lambda 3<\lambda 4$. In some embodiments, T1 is at least 60 percent, or at least 70 percent, or at least 80 percent, or at least 90 percent, when $\lambda 1 \leq 450$ nm and $\lambda 2 \leq 650$ nm. In some such embodiments, or in other embodiments, T2 is no more than 50 percent, or no more than 40 percent, or no more than 30 percent, or no more than 20 percent, or no more than 10 percent, when $\lambda 3 \leq 900$ nm and $\lambda 4 \leq 1000$ nm.

In other embodiments, a multilayer film has a transmittance substantially different than schematically illustrated in FIG. 6. For example, a multilayer film can have one or more reflection bands between $\lambda$1 and $\lambda$2 for one polarization state or for each of two orthogonal polarization states.

Compositions suitable for use in the nanocomposite layer are nanocomposites that include at least one (meth)acrylic polymer (e.g., one (meth)acrylic polymer or two or more miscible (meth)acrylic polymers) and surface-modified metal oxide nanoparticles, where the surface-modified metal oxide nanoparticles are surface modified with an acid-functional silane surface modifying agent, and where the (meth)acrylic polymer(s) are at least partially neutralized. The nanocomposites may be melt processable into films that are optically transparent. By melt processable it is meant that the nanocomposites are able to be melt processed, that is to say that the nanocomposites can be heated and made to flow without causing degradation. Melt processable does not mean that the nanocomposite has been melt processed and in no way indicates a processing step. The nanocomposite layer may also be made by coating processes from aqueous dispersions on to a substrate such that the layer can be removed from the substrate.

Figure 7:
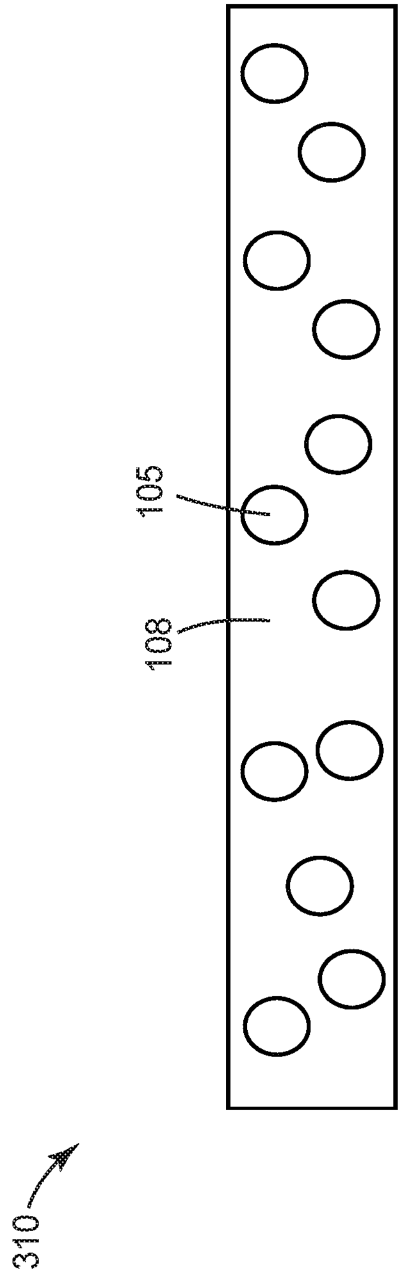
FIG. 7 is a schematic cross-sectional view of an illustrative nanocomposite layer.

FIG. 7 is a schematic cross-sectional view of a nanocomposite layer 310 including at least one polymer 108 (e.g., a polymer matrix) and including metal oxide nanoparticles 105 dispersed in the at least one polymer.

A wide range of (meth)acrylic polymers are suitable for use in the nanocomposites of this disclosure. The (meth) acrylic polymer(s) include (meth)acrylic acid monomers units (i.e., acrylic acid monomer units, methacrylic acid monomer units, or both acrylic acid monomer units and methacrylic acid monomer units). In some embodiments, the (meth)acrylic polymers are homopolymers of acrylic acid or methacrylic acid. In other embodiments, the (meth)acrylic polymers are copolymers of at least one (meth)acrylic monomer unit that is acid-functional and at least one monomer that is a (meth)acrylate that is not acid-functional. Additionally, the (meth)acrylic polymers can contain other non-(meth)acrylate monomers that are co-polymerizable with the (meth)acrylic and (meth)acrylate monomers. The copolymers can be formed by the polymerization or copolymerization using free radical polymerization techniques. In some embodiments, the at least one (meth)acrylic polymer includes a copolymer containing (meth)acrylic acid and at least one co-monomer. A wide range of co-monomers are suitable. Suitable co-monomers include ethylene, propylene, alkyl(meth)acrylates, aryl(meth)acrylates, alkaryl(meth) acrylates, acrylonitrile, and carbon monoxide.

In some embodiments, a nanocomposite includes at least one polymer and metal oxide nanoparticles dispersed in the at least one polymer of the nanocomposite. Each polymer can have a number average molecular weight of at least 10000 grams/mole. The at least one polymer of the nanocomposite includes a first polymer including (meth)acrylic acid monomer units (monomer units selected from the group consisting of methacrylic acid monomer units and acrylic acid monomer units). The metal oxide nanoparticles are surface modified with a surface modifying agent including a carboxylic acid silane of Formula 1 described elsewhere herein.

In some embodiments, the first polymer has a number average molecular weight of at least 12000 grams/mole or at least 15000 grams/mole. In some embodiments, each polymer of the at least one polymer has a number average molecular weight of at least 12000 grams/mole or at least 15000 grams/mole. For example, the at least one polymer can be a blend of first and second polymers, and each of the first and second polymers can have a number average molecular weight of at least 12000 grams/mole or at least 15000 grams/mole. The number average molecular mass of a polymer can be determined by gel permeation chromatography (GPC). Polymer characterization by GPC systems is well known. An example of such a system is the Viscotek TDAmax (Malvern Panalytical, a part of Spectris plc). This system is equipped with multiple detectors for determination of molecular weight. Absolute molecular weight of small polymers can be measured using a right angle light scattering detector, direct output of absolute molecular weight of polymers without extrapolation can be obtained using low angle light scattering. Additional detectors can be used to assess information concerning polymer structure, for example branching using intrinsic viscosity detector and information concerning copolymer composition can be investigated using a photodiode array UV detector when UV absorbing components are present. Further details of this instrument can be found from the supplier. In some embodiments, the first polymer, or each polymer of the at least one polymer, has a number average molecular weight less than 100,000 grams/mole.

In some embodiments, the first polymer further includes at least one monomer unit (e.g., a second type of monomer unit when the (meth)acrylic acid monomer units are a first type of monomer unit) selected from the group consisting of ethylene, propylene, alkyl(meth)acrylates, aryl(meth)acrylates, alkaryl(meth)acrylates, acrylonitrile, and carbon monoxide. In some embodiments, the first polymer includes at least one monomer unit (e.g., a second type of monomer unit) selected from the group consisting of ethylene and propylene. In some such embodiments, the first polymer further includes at least one monomer unit (e.g., a third type of monomer unit) selected from the group consisting of n-butyl acrylate, isobutyl acrylate, isopropyl acrylate, n-propyl acrylate, ethyl acrylate, methyl acrylate, 2-ethylhexyl acrylate, iso-octyl acrylate and methyl methacrylate. The first polymer can be a terpolymer, for example. In some embodiments, the first polymer includes (meth)acrylic acid monomer units; ethylene monomer units, propylene monomer units, or a combination of ethylene and propylene monomer units; and at least one alkyl (meth)acrylate monomer unit.

The at least one polymer can be a blend of two or more (meth)acrylic polymers. A wide range of blends of (meth) acrylic polymers are suitable. Examples of suitable blends include blends of acrylic acid or methacrylic acid homopolymers with copolymers of acrylic acid or methacrylic acid and at least one additional monomer (e.g., selected from the group consisting of ethylene, propylene, alkyl(meth)acrylates, aryl(meth)acrylates, alkaryl(meth)acrylates, acrylonitrile, and carbon monoxide). Other examples include blends of acrylic acid or methacrylic acid homopolymers with copolymers of acrylic acid or methacrylic acid and at least two additional monomers (e.g., the copolymer can be a terpolymer). In some embodiments, the blends include a copolymer of acrylic acid or methacrylic acid and at least one additional monomer with a different copolymer of acrylic acid or methacrylic acid and at least one additional monomer. Yet other embodiments include blends of a copolymer of acrylic acid or methacrylic acid and at least one additional monomer with a copolymer of acrylic acid or methacrylic acid and at least two additional monomers. Additionally, the blend can also include different copolymers of acrylic acid or methacrylic acid and at least two additional monomers.

In some embodiments, the at least one polymer includes a second polymer different from the first polymer. The first and second polymers can be different by virtue of having different molecular weights, different acid content, different neutralization percent, different amounts of the same monomer units, and/or by being compositionally distinct, for example. In some embodiments, the second polymer is compositionally distinct from the first polymer. Compositionally distinct in this context can be understood to mean that at least one of the first and second polymers has a least one type of monomer unit not present in the other of the first and second polymers. For example, the first polymer can include two different monomer units (e.g., (meth)acrylic acid and either ethylene or propylene) and the second polymer can include a different third monomer unit (e.g., n-butyl acrylate or isobutyl acrylate) in addition to the two monomer units of the first polymer. Compositionally distinct includes different acid types (e.g., methacrylic acid monomer units versus acrylic acid monomer units) and different ion types (an ion at least partially neutralizing an ionomer can be considered to be part of the ionomer), for example. The second polymer can have a number average molecular weight of at least 10000 grams/mole, or at least 12000 grams/mole, or at least 15000 grams/mole.

In some embodiments, the second polymer includes (meth)acrylic acid monomer units. In some embodiments, the second polymer includes at least one monomer unit selected from the group consisting of ethylene, propylene, alkyl(meth)acrylates, aryl(meth)acrylates, alkaryl(meth) acrylates, acrylonitrile, and carbon monoxide. In some embodiments, the second polymer includes at least one monomer unit selected from the group consisting of ethylene and propylene. In some such embodiments, the second polymer further includes at least one monomer unit selected from the group consisting of n-butyl acrylate, isobutyl acrylate, isopropyl acrylate, n-propyl acrylate, ethyl acrylate, methyl acrylate, 2-ethylhexyl acrylate, iso-octyl acrylate and methyl methacrylate. In some embodiments, the second polymer includes (meth)acrylic acid monomer units; ethylene monomer units, propylene monomer units, or a combination of ethylene and propylene monomer units; and at least one alkyl (meth)acrylate monomer unit.

In some embodiments, the content of (meth)acrylic acid monomer units in the first polymer, and optionally in the second polymer, is greater than 12 weight percent. This has been found to help in dispersing the first polymer, and optionally the second polymer, in water. In some embodiments, the content of (meth)acrylic acid monomer units in the first and the second polymers is similar. This has been found to help the compatibility of the polymers and to improve optical properties, for example. In some embodiments, the first polymer includes (meth)acrylic acid monomer units at a first weight percent w1, and the second polymer includes (meth)acrylic monomer units at a second weight percent w2. In some embodiments, at least one of w1 and w2 (w1, or w2, or each of w1 and w2) is greater than 12 weight percent, or greater than 13 weight percent, or greater than 14 weight percent, or greater than 15 weight percent. In some embodiments, at least one of w1 and w2 is less than 50 weight percent, or less than 30 weight percent, or less than 25 weight percent. In some such embodiments, or in other embodiments, |w1−w2| is less than 15 weight percent or less than 14 weight percent, or less than 12 weigh percent, or less than 10 percent, or less than 8 percent, or less than 7 weight percent, or less than 6 weight percent. Smaller values of the difference |w1−w2| may be preferred when both the first and second polymers are formed from an aqueous dispersion, while larger values of the difference may be useful, in some embodiments, when the second polymer is added in a melt processing step.

In some embodiments, the nanocomposite is formed from an aqueous dispersion including the first and second polymers as described further elsewhere herein. In some such embodiments, or in other embodiments, each of w1 and w2 is greater than 12 weight percent, or greater than 13 weight percent, or greater than 14 weight percent, or greater than 15 weight percent. In some such embodiments, or in other embodiments, |w1−w2| is less than 10 weight percent, or less than 9 weight percent, or less than 8 weight percent, or less than 7 weight percent, or less than 6 weight percent. In some embodiments, |w1−w2| is in a range of 0 to 10 weight percent or in a range of 0 to about 9 weight percent (e.g., 8.8 or 9 or 9.2 weight percent can be considered to be about 9 weight percent). In some cases, where each of the two polymers in dispersion includes two monomer units (e.g., a (meth)acrylic acid monomer unit and a second monomer unit such as ethylene or propylene), the acid content of either the first polymer (w1) or second polymer (w2) may be in a range greater than 27 weight percent, for example. When one of the two polymers (e.g., the first polymer) has an acid content of greater than 27%, the difference |w1−w2| may be up to 15 weight percent, for example.

In some embodiments, a first nanocomposite, or a first concentrated aqueous dispersion, that includes the first polymer is melt processed with the second polymer (also referred to as an additional polymer) to form a nanocomposite (e.g., a second nanocomposite) that includes both the first and second polymers. In some such embodiments, the second polymer is not dispersible in water with or without a neutralizing agent. In some embodiments, w2 can be less than 12 weight percent and/or |w1−w2| can be as high as 15 weight percent, for example. In some embodiments, w1 is greater than 12 weight percent, or greater than 13 weight percent, or greater than 14 weight percent, or greater than 15 weight percent; or in a range of 13 to 50 weight percent, or 13 to 35 weight percent, or 13 to 27 weight percent, or 14 to 22 weight percent, or 15 to 21.5 weight percent, or 15 to 21 weight percent, or 15 to 20.5 weight percent. In some such embodiments, or in other embodiments, w2 is at least 10 weight percent; or in a range of 10 weight percent to 25 weight percent, or to 21.5 weight percent, to 21 weight percent, or to 20.5 weight percent; or w2 can be in any range described for w1. For example, in some embodiments, w1 is in a range of 15 to 20.5 weight percent and w2 is in a range of 10 to 20.5 weight percent or 15 to 20.5 weight percent. In some embodiments, at least one of w1 and w2 is in a range of 14 to 22 weight percent or in a range of 15 to 21.5 weight percent.

In some embodiments, the first polymer includes (meth) acrylic acid monomer units at a weight percent w1 and further includes ethylene monomer units, and the second polymer includes (meth)acrylic acid monomer units at a weight percent w1 and further includes ethylene monomer units. In some such embodiments, w1 is greater than 15 weight percent, and |w1−w2| is less than 10 weight percent.

In some embodiments, the first polymer includes (meth) acrylic acid monomer units at a weight percent w1 and further includes ethylene monomer units, and the second polymer includes (meth)acrylic acid monomer units at a weight percent w1, and further includes ethylene monomer units, and further includes at least one monomer unit selected from the group consisting of n-butyl acrylate, isobutyl acrylate, isopropyl acrylate, n-propyl acrylate, ethyl acrylate, methyl acrylate, 2-ethylhexyl acrylate, iso-octyl acrylate and methyl methacrylate. In some such embodiments, w1 is greater than 15 weight percent, and |w1−w2| is less than 15 weight percent, or less than 13 weight percent, or less than 12 weight percent.

In some embodiments, the first polymer is at least partially neutralized. By this it is meant that the first polymer includes a carboxylic acid group where the proton of the carboxylic acid group is replaced by a cation, such as a metal cation. Monovalent, divalent, and higher valency cations are suitable. In some embodiments, the first polymer is at least partially neutralized with metal cations, alkylammonium cations, or a combination thereof. In some embodiments, the first polymer is at least partially neutralized with sodium cations, calcium cations, potassium cations, zinc cations, lithium cations, magnesium cations, aluminum cations, or a combination thereof. In some embodiments, the first polymer is at least partially neutralized with nonmetallic cations. For example, the first polymer can be at least partially neutralized with alkylammonium cations. In some embodiments, the nanocomposite is formed from an aqueous dispersion as described further elsewhere herein. In some embodiments, in the aqueous dispersion, the first polymer is at least partially neutralized with at least one nonvolatile neutralizing agent, or at least one volatile neutralizing agent, or a combination of volatile and nonvolatile neutralizing agents. For example, in some embodiments, in the aqueous dispersion, the first polymer is at least partially neutralized with nonvolatile amine cations, volatile amine cations (e.g., cations of dimethylethanolamine or ammonium cations), or a combination of volatile and nonvolatile amine cations. The first polymer can be at least partially neutralized with a combination of different types of cations (e.g., metallic and nonmetallic cations or any combinations of cations describe herein). The first polymer can be an at least partially neutralized ionomer prior to being dispersed in the aqueous dispersion. In some embodiments, the ionomer is sufficiently neutralized that no additional neutralizing agents need to be added to the aqueous dispersion. In other embodiments, the ionomer is further at least partially neutralized by additional neutralizing agents added to the aqueous dispersion as described further elsewhere herein.

In some embodiments, the second polymer is at least partially neutralized. In some embodiments, each polymer of the at least one polymer, or each polymer including (meth) acrylic acid monomer units, is at least partially neutralized. The second polymer, or other polymers of the at least one polymer, can be at least partially neutralized with any cation or combination of cations described for the first polymer.

Suitable ethylene (meth)acrylic acid copolymers can be obtained from commercial sources such as PRIMACOR 5980i from Dow Chemical Company (Midland, MI), NUCREL 925 and 960 from E. I. du Pont de Nemours and Company (Wilmington, DE), ESCOR 5200 from Exxon-Mobil (Irving, TX), and AC-5180 from Honeywell (Morris Plains, NJ), for example. Suitable partially neutralized ethylene (meth)acrylic acid copolymers can be obtained from commercial sources such as, for example, SURLYN 1601, 1706, 1707, 7940, 9020, 9120, 8150 and PC-350, and HPF 1000 from E. I. du Pont de Nemours and Company (Wilmington, DE), for example.

A wide range of metal oxide nanoparticles are suitable. Examples of suitable metal oxide nanoparticles include metal oxides of silicon (silicon is considered to be a metalloid and thus is included in the list of metal oxides), titanium, aluminum, hafnium, zinc, tin, cerium, yttrium, indium, antimony or mixed metal oxides thereof. Among the more desirable metal oxide nanoparticles are those of silicon. For example, the metal oxide nanoparticles can be silica ($SiO_2$) nanoparticles or SiOx ($0<x<2$) nanoparticles.

The size of such particles can be chosen to avoid significant visible light scattering and to have an average diameter no more than half the thickness of the layer that the particles are to be incorporated in. The surface-modified metal oxide nanoparticles can be particles having a (e.g. unassociated) primary particle size or associated particle size of greater than 1 nm (nanometers) and less than 200 nm. In some embodiments, the particle size is greater than 4 nm, greater than 5 nm, greater than 10 nm, or greater than 20 nm. In some embodiments, the particle size is less than 190 nm, less than 150 nm, less than 100 nm, less than 75 nm, or less than 50 nm. Typically, the nanoparticles have a size ranging from 4-190 nm, 4-100 nm, 4-75 nm, 10-50 nm, or 20-50 nm. In embodiments where a low optical haze is desired, a particle size of less than 100 nm, less than 75 nm, or less than 50 nm is typically preferred. In embodiments, where a low index layer of a multilayer optical film includes a nanocomposite layer of the present description, the average nanoparticle size can preferably be in the range of 4-20 nm. It is typically desirable that the nanoparticles are unassociated. Particle size can be measured in a wide variety of ways such as by transmission electron microscopy (TEM). Typically, commercially obtained metal oxide nanoparticles are supplied with a listed particle size or particle size range.

The nanoparticles are surface modified to improve compatibility with the polymer matrix material and to keep the nanoparticles non-associated, non-agglomerated, non-aggregated, or a combination thereof. The surface modification used to generate the surface-modified nanoparticles includes at least one acid-functional silane surface modifying agent. The acid-functional silane surface modifying agent can have the general Formula 1:

Formula 1

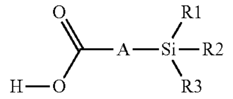

where R1 is a $C_1$ to $C_{10}$ alkoxy group; and R2 and R3 are independently selected from the group consisting of $C_1$ to $C_{10}$ alkyl and $C_1$ to $C_{10}$ alkoxy groups. The group A is a linker group selected from the group consisting of $C_1$ to $C_{10}$ alkylene or arylene groups, $C_1$ to $C_{10}$ aralkylene groups, $C_2$ to $C_{16}$ heteroalkylene or heteroarylene groups, and $C_2$ to $C_{16}$ amide containing groups. Amide containing groups include groups of the type $-(CH_2)_a-NH-(CO)-(CH_2)_b-$; where a and b are integers of 1 or greater, and (CO) is a carbonyl group C=O. In some embodiments, A is an alkylene group with 1-3 carbon atoms.

While acid-functional silanes may be commercially available, one aspect of the current disclosure includes the synthesis of the carboxylic acid-functional silanes of Formula 1. In addition to the synthetic process presented below, an anhydride-functional silane such as (3-triethoxysilyl) propylsuccinic anhydride, which can be obtained from commercial sources such as Gelest, Inc. (Morrisville, PA), could be used to prepare the acid-functional silane surface modification agent.

In some embodiments, a solution is prepared of an organic acid anhydride dissolved in a first organic solvent. A second solution is prepared of an aminosilane in a second organic solvent. The two solutions are combined. The combined solution is stirred continuously at a suitable temperature and duration to synthesize a carboxylic acid-functional silane of Formula 1. In other embodiments, a solution is prepared of an organic acid anhydride dissolved in an organic solvent. An aminosilane is dissolved in the organic acid anhydride solution. The solution containing the organic acid anhydride and aminosilane is stirred continuously at a suitable temperature and duration to synthesize a carboxylic acid silane of Formula 1. The first and second organic solvents may be the same or different. In the case where the first and second organic solvent are different, then the first and second organic solvents are miscible. Both first and second organic solvents are miscible with water.

Suitable organic acid anhydrides include succinic anhydride (3,4-dihdrofuran-2,5-dione), tetrahydrofuran-2,5-dione, 3-alkyltetrahydrofuran-2,5-diones such as 3-methyltetrahydrofuran-2,5-dione and 3-ethyltetrahydrofuran-2,5-dione, tetrahydropyran-2,6-dione, 3-alkyltetrahydropyran-2,6-diones such as 3-methyltetrahydropyran-2,6-dione and 3-ethyltetrahydropyran-2,6-dione 4-alkyltetrahydropyran-2,6-diones such as 4-methyltetrahydropyran-2,6-dione, 4-ethyltetrahydropyran-2,6-dione, and 4,4'-methyltetrahydropyran-2,6-dione, oxepane-2,7-dione. Suitable organic acid anhydrides can be obtained from commercial sources such as Alfa Aesar (Ward Hill, MA) and Millipore Sigma (Burlington, MA). Succinic anhydride is a particularly suitable organic acid anhydride.

Suitable aminosilanes include aminopropyltrimethoxysilane, aminopropyltriethoxysilane, p-aminophenyltrimethoxysilane, p-aminophenyltriethoxysilane, N-phenylaminopropyltrimethoxysilane, N-phenylaminopropyltriethoxysilane, n-butylaminopropyltrimethoxysilane, n-butylaminopropyltriethoxysilane, 3-(N-allylamino)propyltrimethoxysilane, (N,N-diethyl-3-aminopropyl)trimethoxysilane, and (N,N-diethyl-3-aminopropyl)triethoxysilane. Suitable aminosilanes can be obtained from commercial sources such as Gelest, Inc. (Morrisville, PA), Alfa Aesar (Ward Hill, MA), Millipore Sigma (Burlington, MA), and Momentive Performance Materials (Waterford, NY). A particularly suitable aminosilane is aminopropyltrimethoxysilane.

A wide variety of organic solvents can be used. Suitable organic solvents include N,N-dimethylformamide (DMF) which can be obtained from commercial sources such as OmniSolv (Billerica, MA).

In some embodiments, the surface-modified metal oxide nanoparticles are prepared by combining an aqueous nanodispersion of surface unmodified metal oxide nanoparticles of basic pH and a carboxylic acid-functional silane surface modifying agent, reacting the carboxylic acid-functional silane surface agent with the metal oxide nanoparticle surface resulting in an aqueous nanodispersion of surface-modified metal oxide nanoparticles where the nanoparticles are surface modified with a carboxylic acid.

This can be carried out in a variety of ways. In some embodiments, an aqueous nanodispersion of surface unmodified metal oxide nanoparticles is combined with a solution of a carboxylic acid silane of Formula 1 in an organic solvent. In other embodiments, an aqueous nanodispersion of surface unmodified metal oxide nanoparticles is combined with a base and a solution of a carboxylic acid silane of Formula 1 in an organic solvent. In other embodiments, an aqueous nanodispersion of surface unmodified metal oxide nanoparticles is combined with a carboxylic acid silane of Formula 1. Generally, the carboxylic acid silane of Formula 1 is added at a concentration sufficient to modify 10 to 100% of the total metal oxide nanoparticle surface area in the nanodispersion. As was mentioned above, the metal oxide nanoparticles may have a variety of sizes. Typically, the average particle size is greater than 1 nm and less than 200 nm. In some embodiments, the particle size is greater than 4 nm, greater than 5 nm, greater than 10 nm, or greater than 20 nm. In some embodiments, the particle size is less than 190 nm, less than 150 nm, less than 100 nm, less than 75 nm, or less than 50 nm. Typically, the nanoparticles have a size ranging from 4-190 nm, 4-100 nm, 4-75 nm, 10-50 nm, or 20-50 nm. For low haze, typical preferred ranges are from 4-100 nm, 4-75 nm, or 4-50 nm. In some cases, abase may be added to the aqueous nanodispersion of surface unmodified metal oxide nanoparticles to maintain the pH in the desired range since the addition of the carboxylic acid silane solution of Formula 1 will tend to lower pH. In some cases, the organic solvent is removed from of the solution of carboxylic acid silane in organic solvent prior to combining the carboxylic acid silane and aqueous nanodispersion of surface unmodified metal oxide nanoparticles.

Aqueous nanodispersions of unmodified metal oxide nanoparticles may be prepared or, in some embodiments, aqueous nanodispersions of unmodified metal oxide nanoparticles may be obtained commercially. Suitable surface unmodified metal oxide nanoparticles include aqueous nanodispersions commercially available from Nalco Chemical Company (Naperville, IL) under the trade designation "Nalco Colloidal Silicas" such as products NALCO 2326, 1130, DVSZN002, 1142, 2327, 1050, DVSZN004, 1060, and 2329K; from Nissan Chemical America Corporation (Houston, TX) under the tradename SNOWTEX such as products ST-NXS, ST-XS, ST-S, ST-30, ST-40, ST-N40, ST-50, ST-XL, and ST-YL; from Nyacol Nano Technologies, Inc. (Ashland, MA) such as NEXSIL 5, 6, 12, 20, 85-40, 20A, 20K-30, and 20NH4. In some cases, the surface unmodified metal oxide nanoparticles may be dispersed in an aqueous solution with a pH in the range 8-12.

Suitable bases include ammonium hydroxide which can be obtained from commercial sources such as Millipore Sigma (Burlington, MA).

Typically, the surface-modified metal oxide nanoparticles are used as a nanodispersion, and the particles are not isolated. Another aspect of the present disclosure involves the preparation of nanodispersions of surface-modified metal oxide nanoparticles without precipitation, gelation, agglomeration, or aggregation, where the metal oxide nanoparticles are surface modified with a carboxylic acid silane of Formula 1.

In some embodiments, an aqueous nanodispersion of surface unmodified metal oxide nanoparticles and solution of a carboxylic acid silane of Formula 1 in an organic solvent are combined in a reactor and heated at a suitable temperature and duration to react the carboxylic acid silane of Formula 1 with the surface of the metal oxide nanoparticles. In other embodiments, an aqueous nanodispersion of surface-unmodified metal oxide nanoparticles, base, and a solution of carboxylic acid silane of Formula 1 in an organic solvent are combined in a reactor and heated at a suitable temperature and duration to react the carboxylic acid silane of Formula 1 with the surface of the metal oxide nanoparticles. In some embodiments, a solvent exchange is performed on the aqueous nanodispersion of surface-modified metal oxide nanoparticles and organic solvent to remove the organic solvent. In some embodiments, the reactor is open, under reflux conditions, and in other embodiments the reactor is closed and under pressure. In some embodiments, the reactor is glass and in some embodiments the reactor is stainless steel.

A wide range of loadings of the surface-modified metal oxide nanoparticles in the nanocomposite are suitable. Typically, the nanocomposite includes at least 1% by weight of surface-modified metal oxide nanoparticles and no more than 70% by weight of surface-modified metal oxide nanoparticles. In some embodiments, the surface-modified metal oxide nanoparticle concentration is from 5-60% by weight, or from 10-50% by weight. A lower loading of the nanoparticles may be used when the nanocomposite layer is used as the low index layer of a multilayer optical film. In some embodiments, the nanoparticles may be present in the nanocomposite layer in a range of 2%-15% weight percent, for example.

Additional additives may include flame retardants, thermal stabilizers, anti-slip agents, neutralizing agents, UV absorbers, light stabilizers, antioxidants, crosslinking agents, mold release agents, catalysts, colorants, anti-stat agents, defoamers, plasticizers, and other processing aids, for example.

An aqueous dispersion can be used in forming the nanocomposite or ionomer layers without nanoparticles. It has been unexpectedly found that high molecular weight (meth) acrylic polymer(s) (e.g., number average molecular weight of at least 10000 grams/mole) can be dispersed in water (e.g., with suitable neutralizing agents) and that the resulting aqueous dispersion is useful in making a nanocomposite, for example, with desired mechanical and optical properties. In some embodiments, an aqueous dispersion includes water; at least one polymer dispersed in the water; and metal oxide nanoparticles dispersed in the water. The at least one polymer includes a first polymer including (meth)acrylic acid monomer units and optionally having a number average molecular weight of at least 10000 grams/mole. The first polymer is at least partially neutralized. The metal oxide nanoparticles are surface modified with a carboxylic acid silane surface modifying agent. The carboxylic acid silane surface modifying agent can be or include a carboxylic acid silane of Formula 1, described elsewhere herein. The metal oxide nanoparticles can optionally be omitted when an ionomer layer not including nanoparticles is desired.

EXAMPLES

Illustrative Nanocomposites

TABLE 1

Materials used in making nanocomposites

| Material | Description | Supplier |
|---|---|---|
| PRIMACOR 5980i | poly(ethylene-co-acrylic acid) | SK Global Chemical Co. Ltd. (Seoul, South Korea) |
| PRIMACOR 1410 | poly(ethylene-co-acrylic acid) | |
| NUCREL 699 | poly(ethylene-co-methacrylic acid) | Dow Chemical Co. (Midland, MI) |
| NUCREL 960 | poly(ethylene-co-methacrylic acid) | Dow Chemical Co. |
| SURLYN 1601 | poly(ethylene-co-methacrylic acid) partially neutralized with $Na^+$ ions | Dow Chemical Co. |
| SURLYN 1650 | poly(ethylene-co-methacrylic acid) partially neutralized with $Zn^{++}$ ions | Dow Chemical Co. |
| SURLYN 1706 | poly(ethylene-co-methacrylic acid) partially neutralized with $Zn^{++}$ ions | Dow Chemical Co. |
| SURLYN 1707 | poly(ethylene-co-methacrylic acid) partially neutralized with $Na^+$ ions | Dow Chemical Co. |
| SURLYN 7940 | poly(ethylene-co-methacrylic acid) partially neutralized with $Li^+$ ions | Dow Chemical Co. |
| SURLYN 8150 | poly(ethylene-co-methacrylic acid) partially neutralized with $Na^+$ ions | Dow Chemical Co. |
| SURLYN 9120 | poly(ethylene-co-methacrylic acid) partially neutralized with $Zn^{++}$ ions | Dow Chemical Co. |
| SURLYN PC-350 | poly(ethylene-co-methacrylic acid) partially neutralized with $Na^+$ ions | Dow Chemical Co. |
| SURLYN 9020 | poly(ethylene-co-methacrylic acid-co-isobutyl acrylate) partially neutralized with $Zn^{++}$ ions | Dow Chemical Co. |
| HPF 1000 | poly(ethylene-co-methacrylic acid-co-n-butyl acrylate) partially neutralized with $Mg^{++}$ ions | Dow Chemical Co. |
| NaOH | sodium hydroxide | MilliporeSigma Co. (Burlington, MA) |
| KOH | potassium hydroxide | VWR Chemical (Radnor, PA) |
| $NH_4OH$ | ammonium hydroxide solution | MilliporeSigma Co. |
| DMEA | N,N-dimethylethanolamine | Alfa Aesar (Haverhill, MA) |
| MOR | morpholine | Alfa Aesar |
| TEA | triethylamine | Alfa Aesar |
| AMP (95%) | 2-amino-2-methyl-1-propanol | Alfa Aesar |
| MEA | monoaminoethanol | Alfa Aesar |
| T(EtOH)A | triethanolamine | Alfa Aesar |
| ZnO | zinc oxide | Alfa Aesar |
| ZnAc | zinc acetate dihydrate | Alfa Aesar |
| AMINO-TMOS | 3-aminopropyltrimethoxysilane | Gelest, Inc. (Morrisville, PA) |
| DMF | N,N-dimethylformamide | OmniSolv (Billerica, MA) |
| SA | succinic anhydride | Alfa Aesar |
| NALCO 2327 | aqueous colloidal silica nanodispersion | Nalco Co. (Naperville, IL) |
| DI $H_2O$ | deionized water | |

NaOH Neutralizing Agent Solution 3000 grams of deionized water was placed in a 3.78 liter clear glass jar. A Teflon coated stir bar was added to the jar. The jar was placed on a stir plate (RCT Basic Model Magnetic Stirrer/Hot Plate Combination, IKA Works, Inc., Wilmington, NC) and agitation initiated. 1156.1 grams of sodium hydroxide (NaOH) pellets was added to the jar. The NaOH pellets dissolved in the water forming a clear solution.

KOH Neutralizing Agent Solution 72 grams of deionized water was placed in a 0.24 liter clear glass jar. A Teflon coated stir bar was added to the jar. The jar was placed on a stir plate and agitation initiated. 28 grams of potassium hydroxide (KOH) chips was added to the jar. The KOH chips dissolved in the water forming a clear solution.

LiOH Neutralizing Agent Solution 90 grams of deionized water was placed in a 0.24 liter clear glass jar. A Teflon coated stir bar was added to the jar. The jar was placed on a stir plate and agitation initiated. 10 grams of lithium hydroxide (LiOH) granules was added to the jar. The LiOH granules dissolved in the water forming a clear solution.

Zinc Neutralizing Agent Solution 10 grams of zinc oxide (ZnO) was placed in a 3.78 liter clear glass jar. A Teflon coated stir bar was added to the jar. 707 grams of deionized water was added to the jar. 394 grams of ammonium hydroxide ($NH_4OH$) solution was added to the jar. The jar was placed on a stir plate and agitation initiated. Agitation was continued overnight resulting in a clear solution.

Acid Silane Surface Agent Solution 225 grams of succinic anhydride (SA) was placed in a 4 liter brown glass jug. A Teflon coated stir bar was added to the jug. The jug was placed on a stir plate. 2500 grams of N, N-dimethylformamide (DMF) was added to the jar and agitation initiated. Once the succinic anhydride dissolved, 400 grams of 3-aminopropyltrimethoxysilane (AMINO-TMOS) was added to the jug. The contents of the jug continued to be agitated for 24 hours at room temperature to complete the reaction to form the acid silane in DMF.

Ionic Elastomer Dispersion

Dispersions D1, D4-D10:

Dispersions D1, D4-D10 illustrate preparation of ionic elastomer dispersions in an open (atmospheric) reactor. The mass of each component is shown in Table 2. Deionized water was placed in a two liter cylindrical clear glass reactor (Ace Glass, Vineland, NJ). Un-neutralized (meth)acrylic acid elastomer in pellet form was added to the reactor to achieve a 15 weight percent elastomer dispersion. Agitation was initiated at 120 rpm. Neutralizing agent was added to the reactor to achieve 75% neutralization of the (meth) acrylic acid elastomer. Heat was initiated at a set point temperature of 100° C. and the reactor was operated under reflux. Once the batch temperature reached 100° C. the contents of the reactor was maintained under continuous agitation at 100° C. for 2.5 hours. The resulting dispersion was filtered through a 200 m sock filter (Pall Corp., Port Washington, NY) and transferred to a clear glass jar. The process conditions along with pH of resulting dispersions are detailed in Table 3.

Dispersion D2:

Dispersion D2 illustrates preparation of an ionic elastomer dispersion in a closed (pressurized) reactor. The mass of each component is shown in Table 2. Deionized water was placed in a 37.85 liter stainless steel reactor. Un-neutralized (meth)acrylic acid elastomer in pellet form was added to the reactor to achieve a 15 weight percent elastomer dispersion. Agitation was initiated at 30 rpm. Neutralizing agent was added to the reactor to achieve 75% neutralization of the (meth)acrylic acid elastomer. Agitation was increased to 60 rpm. The reactor was sealed to prevent loss of materials. Heat was initiated at a set point temperature of 100° C. Once the batch temperature reached 100° C. the contents of the reactor was maintained under continuous agitation at 100° C. for 2.5 hours. The resulting dispersion was filtered through a 200 m sock filter (Pall Corp., Port Washington, NY) and transferred to two 18.93 liter plastic lined metal pails. The process conditions along with pH of resulting dispersion is detailed in Table 3.

Dispersion D3:

Dispersion D3 illustrates preparation of an ionic elastomer dispersion in a closed (pressurized) reactor. The mass of each component is shown in Table 2. Deionized water was placed in a 265 liter stainless steel reactor. Un-neutralized (meth)acrylic acid elastomer in pellet form was added to the reactor to achieve a 15 weight percent elastomer dispersion. Agitation was initiated. Neutralizing agent was added to the reactor to achieve 75% neutralization of the (meth)acrylic acid elastomer. The reactor was sealed to prevent loss of materials. Heat was initiated at a set point temperature of 100° C. Once the batch temperature reached 100° C. the contents of the reactor was maintained under continuous agitation at 100° C. for 4.5 hours. The resulting dispersion was filtered through a 200 m sock filter (Pall Corp., Port Washington, NY) and transferred to a 208 liter plastic drum. The process conditions along with pH of resulting dispersion is detailed in Table 3.

Dispersion D11:

Dispersion D11 illustrates preparation of an ionic elastomer dispersion in a closed (pressurized) reactor. The mass of each component is shown in Table 2. Deionized water was placed in a 37.85 liter stainless steel reactor. Un-neutralized (meth)acrylic acid copolymer elastomer in pellet form was added to the reactor to achieve a 15 weight percent elastomer dispersion. Agitation was initiated at 60 rpm. Neutralizing agent was added to the reactor to achieve 75% neutralization of the (meth)acrylic acid elastomer. Agitation was increased to 120 rpm. The reactor was sealed to prevent loss of materials. Heat was initiated at a set point temperature of 100° C. Once the batch temperature reached 100° C. the contents of the reactor was maintained under continuous agitation at 100° C. for 2.5 hours. The resulting dispersion was filtered through a 200 m sock filter (Pall Corp., Port Washington, NY) and transferred to two 18.93 liter plastic lined metal pails. The process conditions along with pH of resulting dispersion is detailed in Table 3.

Dispersion D12:

Dispersion D12 illustrates preparation of an ionic elastomer dispersion in a closed (pressurized) reactor. The mass of each component is shown in Table 2. Deionized water was placed in a 37.85 liter stainless steel reactor. Un-neutralized (meth)acrylic acid elastomer in pellet form was added to the reactor to achieve a 15 weight percent elastomer dispersion. Agitation was initiated at 120 rpm. Neutralizing agent was added to the reactor to achieve 75% neutralization of the (meth)acrylic acid elastomer. Heat was initiated at a set point temperature of 150° C. The reactor was sealed to allow processing at higher temperatures and prevent loss of materials. Once the batch temperature reached 150° C. the contents of the reactor was maintained under continuous agitation at 150° C. for 2.5 hours. The resulting dispersion was filtered through a 200 m sock filter (Pall Corp., Port Washington, NY) and transferred to two 18.93 liter plastic lined metal pails. The process conditions along with pH of resulting dispersion is detailed in Table 3.

TABLE 2

| Ionic Elastomer Dispersion | | | | | | | | | | | | | |
|---|---|---|---|---|---|---|---|---|---|---|---|---|---|
| DISPERSION | | D1 | D2 | D3 | D4 | D5 | D6 | D7 | D8 | D9 | D10 | D11 | D12 |
| ELASTOMER | | | | | | | | | | | | | |
| PRIMACOR 5980i | (g) | 225 | 5139 | 28395 | 225 | 225 | 225 | 225 | 225 | 225 | 225 | 5107 | |
| NUCREL 960 | (g) | | | | | | | | | | | | 5098 |
| WATER | | | | | | | | | | | | | |
| DI $H_2O$ | (g) | 1206 | 27578 | 152407 | 1179 | 1160 | 1232 | 1230 | 1246 | 1226 | 828 | 27669 | 27946 |

TABLE 2-continued

| Ionic Elastomer Dispersion | | | | | | | | | | | | | |
|---|---|---|---|---|---|---|---|---|---|---|---|---|---|
| DISPERSION | | D1 | D2 | D3 | D4 | D5 | D6 | D7 | D8 | D9 | D10 | D11 | D12 |
| NEUTRALIZING AGENT | | | | | | | | | | | | | |
| NaOH Solution | (g) | 69 | 1528 | 8437 | | | | | | | | | 948 |
| KOH Solution | (g) | | | | 96 | | | | | | | | |
| LiOH Solution | (g) | | | | | 115 | | | | | | | |
| MOR | (g) | | | | | | | | | | | | |
| DMEA | (g) | | | | | | 43 | | | | | | |
| T(EtOH)A | (g) | | | | | | | | | | | | |
| AMP | (g) | | | | | | | 45 | | | | | |
| MEA | (g) | | | | | | | | 29 | | | | |
| TEA | (g) | | | | | | | | | 49 | | | |
| Zn Complex Solution | (g) | | | | | | | | | | 447 | | |
| $NH_4OH$ Solution | (g) | | | | | | | | | | | 1315 | |
| Reactor | | open | closed | closed | open | open | open | open | open | open | open | closed | closed |
| Reactor Temperature (° C.) | | 100 | 100 | 100 | 100 | 100 | 100 | 100 | 100 | 100 | 100 | 100 | 150 |
| Time (hr) | | 2.5 | 2.5 | 4.5 | 2.5 | 2.5 | 2.5 | 2.5 | 2.5 | 2.5 | 2.5 | 2.5 | 2.5 |

TABLE 3

| Characterization of Ionic Elastomer Dispersion | | | | | | |
|---|---|---|---|---|---|---|
| DISPERSION | Elastomer | Elastomer (w %) | Acid (w %) | Ion | Neutralization (%) | pH |
| D1 | PRIMACOR 5980i | 15 | 20.5 | $Na^+$ | 75 | NM[1] |
| D2 | | | | $Na^+$ | | 9.5 |
| D3 | | | | $Na^+$ | | 9.5 |
| D4 | | | | $K^+$ | | 9.5 |
| D5 | | | | $Li^+$ | | 10.0 |
| D6 | | | | $DMEA^+$ | | 9.5 |
| D7 | | | | $AMP^+$ | | 9.5 |
| D8 | | | | $MEA^+$ | | 9.5 |
| D9 | | | | $TEA^+$ | | NM[1] |
| D10 | | | | $Zn(NH_3)_4^{++}$ | | 10.0 |
| D11 | | | | $NH_4^+$ | | 10.5 |
| D12 | NUCREL 960 | 15 | 15 | $Na^+$ | 75 | 10.5 |

[1]NM designates "not measured";
[2]DND designates "did not disperse"

Dispersions D13-D15, D17-D21, D23, D24:

Dispersions D13-D15, D17-D21, D23, and D24 illustrate preparation of ionic elastomer dispersions in an open (atmospheric) reactor. The mass of each component is shown in Table 6. Deionized water was placed in a two liter cylindrical clear glass reactor (Ace Glass, Vineland, NJ). Pre-neutralized (meth)acrylic acid elastomer in pellet form was added to the reactor to achieve a 15 weight percent elastomer dispersion. Agitation was initiated at 120 rpm. Neutralizing agent was added to the reactor to achieve 75% neutralization of the (meth)acrylic acid elastomer. Heat was initiated at a set point temperature of 100° C. and the reactor was operated under reflux. Once the batch temperature reached 100° C. the contents of the reactor was maintained under continuous agitation at 100° C. for 2.5 hours. The resulting dispersion was filtered through a 200 m sock filter (Pall Corp., Port Washington, NY) and transferred to clear glass jar. The process conditions along with characterization results are detailed in Table 7. The pH of each dispersion was measured. Particle size analysis indicated all dispersions are unimodal with a dispersed phase size less than 100 nm. The dispersions exhibit varying degrees of haze which correlates with dispersed phase size. Similar values of dried weights of unfiltered and filtered dispersions give an indication that the elastomer is fully dispersed.

Dispersion D16:

Dispersion D16 illustrates preparation of an ionic elastomer dispersion in an open (atmospheric) reactor. The mass of each component is shown in Table 6. Deionized water was placed in a two liter cylindrical clear glass reactor (Ace Glass, Vineland, NJ). Pre-neutralized (meth)acrylic acid elastomer in pellet form was added to the reactor to achieve a 15 weight percent elastomer dispersion. Agitation was initiated at 120 rpm. No neutralizing agent was added to the reactor. Heat was initiated to a set point temperature of 100° C. and the reactor was operated under reflux. Once the batch temperature reached 100° C. the contents of the reactor was maintained under continuous agitation at 100° C. for 2.5 hours. The resulting dispersion was filtered through a 200 m sock filter (Pall Corp., Port Washington, NY) and transferred to clear glass jar. The process conditions and characterization results are detailed in Table 7. The pH of the resulting dispersion was 9.5. Particle size analysis indicated a unimodal dispersed phase size of 44.26 nm. The dispersion was turbid with a measured haze of 11.6%. Similar values of dried weights of unfiltered and filtered dispersions give an indication that the elastomer is fully dispersed.

Dispersion D22:

Dispersion D22 illustrates preparation of an ionic elastomer dispersion in a closed (pressurized) reactor. The mass of each component is shown in Table 6. Deionized water was placed in a 37.85 liter stainless steel reactor. Pre-neutralized (meth)acrylic acid elastomer in pellet form was added to the reactor to achieve a 15 weight percent elastomer dispersion. Agitation was initiated at 30 rpm. Neutralizing agent was added to the reactor. Agitation was increased to 120 rpm. The reactor was sealed to allow processing at higher temperatures and prevent loss of materials. Heat was initiated to a set point temperature of 150° C. Once the batch temperature reached 150° C. the contents of the reactor was maintained under continuous agitation at 150° C. for 2.5 hours. The resulting dispersion was filtered through a 200 m sock filter (Pall Corp., Port Washington, NY) and transferred to two 18.93 liter plastic lined metal pails. The process conditions along characterization results are detailed in Table 7. The pH of the resulting dispersion was 11.5. Particle size analysis indicated a bimodal dispersion of sizes of 23.25 nm and 140.5 nm. The dispersion was milky white with a measured haze of 81.6%. Similar values of dried weights of unfiltered and filtered dispersions give an indication that the elastomer is fully dispersed.

TABLE 4

Ionic Elastomer Dispersion

| DISPERSION | | D13 | D14 | D15 | D16 | D17 | D18 | D19 | D20 | D21 | D22 | D23 | D24 |
|---|---|---|---|---|---|---|---|---|---|---|---|---|---|
| ELASTOMER | | | | | | | | | | | | | |
| SURLYN 8150 | (g) | 225 | 225 | 225 | 225 | | | | | | | | |
| SURLYN PC-350 | (g) | | | | | 225 | 225 | 225 | 225 | | | | |
| SURLYN 7940 | (g) | | | | | | | | | 225 | | | |
| SURLYN 9120 | (g) | | | | | | | | | | 5110 | | |
| SURLYN 1707 | (g) | | | | | | | | | | | 225 | 225 |
| WATER | | | | | | | | | | | | | |
| DI $H_2O$ | (g) | 1264 | 1242 | 1271 | 1275 | 1255 | 1247 | 1248 | 1264 | 1249 | 27760 | 1248 | 1264 |
| NEUTRALIZING AGENT | | | | | | | | | | | | | |
| NaOH Solution | (g) | 11 | | | | 20 | | | | | 1210 | | |
| KOH Solution | (g) | | | | | | 27 | | | | | | |
| DMEA | (g) | | 33 | 13 | | | | 26 | 10 | 26 | | 26 | 10 |
| Reactor | | open | open | open | open | open | open | open | open | open | closed | open | open |
| Reactor Temperature (° C.) | | 100 | 100 | 100 | 100 | 100 | 100 | 100 | 100 | 100 | 150 | 100 | 100 |
| Time (hr) | | 2.5 | 2.5 | 2.5 | 2.5 | 2.5 | 2.5 | 2.5 | 2.5 | 2.5 | 2.5 | 2.5 | 2.5 |

TABLE 5

Characterization of Ionic Elastomer Dispersion

| DISPERSION | Elastomer | Elastomer (w %) | Acid (w %) | Ion | Neutral-ization (%) | pH | un-filtered (w %) | filtered (w %) | Particle Size[2] (nm) | H (%) |
|---|---|---|---|---|---|---|---|---|---|---|
| D13 | SURLYN 8150 | 15 | 19 | $Na^+$ | 60 | 10.0 | 15.55 | 15.61 | NM[2] | 6.4 |
| D14 | | 15 | | $Na^+$, $DMEA^+$ | 118 | 10.5 | 15.46 | 15.45 | 21.86 | 3.1 |
| D15 | | 15 | | $Na^+$, $DMEA^+$ | 75 | 10.0 | 15.40 | 15.48 | 28.22 | 2.9 |
| D16 | | 15 | | $Na^+$ | 45 | 9.5 | 15.77 | 15.66 | 44.26 | 11.6 |
| D17 | SURLYN PC-350 | 15 | 15 | $Na^+$ | 90 | 11.5 | 16.04 | 16.02 | 50.24 | 9.3 |
| D18 | | 15 | | $Na^+$, $K^+$ | 90 | 1.0 | 15.85 | 15.86 | 33.49 | 6.5 |
| D19 | | 15 | | $Na^+$, $DMEA^+$ | 128 | 10.5 | 15.31 | 15.40 | 44.12 | 8.4 |
| D20 | | 15 | | $Na^+$, $DMEA^+$ | 85 | 10.0 | 15.33 | 15.37 | 73.84 | 45.0 |
| D21 | SURLYN 7940 | 15 | 15 | $Li^+$, $DMEA^+$ | 115 | 10.5 | 15.87 | 15.75 | 170.7 | 99.3 |
| D22 | SURLYN 9120 | 15 | 19 | $Na^+$, $Zn^{++}$ | 113 | 11.5 | 15.59 | 15.65 | 23.25 140.5<br>(13.8) (86.2) | 81.6 |
| D23 | SURLYN 1707 | 15 | 15 | $Na^+$, $DMEA^+$ | 128 | 10.5 | 15.95 | 15.69 | 45.78 | 6.8 |
| D24 | | 15 | | $Na^+$, $DMEA^+$ | 90 | 10.0 | 15.37 | 15.30 | 92.06 | 40.3 |

[1]Number in paretheses is percentage size population; designates "not measured"

[2]designates "not measured"

Ionic Elastomer Blend Dispersion
Dispersion D25:

Dispersion D25 illustrates preparation of an ionic elastomer blend dispersion in an open (atmospheric) reactor. The mass of each component is shown in Table 10. Deionized water was placed in a two liter cylindrical clear glass reactor (Ace Glass, Vineland, NJ). Two un-neutralized (meth) acrylic acid elastomers, both in pellet form, were added to the reactor to achieve a 15 weight percent elastomer dispersion. Agitation was initiated at 120 rpm. Two neutralizing agents were added to the reactor. Heat was initiated at a set point temperature of 100° C. and the reactor was operated under reflux. Once the batch temperature reached 100° C. the contents of the reactor was maintained under continuous agitation at 100° C. for 2.5 hours. The resulting dispersion was filtered through a 200 m sock filter (Pall Corp., Port Washington, NY) and transferred to clear glass jar. The process conditions along with characterization results are given in Table 11. The pH of the resulting dispersion was 10.5. Particle size analysis indicated a bimodal dispersion sizes of 47.09 and 5350 nm with the smaller size representing 99.1% of the result. The dispersion was turbid with a measured haze of 22.6%. Similar values of dried weights of unfiltered and filtered dispersions give an indication that the two elastomers are fully dispersed.

Dispersions D26, D27:

Dispersions D26 and D27 illustrate preparation of ionic elastomer blend dispersions in a closed (pressurized) reactor. The mass of each component is shown in Table 10. Deionized water was placed in a 37.85 liter stainless steel reactor. One pre-neutralized (meth)acrylic acid elastomer and one un-neutralized (meth)acrylic acid elastomer, both in pellet form, were added to the reactor to achieve a 15 weight percent elastomer dispersion. Agitation was initiated at 30 rpm. Neutralizing agent was added to the reactor. Agitation was increased to 120 rpm. The reactor was sealed to allow processing at higher temperatures and prevent loss of materials. Heat was initiated at a set point temperature of 150° C. Once the batch temperature reached 150° C. the contents of the reactor was maintained under continuous agitation at 150° C. for 2.5 hours. The resulting dispersion was filtered through a 200 m sock filter (Pall Corp., Port Washington, NY) and transferred to two 18.93 liter plastic lined metal pails. The process conditions along characterization results are detailed in Table 11. The pH of the resulting dispersions were 10.5 and 11.0 for D26 and D27, respectively. Particle size analysis indicated a bimodal dispersion for both Dispersions D26 and D27 with similar dispersed phase sizes. Both dispersions were milky white with a measured haze of 61.2% and 48.0%, for D26 and D27, respectively. Similar values of dried weights of unfiltered and filtered dispersions give an indication that the two elastomers are fully dispersed.

Dispersion D28:

Dispersion D28 illustrates preparation of an ionic elastomer blend dispersion in a closed (pressurized) reactor. The mass of each component is shown in Table 10. Deionized water was placed in a 37.85 liter stainless steel reactor. One pre-neutralized (meth)acrylic acid elastomer and one un-neutralized (meth)acrylic acid elastomer, both in pellet form, were added to the reactor to achieve a 15 weight percent elastomer dispersion. Agitation was initiated at 30 rpm. Neutralizing agent was added to the reactor. Agitation was increased to 120 rpm. The reactor was sealed to allow processing at higher temperatures and prevent loss of materials. Heat was initiated at a set point temperature of 150° C. Once the batch temperature reached 150° C. the contents of the reactor was maintained under continuous agitation at 150° C. for 2.5 hours. The resulting dispersion was filtered through a 200 m sock filter (Pall Corp., Port Washington, NY) and transferred to two 18.93 liter plastic lined metal pails. The process conditions along characterization results are detailed in Table 11. The pH of the resulting dispersion was 11.5. Particle size analysis indicated a bimodal distribution of dispersed phase sizes of 12.26 and 194.0 nm. The dispersion was milky white with a measured haze of 88.1%. Similar values of dried weights of unfiltered and filtered dispersions give an indication that the two elastomers are fully dispersed.

Dispersion D29:

Dispersion D29 illustrates preparation of an ionic elastomer blend dispersion in a closed (pressurized) reactor. The mass of each component is shown in Table 10. Deionized water was placed in a 37.85 liter stainless steel reactor. One pre-neutralized (meth)acrylic acid elastomer and one un-neutralized (meth)acrylic acid elastomer, both in pellet form, were added to the reactor to achieve a 15 weight percent elastomer dispersion. Agitation was initiated at 30 rpm. Neutralizing agent was added to the reactor. Agitation was increased to 120 rpm. The reactor was sealed to allow processing at higher temperatures and prevent loss of materials. Heat was initiated at a set point temperature of 140° C. Once the batch temperature reached 140° C. the contents of the reactor was maintained under continuous agitation at 140° C. for 2.5 hours. The resulting dispersion was filtered through a 200 m sock filter (Pall Corp., Port Washington, NY) and transferred to two 18.93 liter plastic lined metal pails. The process conditions along characterization results are detailed in Table 11. The pH of the resulting dispersion was 11.5. Particle size analysis indicated a bimodal distribution of dispersed phase sizes of 26.21 and 290.0 nm. The dispersion was milky white with a measured haze of 70.2%. Similar values of dried weights of unfiltered and filtered dispersions give an indication that the two elastomers are fully dispersed.

Dispersions D30-D33, D35, D36:

Dispersions D30-D33, D35, D36 illustrate preparation of ionic elastomer blend dispersions in an open (atmospheric) reactor. The mass of each component is shown in Table 10. Deionized water was placed in a two liter cylindrical clear glass reactor (Ace Glass, Vineland, NJ). Two pre-neutralized (meth)acrylic acid elastomers, both in pellet form, were added to the reactor to achieve a 15 weight percent elastomer dispersion. Agitation was initiated at 120 rpm. Neutralizing agent was added to the reactor. Heat was initiated at a set point temperature of 100° C. and the reactor was operated under reflux. Once the batch temperature reached 100° C. the contents of the reactor was maintained under continuous agitation at 100° C. for 2.5 hours. The resulting dispersion was filtered through a 200 m sock filter (Pall Corp., Port Washington, NY) and transferred to clear glass jar. The process conditions along with characterization results are given in Table 11. The pH of the resulting dispersions ranged from 10.0-11.0. Particle size analysis indicated that Dispersions D30, D31, D32 and D35 exhibited a unimodal dispersed size and Dispersions D33 and D36 exhibited bimodal. The dispersions exhibited varying degrees of turbidity which correlated with the haze provided in Table 11. Haze was significantly lower for dispersions with unimodal dispersed phase relative to bimodal. Similar values of dried weights of unfiltered and filtered dispersions give an indication that the two elastomers are fully dispersed.

Dispersion D34:

Dispersion D34 illustrates preparation of an ionic elastomer blend dispersion in an open (atmospheric) reactor. The mass of each component is shown in Table 10. Deionized water was placed in a two liter cylindrical clear glass reactor (Ace Glass, Vineland, NJ). One pre-neutralized (meth) acrylic acid elastomer and one un-neutralized(meth)acrylic acid elastomer, both in pellet form, were added to the reactor to achieve a 15 weight percent elastomer dispersion. Agitation was initiated at 120 rpm. Neutralizing agent was added to the reactor. Heat was initiated at a set point temperature of 100° C. and the reactor was operated under reflux. Once the batch temperature reached 100° C. the contents of the reactor was maintained under continuous agitation at 100° C. for 2.5 hours. The resulting dispersion was filtered through a 200 m sock filter (Pall Corp., Port Washington, NY) and transferred to clear glass jar. The process conditions along with characterization results are detailed in Table 11. The pH of the resulting dispersion was 10.0. Particle size analysis indicated a unimodal dispersed phase size of 30.29 nm. The dispersion is turbid with a haze of 7.2%. Similar values of dried weights of unfiltered and filtered dispersions give an indication that the two elastomers are fully dispersed.

TABLE 10

| Ionic Elastomer Blend Dispersion | | | | | | | | | | | | | |
|---|---|---|---|---|---|---|---|---|---|---|---|---|---|
| DISPERSION | | D25 | D26 | D27 | D28 | D29 | D30 | D31 | D32 | D33 | D34 | D35 | D36 |
| ELASTOMER | | | | | | | | | | | | | |
| SURLYN 9120 | (g) | | 2900 | 2900 | 4600 | 4600 | | | | | | | |
| SURLYN 8150 | (g) | | | | | | 112 | 112 | 112 | 112 | 112 | | |
| SURLYN PC-350 | (g) | | | | | | 112 | 112 | 112 | 112 | | 112 | 112 |
| SURLYN 1707 | (g) | | | | | | | | | | | 112 | 112 |
| PRIMACOR 5980i | (g) | 99 | 2270 | 2270 | 520 | | | | | | 112 | | |
| NUCREL 960 | (g) | 126 | | | | 520 | | | | | | | |
| WATER | | | | | | | | | | | | | |
| DI $H_2O$ | (g) | 1198 | 27580 | 27580 | 27670 | 27710 | 1249 | 1239 | 1245 | 1259 | 1237 | 1249 | 1264 |
| NEUTRALIZING AGENT | | | | | | | | | | | | | |
| NaOH Solution | (g) | 43 | 1530 | 1530 | 1240 | 1180 | 26 | | | | | | |
| KOH Solution | (g) | | | | | | | 36 | | | | | |
| DMEA | (g) | 33 | | | | | | | 30 | '16 | 38 | 26 | 11 |
| Reactor | | open | closed | closed | closed | closed | open | open | open | open | open | open | open |
| Reactor Temperature (° C.) | | 100 | 150 | 150 | 150 | 140 | 100 | 100 | 100 | 100 | 100 | 100 | 100 |
| Time (hr) | | 2.5 | 2.5 | 2.5 | 2.5 | 2.5 | 2.5 | 2.5 | 2.5 | 2.5 | 2.5 | 2.5 | 2.5 |

TABLE 11

| Ionic Elastomer Blend Dispersion | | | | | | | | |
|---|---|---|---|---|---|---|---|---|
| DISPERSION | Elastomer Blend[1] | Elastomer (w %) | Blend (w %) | Acid (w %) | Δ[1] (w %) | Ion | Neutralization (%) | Dispersion Appearance |
| D25 | PRIMACOR 5980i | 15 | 44 | 20.5 | 5.5 | $Na^+$, $DMEA^+$ | 134 | hazy |
| | NUCREL 960 | | 56 | 15 | | | | |
| D26 | PRIMACOR 5980i | 15 | 44 | 20.5 | 1.9 | $Na^+$, $Zn^{++}$ | 102 | milky white |
| | SURLYN 9120 | | 56 | 19 | | | | |
| D27 | PRIMACOR 5980i | 15 | 44 | 20.5 | 1.5 | $Na^+$, $Zn^{++}$ | 102 | milky white |
| | SURLYN 9120 | | 56 | 19 | | | | |
| D28 | PRIMACOR 5980i | 15 | 10 | 20.5 | 1.5 | $Na^+$, $Zn^{++}$ | 108 | milky white |
| | SURLYN 9120 | | 90 | 19 | | | | |
| D29 | NUCREL 960 | 15 | 10 | 15 | 4 | $Na^+$, $Zn^{++}$ | 111 | milky white |
| | SURLYN 9120 | | 90 | 19 | | | | |
| D30 | SURLYN 8150 | 15 | 50 | 19 | 4 | $Na^+$ | 90 | turbid |
| | SURLYN PC-350 | | 50 | 15 | | | | |
| D31 | SURLYN 8150 | 15 | 50 | 19 | 4 | $Na^+$, $K^+$ | 90 | turbid |
| | SURLYN PC-350 | | 50 | 15 | | | | |
| D32 | SURLYN 8150 | 15 | 50 | 19 | 4 | $Na^+$, $DMEA^+$ | 125 | hazy |
| | SURLYN PC-350 | | 50 | 15 | | | | |
| D33 | SURLYN 8150 | 15 | 50 | 19 | 4 | $Na^+$, $DMEA^+$ | 90 | turbid |
| | SURLYN PC-350 | | 50 | 15 | | | | |
| D34 | PRIMACOR 5980i | 15 | 50 | 20.5 | 1.5 | $Na^+$, $DMEA^+$ | 101 | hazy |
| | SURLYN 8150 | | 50 | 19 | | | | |
| D35 | SURLYN PC-350 | 15 | 50 | 15 | 0 | $Na^+$, $DMEA^+$ | 132 | hazy |
| | SURLYN 1707 | | 50 | 15 | | | | |
| D36 | SURLYN PC-350 | 15 | 50 | 15 | 0 | $Na^+$, $DMEA^+$ | 90 | turbid |
| | SURLYN 1707 | | 50 | 15 | | | | |

[1]Δ designates difference in acid content of polymers of blend

TABLE 12

| Characterization of Ionic Blend Dispersion | | | | | | | | | | | | |
|---|---|---|---|---|---|---|---|---|---|---|---|---|
| DISPERSION | Elastomer Blend | Elastomer (w %) | Blend (w %) | Acid (w %) | Δ[1] (w %) | Ion | Neutralization (%) | pH | un-filtered (w %) | filtered (w %) | Particle Size[2] (nm) | H (%) |
| D25 | PRIMACOR 5980i | 15 | 44 | 20.5 | 5.5 | $Na^+$, DMEA | 134 | 10.5 | 16.23 | 16.22 | 47.06 5,350 | 22.6 |
| | NUCREL 960 | | 56 | 15 | | | | | | | (99.1) (0.9) | |
| D26 | PRIMACOR 5980i | 15 | 44 | 20.5 | 1.9 | $Na^+$, $Zn^{++}$ | 102 | 11.0 | 15.77 | 15.83 | 24.75 150.8 | 61.2 |
| | SURLYN 9120 | | 56 | 19 | | | | | | | (21.9) (78.1) | |
| D27 | PRIMACOR 5980i | 15 | 44 | 20.5 | 1.5 | $Na^+$, $Zn^{++}$ | 102 | 10.5 | 15.81 | 15.87 | 23.47 148.6 | 48.0 |
| | SURLYN 9120 | | 56 | 19 | | | | | | | (24.5) (75.5) | |
| D28 | PRIMACOR 5980i | 15 | 10 | 20.5 | 1.5 | $Na^+$, $Zn^{++}$ | 108 | 11.5 | 15.53 | 15.47 | 12.26 194.0 | 88.1 |
| | SURLYN 9120 | | 90 | 19 | | | | | | | (2.2) (97.8) | |
| D29 | NUCREL 960 | 15 | 10 | 15 | 4 | $Na^+$, $Zn^{++}$ | 111 | 11.5 | 15.60 | 15.59 | 26.21 290.0 | 70.2 |
| | SURLYN 9120 | | 90 | 19 | | | | | | | (13.9) (86.1) | |
| D30 | SURLYN PC-350 | 15 | 50 | 15 | 4 | $Na^+$ | 90 | 11.0 | 15.69 | 15.67 | 50.65 | 10.1 |
| | SURLYN 8150 | | 50 | 19 | | | | | | | | |
| D31 | SURLYN PC-350 | 15 | 50 | 15 | 4 | $Na^+$, $K^+$ | 90 | 11.0 | 15.78 | 15.82 | 34.07 | 6.4 |
| | SURLYN 8150 | | 50 | 19 | | | | | | | | |
| D32 | SURLYN PC-350 | 15 | 50 | 15 | 4 | $Na^+$, DMEA | 125 | 10.5 | 15.56 | 15.61 | 49.00 | 16.4 |
| | SURLYN 8150 | | 50 | 19 | | | | | | | | |
| D33 | SURLYN PC-350 | 15 | 50 | 15 | 4 | $Na^+$, DMEA | 90 | 10.5 | 15.37 | 15.31 | 25.11 121.0 | 55.7 |
| | SURLYN 8150 | | 50 | 19 | | | | | | | (3.8) (96.2) | |
| D34 | PRIMACOR 5980i | 15 | 50 | 20.5 | 1.5 | $Na^+$, DMEA | 101 | 10.0 | 15.82 | 15.84 | 30.29 | 7.2 |
| | SURLYN 8150 | | 50 | 19 | | | | | | | | |
| D35 | SURLYN PC-350 | 15 | 50 | 15 | 0 | $Na^+$, DMEA | 132 | 10.5 | 15.47 | 15.53 | 44.30 | 9.9 |
| | SURLYN 1707 | | 50 | 15 | | | | | | | | |
| D36 | SURLYN PC-350 | 15 | 50 | 15 | 0 | $Na^+$, DMEA | 90 | 10.5 | 15.63 | 15.51 | 99.35 5,037 | 43.8 |
| | SURLYN 1707 | | 50 | 15 | | | | | | | (99.0) (1.0) | |

[1]Δ designates difference in acid content of polymers of blend;

[2]Number is parentheses is percentage of particle size population

Dispersions D37-D40:

Dispersions D37-D40 illustrate preparation of ionic elastomer blend dispersions by mixing two (meth)acrylic acid elastomer dispersions. 100 grams of two dispersions shown in Table 13 were mixed for 20 minutes on a stir plate at room temperature to form the ionic elastomer blend dispersion. Characterization results are shown in Tables 14 and 15. Table 14 shows all four dispersions were milky white which is consistent with one or both unblended dispersions. The pH of the resulting dispersions ranged from 10.5 to 11.0. Particle size analysis indicated blend dispersions with either unimodal or bimodal dispersed phase size. The milky white appearance of the blend dispersions correlates with the high haze ranging from 67.8 to 99.2%. Similar values of dried weights of unfiltered and filtered dispersions give an indication that the two elastomers are fully dispersed.

TABLE 13

| Ionic Elastomer Blend Dispersion | | | | | |
|---|---|---|---|---|---|
| DISPERSION | SURLYN 9120 Dispersion D22 (g) | SURLYN 7940 Dispersion D21 (g) | SURLYN 8150 Dispersion D16 (g) | SURLYN PC-350 Dispersion D20 (g) | SURLYN 1707 Dispersion D24 (g) |
| D37 | 100 | 100 | | | |
| D38 | 100 | | 100 | | 100 |
| D39 | | 100 | | 100 | |
| D40 | 100 | | | | 100 |

TABLE 14

| Ionic Elastomer Blend Dispersion | | | | | | | | | | |
|---|---|---|---|---|---|---|---|---|---|---|
| DISPERSION | Elastomer Blend | Elastomer (w %) | Blend (w %) | Acid (w %) | Δ[1] (w %) | Ion | Neutralization (%) | Reactor | Temp. (° C.) | Dispersion Appearance |
| D37 | SURLYN 9120 | 15 | 50 | 19 | 4 | $Na^+$, $Li^+$, $Zn^{++}$ | 133 | n/a | 25 | milky white |
| | SURLYN 7940 | | 50 | 15 | | | | | | |
| D38 | SURLYN 9120 | 15 | 50 | 19 | 0 | $Na^+$, $Zn^{++}$ | 98 | n/a | 25 | milky white |
| | SURLYN 8150 | | 50 | 19 | | | | | | |
| D39 | SURLYN PC-350 | 15 | 50 | 15 | 0 | $Na^+$, $Li^+$ | 100 | n/a | 25 | milky white |
| | SURLYN 7940 | | 50 | 15 | | | | | | |
| D40 | SURLYN 9120 | 15 | 50 | 19 | 4 | $Na^+$, $Zn^{++}$ | 120 | n/a | 25 | milky white |
| | SURLYN 1707 | | 50 | 15 | | | | | | |

[1]Δ designates difference in acid content of polymers of blend

TABLE 15

| Characterization of Ionic Blend Dispersion | | | | | | | | | | |
|---|---|---|---|---|---|---|---|---|---|---|
| DISPERSION | Elastomer Blend | Elastomer (w %) | Blend (w %) | Ion | Neutral-ization (%) | pH | un-filtered (w %) | filtered (w %) | Particle Size[1] (nm) | H (%) |
| D37 | SURLYN 9120 | 15 | 50 | $Na^+$, $Li^+$, $Zn^{++}$ | 133 | 10.5 | 15.68 | 15.69 | 206.2 | 99.2 |
| | SURLYN 7940 | | 50 | DMEA | | | | | | |
| D38 | SURLYN 9120 | 15 | 50 | $Na^+$, $Zn^{++}$ | 98 | 11.0 | 15.62 | 15.66 | 68.66 3,921 | 67.8 |
| | SURLYN 8150 | | 50 | | | | | | (97.3) (2.7) | |
| D39 | SURLYN PC-350 | 15 | 50 | $Na^+$, $Li^+$, | 100 | 10.5 | 15.55 | 15.48 | 167.0 | 99.2 |
| | SURLYN 7940 | | 50 | DMEA | | | | | | |
| D40 | SURLYN 9120 | 15 | 50 | $Na^+$, $Zn^{++}$, | 120 | 10.5 | 15.54 | 15.47 | 102.5 4,979 | 74.8 |
| | SURLYN 1707 | | 50 | DMEA | | | | | (99.6) (0.4) | |

[1]Number is parentheses is percentage of particle size population

Ionic Elastomer Coating

Coatings C1-C12:

Coatings C1-C12 illustrate formulation of transparent ionic elastomer coatings. Each dispersion was coated onto an unprimed PET substrate film in a continuous roll-to-roll process where the dispersion was metered through a slot die onto a moving web. The ionic elastomer dispersion was metered by a metering pump and a mass flow meter. Volumetric flowrate for each coating formulation is given in Table 16. The volatile components of the coating formulation (i.e. ionic elastomer dispersion) were removed in a three zone air floatation oven. The temperatures of each zone were 65.6° C., 79.4° C., and 135° C., respectively, from entrance to exit of the oven with each oven section nominally 3.05 m in length. Table 17 shows characterization results including coating thickness of 10 micrometers nominally, and visible transmission of greater than 93% and haze less than 1%. It is noted that that the optical characterization includes the PET substrate as well as the coating. The 75 m PET substrate for all Coatings C1-C78 had a transmission of 91.9%, Haze of 00.65%, and Clarity of 99.9%.

TABLE 16

| Ionic Elastomer Coating | | | | | | | | | | | | | | | |
|---|---|---|---|---|---|---|---|---|---|---|---|---|---|---|---|
| Material | Elastomer (w %) | | COATING | C1 | C2 | C3 | C4 | C5 | C6 | C7 | C8 | C9 | C10 | C11 | C12 |
| ELASTOMER DISPERSION | | | | | | | | | | | | | | | |
| SURLYN 9120 | 15 | D22 | (g) | 750 | | | | | | | | | | | |
| SURLYN 8150 | 15 | D14 | (g) | | 750 | | | | | | | | | | |
| | 15 | D15 | (g) | | | 750 | | | | | | | | | |
| | 15 | D13 | (g) | | | | 750 | | | | | | | | |
| | 15 | D16 | (g) | | | | | 750 | | | | | | | |
| SURLYN PC-350 | 15 | D18 | (g) | | | | | | 750 | | | | | | |
| | 15 | D17 | (g) | | | | | | | 750 | | | | | |
| | 15 | D19 | (g) | | | | | | | | 750 | | | | |
| | 15 | D20 | (g) | | | | | | | | | 750 | | | |
| SURLYN 1707 | 15 | D23 | (g) | | | | | | | | | | 750 | | |
| | 15 | D24 | (g) | | | | | | | | | | | 750 | |
| SURLYN 7940 | 15 | D21 | (g) | | | | | | | | | | | | 750 |
| Flowrate (cc/min) | | | | 77.8 | 69.6 | 75.8 | 80.1 | 80.7 | 79.4 | 78.9 | 71.1 | 76.2 | 70.6 | 75.5 | 70.0 |

TABLE 17

| Characterization of Ionic Elastomer Coating | | | | | | | | |
|---|---|---|---|---|---|---|---|---|
| COATING | Elastomer | Acid (w %) | Ion | Neutralization (%) | Thickness (μm) | T (%) | H (%) | C (%) |
| C1 | SURLYN 9120 | 19 | $Na^+$, $Zn^{++}$ | 113 | 10.4 | 93.0 | 0.82 | 99.9 |
| C2 | SURLYN 8150 | 19 | $Na^+$ | 118 | 9.4 | 93.2 | 0.52 | 99.9 |
| C3 | | | | 75 | 11.2 | 93.0 | 0.51 | 99.9 |
| C4 | | | | 60 | 10.6 | 93.3 | 0.57 | 99.9 |
| C5 | | | | 45 | 10.3 | 93.2 | 0.81 | 99.7 |
| C6 | SURLYN PC-350 | 15 | $Na^+$, $K^+$ | 90 | 11.3 | 93.1 | 0.53 | 99.8 |
| C7 | | | $Na^+$ | 90 | 11.0 | 93.0 | 0.60 | 99.9 |
| C8 | | | | 128 | 9.7 | 93.1 | 0.54 | 99.9 |
| C9 | | | | 85 | 10.0 | 93.1 | 0.58 | 99.8 |
| C10 | SURLYN 1707 | 15 | $Na^+$ | 128 | 9.6 | 93.0 | 0.54 | 99.9 |
| C11 | | | | 90 | 10.4 | 93.0 | 0.75 | 97.1 |
| C12 | SURLYN 7940 | 15 | $Li^+$ | 115 | 9.3 | 93.0 | 0.82 | 99.9 |

Coatings C13-C22:

Coatings C13-C22 further illustrate formulation of transparent Ionic elastomer coatings. Coatings C13-C22 were coated in the same manner as Coatings C1-C12. Table 17A shows characterization results including coating thickness of 10 μm nominally, and visible transmission of greater than 93% and haze less than 100. It is noted that that the optical characterization includes the PET substrate as well as the coating.

TABLE 17A

| Ionic Elastomer Coating | | | | | | | | | | | | | |
|---|---|---|---|---|---|---|---|---|---|---|---|---|---|
| Material | Elastomer (w %) | | COATING | C13 | C14 | C15 | C16 | C17 | C18 | C19 | C20 | C21 | C22 |
| ELASTOMER DISPERSION | | | | | | | | | | | | | |
| PRIMACOR 5980i | 15 | D11 | (g) | 750 | | | | | | | | | |
| | 15 | D11 | (g) | | 565 | | | | | | | | |
| | 15 | D1 | (g) | | | 485 | | | | | | | |
| | 15 | D4 | (g) | | | | 414 | | | | | | |
| | 15 | D5 | (g) | | | | | 389 | | | | | |
| | 15 | D7 | (g) | | | | | | 443 | | | | |
| | 15 | D9 | (g) | | | | | | | 593 | | | |
| | 15 | D8 | (g) | | | | | | | | 597 | | |
| | 15 | D9 | (g) | | | | | | | | | 616 | |
| NUCREL 960 | 15 | D12 | (g) | | | | | | | | | | 750 |
| | Flowrate (cc/min) | | | 77.1 | 69.1 | 76.2 | 77.0 | 78.5 | 66.4 | 63.5 | 70.9 | 62.7 | 76.4 |

TABLE 18

| Characterization of Ionic Elastomer Coating | | | | | | | | |
|---|---|---|---|---|---|---|---|---|
| COATING | Elastomer | Acid (w %) | Ion | Neutralization (%) | Thickness (μm) | T (%) | H (%) | C (%) |
| C13 | PRIMACOR 5980i | 20.5 | $NH_4^+$ | 75 | 9.5 | 93.1 | 0.60 | 99.9 |
| C14 | | | $Zn(NH_3)_4^{++}$ | | 9.2 | 93.4 | 0.56 | 99.9 |
| C15 | | | $Na^+$ | | 10.0 | 93.1 | 0.51 | 99.8 |
| C16 | | | $K^+$ | | 10.6 | 93.1 | 0.59 | 99.9 |
| C17 | | | $Li^+$ | | 10.9 | 93.1 | 0.66 | 99.8 |
| C18 | | | $DMEA^+$ | | 8.6 | 93.1 | 0,88 | 99.8 |
| C19 | | | $AMP^+$ | | 8.4 | 93.0 | 0.68 | 99.8 |
| C20 | | | $MEA^+$ | | 9.5 | 93.0 | 0.73 | 99.8 |
| C21 | | | $TEA^+$ | | 8.3 | 92.9 | 0.64 | 99.8 |
| C22 | SURLYN 1707 | 15 | $Na^+$ | 75 | 11.3 | 93.1 | 0.55 | 99.8 |

Ionic Elastomer Blend Coating

Coatings C23-C30:

Coatings C23-C30 illustrate formulation of transparent ionic elastomer blend coatings. Coatings C23-C30 were coated in the same manner as Coatings C1-C12. Table 21 shows characterization results including coating thickness of 10 m nominally, and visible transmission of greater than 93% and haze less than 1% except for Coating C28. It is noted that that the optical characterization includes the PET substrate as well as the coating.

TABLE 19

| Ionic Elastomer Blend Coating | | | | | | | | | | | | |
|---|---|---|---|---|---|---|---|---|---|---|---|---|
| Material | Elastomer (w %) | Blend (w %) | | COATING | C23 | C24 | C25 | C26 | C27 | C28 | C29 | C30 |
| ELASTOMER DISPERSION | | | | | | | | | | | | |
| PRIMACOR 5980i | 15 | 44 | D25 | (g) | 750 | | | | | | | |
| NUCREL 960 | | 56 | | | | | | | | | | |
| SURLYN 8150 | 15 | 50 | D31 | (g) | | 750 | | | | | | |
| SURLYN PC-350 | | 50 | | | | | | | | | | |

TABLE 19-continued

| Ionic Elastomer Blend Coating | | | | | | | | | | | | |
|---|---|---|---|---|---|---|---|---|---|---|---|---|
| Material | Elastomer (w %) | Blend (w %) | | COATING | C23 | C24 | C25 | C26 | C27 | C28 | C29 | C30 |
| SURLYN 8150 | 15 | 50 | D30 | (g) | | | 750 | | | | | |
| SURLYN PC-350 | | 50 | | | | | | | | | | |
| SURLYN 8150 | 15 | 50 | D32 | (g) | | | | 750 | | | | |
| SURLYN PC-350 | | 50 | | | | | | | | | | |
| SURLYN 8150 | 15 | 50 | D33 | (g) | | | | | 750 | | | |
| SURLYN PC-350 | | 50 | | | | | | | | | | |
| SURLYN 9120 | 15 | | D22 | (g) | | | | | | 390 | 390 | 390 |
| SURLYN 1707 | 15 | | D24 | (g) | | | | | | 390 | | |
| SURLYN PC-350 | 15 | | D20 | (g) | | | | | | | 390 | |
| SURLYN 7940 | 15 | | D27 | (g) | | | | | | | | 390 |
| | Flowrate (cc/min) | | | | 66.2 | 78.1 | 78.9 | 70.3 | 74.6 | 76.4 | 76.4 | 73.4 |

TABLE 20

| Ionic Elastomer Blend Coating | | | | | | | | | | | | |
|---|---|---|---|---|---|---|---|---|---|---|---|---|
| Material | Elastomer (w %) | Blend (w %) | | COATING | C31 | C32 | C33 | C34 | C35 | C36 | C37 | C38 |
| ELASTOMER BLEND DISPERSION | | | | | | | | | | | | |
| PRIMACOR 5980i | 15 | 50 | D42 | (g) | 750 | | | | | | | |
| SURLYN 8150 | | 50 | | | | | | | | | | |
| PRIMACOR 5980i | 15 | 10 | D36 | (g) | | 750 | | | | | | |
| SURLYN 9120 | | 90 | | | | | | | | | | |
| PRIMACOR 5980i | 15 | 44 | D35 | (g) | | | 750 | | | | | |
| SURLYN 9120 | | 56 | | | | | | | | | | |
| SURLYN PC-350 | 15 | 50 | D43 | (g) | | | | 750 | | | | |
| SURLYN 1707 | | 50 | | | | | | | | | | |
| SURLYN PC-350 | 15 | 50 | D44 | (g) | | | | | 750 | | | |
| SURLYN 1707 | | 50 | | | | | | | | | | |
| SURLYN PC-350 | 15 | 50 | D29 | (g) | | | | | | 750 | | |
| SURLYN 1707 | | 50 | | | | | | | | | | |
| SURLYN 9120 | 15 | | D22 | (g) | | | | | | | 390 | |
| SURLYN 8150 | 15 | | D19 | (g) | | | | | | | 390 | |
| SURLYN PC-350 | 15 | | D24 | (g) | | | | | | | | 390 |
| SURLYN 7940 | 15 | | D27 | (g) | | | | | | | | 390 |
| | Flowrate (cc/min) | | | | 67.9 | 77.6 | 77.4 | 71.1 | 75.3 | 77.7 | 78.9 | 73.4 |

TABLE 21

| Characterization of Ionic Elastomer Blend Coating | | | | | | | | | | |
|---|---|---|---|---|---|---|---|---|---|---|
| COATING | Elastomer Blend | Blend (w %) | Acid (w %) | $\Delta^1$ (%) | Ion | Neutralization (%) | Thickness (um) | T (%) | H (%) | C (%) |
| C23 | PRIMACOR 5980i | 44 | 20.5 | 5.5 | $Na^+$ | 75 | 9.1 | 93.3 | 0.58 | 99.9 |
| | NUCREL 960 | 56 | 15 | | | | | | | |
| C24 | SURLYN 8150 | 50 | 19 | 4 | $Na^+$, $K^+$ | 90 | 10.9 | 93.1 | 0.58 | 99.8 |
| | SURLYN PC-350 | 50 | 15 | | | | | | | |
| C25 | SURLYN 8150 | 50 | 19 | 4 | $Na^+$ | 90 | 11.2 | 93.3 | 0.54 | 99.9 |
| | SURLYN PC-350 | 50 | 15 | | | | | | | |
| C26 | SURLYN 8150 | 50 | 19 | 4 | $Na^+$ | 125 | 9.3 | 93.2 | 0.55 | 99.9 |
| | SURLYN PC-350 | 50 | 15 | | | | | | | |
| C27 | SURLYN 8150 | 50 | 19 | 4 | $Na^+$ | 90 | 9.6 | 93.3 | 0.54 | 99.8 |
| | SURLYN PC-350 | 50 | 15 | | | | | | | |
| C28 | SURLYN 1707 | 50 | 15 | 4 | $Na^+$, $Zn^{++}$ | 100 | 9.0 | 93.3 | 1.67 | 97.7 |
| | SURLYN 9120 | 50 | 19 | | | | | | | |
| C29 | SURLYN PC-350 | 50 | 15 | 4 | $Na^+$, $Zn^{++}$ | 98 | 9.8 | 93.2 | 0.62 | 99.4 |
| | SURLYN 9120 | 50 | 19 | | | | | | | |
| C30 | SURLYN 7940 | 50 | 15 | 4 | $Na^+$, $Li^+$, | 113 | 9.7 | 93.2 | 0.72 | 99.8 |
| | SURLYN 9120 | 50 | 19 | | $Zn^{++}$ | | | | | |
| C31 | PRIMACOR 5980i | 50 | 20.5 | 1.5 | $Na^+$ | 101 | 9.0 | 93.2 | 0.55 | 99.9 |
| | SURLYN 8150 | 50 | 19 | | | | | | | |
| C32 | PRIMACOR 5980i | 10 | 20.5 | 1.5 | $Na^+$, $Zn^{++}$ | 108 | 10.2 | 93.2 | 0.75 | 99.8 |
| | SURLYN 9120 | 90 | 19 | | | | | | | |

TABLE 21-continued

Characterization of Ionic Elastomer Blend Coating

| COATING | Elastomer Blend | Blend (w %) | Acid (w %) | Δ[1] (%) | Ion | Neutralization (%) | Thickness (um) | T (%) | H (%) | C (%) |
|---|---|---|---|---|---|---|---|---|---|---|
| C33 | PRIMACOR 5980i | 44 | 20.5 | 1.5 | $Na^+$, $Zn^{++}$ | 102 | 10.8 | 93.4 | 0.54 | 99.9 |
| | SURLYN 9120 | 56 | 19 | | | | | | | |
| C34 | SURLYN PC-350 | 50 | 15 | 0 | $Na^+$ | 132 | 9.4 | 93.1 | 0.54 | 99.9 |
| | SURLYN 1707 | 50 | 15 | | | | | | | |
| C35 | SURLYN PC-350 | 50 | 15 | 0 | $Na^+$ | 90 | 10.4 | 93.2 | 0.86 | 97.2 |
| | SURLYN 1707 | 50 | 15 | | | | | | | |
| C36 | NUCREL 960 | 10 | 15 | 0 | $Na^+$, $Zn^{++}$ | 111 | 10.3 | 93.0 | 0.74 | 99.9 |
| | SURLYN 9120 | 90 | 15 | | | | | | | |
| C37 | SURLYN 8150 | 50 | 19 | 0 | $Na^+$, $Zn^{++}$ | 78 | 10.0 | 93.1 | 0.71 | 99.8 |
| | SURLYN 9120 | 50 | 19 | | | | | | | |
| C38 | SURLYN PC-350 | 50 | 15 | 0 | $Na^+$, $Li^+$ | 100 | 9.3 | 93.2 | 0.83 | 98.7 |
| | SURLYN 7940 | 50 | 15 | | | | | | | |

[1]Δ designates difference in acid content of polymers of blend

Nanoparticle Dispersion

Dispersion D41:

Dispersion D41 illustrates preparation of a silica nanoparticle dispersion where the nanoparticle surface is modified with a carboxylic acid functionality. The carboxylic acid functionality is pursued to establish compatibility between the nanoparticle and (meth)acrylic acid elastomer. 400 grams of aqueous colloidal silica dispersion (NALCO 2327) was placed in a 0.95 liter clear glass jar. A Teflon coated sir bar was added to the jar. The jar was placed on a stir plate and agitation initiated. 317.5 grams of deionized water was added to the jar. 132.5 grams of ACID SILANE SURFACE AGENT SOLUTION was added to the jar. The contents of the jar were mixed for 20 minutes. The stir bar was removed from the jar and the contents placed in a preheated 80° C. oven for 24 hours. After 24 hours, the jar was removed from the oven and the nanoparticle dispersion allowed to cool to room temperature under ambient conditions. The pH of the nanoparticle dispersion was 5.5 and the nanoparticle concentration was calculated to be 19.3 w %.

Dispersion D42:

Dispersion D42 illustrates preparation of a silica nanoparticle dispersion where the nanoparticle surface is modified with a carboxylic acid functionality. The carboxylic acid functionality is pursued to establish compatibility between the nanoparticle and (meth)acrylic acid elastomer. 49.33 kilograms of aqueous colloidal silica dispersion (NALCO 2327) was placed in a 2.67 liter stainless steel reactor. Agitation was initiated. 15.58 kg of ACID SILANE SURFACE AGENT SOLUTION was added to the reactor. The contents of the reactor were heated to 80° C. Upon reaching 80° C., the reactor was sealed, and the contents of the reactor maintained at 80° C. with continuous agitation for 24 hours. After 24 hours, the contents of the reactor were cooled and filtered with a 50 m filter and transferred to two 18.93 liter plastic lined metal drums. The pH of the nanoparticle dispersion was 5.5 and the nanoparticle concentration was calculated to be 31.3 w %.

TABLE 22

Nanoparticle Dispersion

| DISPERSION | NALCO 2327 (g) | DI $H_2O$ (g) | ACID SILANE Solution (g) | $SiO_2$ (w %) | pH |
|---|---|---|---|---|---|
| D41 | 400 | 318 | 133 | 19.3 | 5.5 |
| D42 | 49328 | — | 15581 | 31.3 | 5.5 |

Dispersion D43:

To increase the pH of the silica nanoparticle dispersion of D42, ammonium hydroxide solution was added. 3000 grams of nanoparticle dispersion D42 was placed in a 3.78 liter clear glass jar. A Teflon coated stir bar was added to the jar. The jar was placed on a stir plate and agitation initiated. 71.2 grams of aqueous ammonium hydroxide solution, nominally 28 w %, was added to the nanoparticle dispersion. The contents of the jar were mixed for 20 minutes and then the stir bar was removed from the jar. The pH of the nanoparticle dispersion was 10.0 and the nanoparticle concentration was calculated to be 30.6 w %.

TABLE 23

Nanoparticle Dispersion

| DISPERSION | $SiO_2$ Dispersion D42 (g) | $NH_4OH$ Solution (g) | $SiO_2$ (w %) | pH |
|---|---|---|---|---|
| D43 | 3000 | 71.2 | 30.6 | 10.0 |

Ionic Elastomer Nanocomposite Coating

Coatings C39-C48:

Coatings C39-C48 illustrate preparation of transparent ionic elastomer nanocomposite coatings. The mass of each dispersion used in each coating formulation is detailed in Table 24. For each coating, a mass of ionic elastomer dispersion was placed in a clear glass jar. A Teflon coated stir bar was added to the jar. The jar was placed on a stir plate and agitation initiated. The desired mass of nanoparticle dispersion was added to the ionic elastomer dispersion. The ionomer/nanoparticle dispersion was mixed for 20 minutes. Each ionomer/nanoparticle dispersion was coated onto an unprimed PET substrate film in the same manner as Coatings C1-C12. Table 25 shows characterization results including coating thickness of 10 m nominally, and visible transmission of greater than 93% and haze less than 1% with exception of Coating C44 which contains 60 w % nanoparticles. Coatings C39-C43 illustrate minimal effect of nanoparticle concentration on coating optics from 10 to 50 w % nanoparticles. Coatings C39-C48 further illustrate good optical performance for a variety of ionic elastomer with high nanoparticle loadings, 40 w %. It is noted that that the optical characterization includes the PET substrate as well as the coating.

TABLE 24

| Ionic Elastomer Nanocomposite Coating | | | | | | | | | | | | | | |
|---|---|---|---|---|---|---|---|---|---|---|---|---|---|---|
| material | $SiO_2$ (w %) | Elastomer (w %) | | COATING | C39 | C40 | C41 | C42 | C43 | C44 | C45 | C46 | C47 | C48 |
| ELASTOMER DISPERSION | | | | | | | | | | | | | | |
| SURLYN 9120 | | 15 | D22 | (g) | 711 | 668 | 620 | 565 | 503 | 432 | 1319 | | | |
| SURLYN 8150 | | 15 | D18 | (g) | | | | | | | | 1319 | | |
| SURLYN 1707 | | 15 | D31 | (g) | | | | | | | | | 933 | |
| | | 15 | D24 | (g) | | | | | | | | | 386 | |
| SURLYN 7940 | | 15 | D21 | (g) | | | | | | | | | | 1319 |
| NANOPARTICLE DISPERSION | | | | | | | | | | | | | | |
| $SiO_2$ | 30.6 | | D51 | (g) | 39 | 82 | 130 | 185 | 247 | 318 | 431 | 431 | 431 | 431 |
| | Flowrate (cc/min) | | | | 77.0 | 76.0 | 75.0 | 73.8 | 72.4 | 70.9 | 73.8 | 81.1 | 80.5 | 80.7 |

TABLE 25

| Characterization of Ionic Elastomer Nanocomposite Coating | | | | | | | | | |
|---|---|---|---|---|---|---|---|---|---|
| COATING | Elastomer | $SiO_2$ (w %) | Acid (w %) | Ion | Neutralization (%) | Thickness (μm) | T (%) | H (%) | C (%) |
| C39 | SURLYN 9120 | 10 | 19 | $Na^+$, $Zn^{++}$ | 113 | 10.7 | 92.8 | 0.77 | 99.9 |
| C40 | | 20 | | $Na^+$, $Zn^{++}$ | 113 | 10.0 | 92.7 | 0.63 | 99.9 |
| C41 | | 30 | | $Na^+$, $Zn^{++}$ | 113 | 10.1 | 92.9 | 0.60 | 99.9 |
| C42 | | 40 | | $Na^+$, $Zn^{++}$ | 113 | 10.0 | 92.8 | 0.54 | 99.9 |
| C43 | | 50 | | $Na^+$, $Zn^{++}$ | 113 | 10.1 | 92.7 | 0.65 | 99.9 |
| C44 | | 60 | | $Na^+$, $Zn^{++}$ | 113 | 10.3 | 93.0 | 1.09 | 99.8 |
| C45 | | 40 | | $Na^+$, $Zn^{++}$ | 113 | 9.0 | 93.0 | 0.66 | 99.9 |
| C46 | SURLYN 8150 | 40 | 19 | $Na^+$ | 45 | 10.0 | 93.0 | 0.59 | 99.9 |
| C47 | SURLYN 1707 | 40 | 15 | $Na^+$ | 60 | 10.0 | 92.9 | 0.70 | 98.9 |
| C48 | SURLYN 7940 | 40 | 15 | $Li^+$ | 40 | 10.6 | 92.9 | 0.66 | 99.8 |

Coatings C49-C59:

Coatings C49-C59 further illustrate preparation of transparent ionic elastomer nanocomposite coatings. The ionomer/nanoparticle coating formulations were prepared in the same manner as described in Coatings C39-C48. Each ionomer/nanoparticle dispersion was coated onto an unprimed PET substrate film in the same manner as Coatings C1-C12. Formulation and coating details are given in Table 26. Table 27 shows characterization results including coating thickness of 10 m nominally, and visible transmission of greater than 92-93% and haze less than 1%. Coatings C49-C59 illustrate minimal effect of nanoparticle concentration on coating optics from 10 to 60 w % nanoparticles. Coatings C39-C48 further illustrate good optical performance for a variety of ionic elastomers with high nanoparticle loadings, 40 w %. Coating C58 was intentionally coated with a volatile neutralizing agent that would be removed during the coating process by vaporization. It is noted that that the optical characterization includes the PET substrate as well as the coating.

TABLE 26

| Ionic Elastomer Nanocomposite Coating | | | | | | | | | | | | | | | |
|---|---|---|---|---|---|---|---|---|---|---|---|---|---|---|---|
| Material | $SiO_2$ (w %) | Elastomer (w %) | | COATING | C49 | C50 | C51 | C52 | C53 | C54 | C55 | C56 | C57 | C58 | C59 |
| ELASTOMER DISPERSION | | | | | | | | | | | | | | | |
| PRIMACOR 5980i | | 15 | D3 | (g) | 711 | 668 | 620 | 565 | 503 | 432 | | | 1319 | | |
| | | 15 | D11 | (g) | | | | | | | | | | 1319 | |
| | | 15 | D2 | (g) | | | | | | | 494 | 494 | | | |
| NUCREL 960 | | 15 | D12 | (g) | | | | | | | | | | | 1319 |
| NANOPARTICLE DISPERSION | | | | | | | | | | | | | | | |
| $SiO_2$ | 30.6 | | D51 | (g) | 39 | 82 | 130 | 185 | 247 | 318 | | | 431 | 369 | 431 |
| | 19.3 | | D49 | (g) | | | | | | | 256 | 256 | | | |
| | Flowrate (cc/min) | | | | 76.2 | 75.4 | 74.4 | 73.2 | 72.0 | 70.6 | 75.2 | 75.2 | 73.2 | 80.5 | 79.6 |

TABLE 27

| Characterization of Ionic Elastomer Nanocomposite Coating | | | | | | | | | |
|---|---|---|---|---|---|---|---|---|---|
| COATING | Elastomer | $SiO_2$ (w %) | Acid (w %) | Ion | Neutralization (%) | Thickness (μm) | T (%) | H (%) | C (%) |
| C49 | PRIMACOR 5980i | 10 | 20.5 | $Na^+$ | 75 | 10.1 | 92.8 | 0.60 | 99.8 |
| C50 | | 20 | | $Na^+$ | 75 | 10.3 | 92.9 | 0.61 | 99.9 |
| C51 | | 30 | | $Na^+$ | 75 | 10.1 | 92.7 | 0.63 | 99.8 |
| C52 | | 40 | | $Na^+$ | 75 | 10.4 | 92.9 | 0.64 | 99.8 |
| C53 | | 50 | | $Na^+$ | 75 | 10.3 | 92.7 | 0.77 | 99.7 |
| C54 | | 60 | | $Na^+$ | 75 | 10.2 | 92.9 | 0.90 | 99.9 |
| C55 | | 40 | | $Na^+$ | 75 | 5.7 | 91.3 | 0.52 | 99.9 |
| C56 | | 40 | | $Na^+$ | 75 | 9.6 | 93.2 | 0.57 | 99.7 |
| C57 | | 40 | | $Na^+$ | 75 | 10.4 | 92.9 | 0.54 | 99.9 |
| C58 | | 40 | | | 0 | 10.0 | 93.2 | 1.92 | 99.9 |
| C59 | NUCREL 960 | 40 | 15 | $Na^+$ | 75 | 10.2 | 92.7 | 0.54 | 99.9 |

Ionic Elastomer Nanocomposite Blend Coating

Coatings C60-C68:

Coatings C60-C68 illustrate preparation of transparent ionic elastomer nanocomposite blend coatings. Formulation and coating details are given in Table 29. Preparation of the ionomer blend dispersions for Coatings C63-C66 is described in Dispersions D52-D54 and Table 29. For each coating, a mass of ionic elastomer blend dispersion was placed in a clear glass jar. A Teflon coated stir bar was added to the jar. The jar was placed on a stir plate and agitation initiated. The desired mass of nanoparticle dispersion was added to the ionic elastomer blend dispersion. The ionomer/nanoparticle dispersion was mixed for 20 minutes. Each ionomer blend/nanoparticle dispersion was coated onto an unprimed PET substrate film in the same manner as Coatings C1-C12. Table 32 shows characterization results including coating thickness of 10 m nominally, and visible transmission of greater than 92-93% and haze less than 1% for nanocomposite coatings with up to 40 w % nanoparticles. It is noted that that the optical characterization includes the PET substrate as well as the coating.

Dispersion D52-D54:

Dispersions D52-D54 illustrate preparation of ionic elastomer blend dispersions for use in ionic elastomer nanocomposite Coatings C60-C62. 300 grams of Dispersion D22 was placed in a 0.95 liter clear glass jar. A Teflon coated stir bar was added to the jar. The jar was placed on a stir plate and agitation initiated. 300 grams of ionic elastomer Dispersion D24 was added to Dispersion D22 to form the ionic elastomer blend DISPERSION D52. Dispersion D52 was mixed for 20 minutes after combining Dispersions D22 and D24. Likewise, the ionic elastomer blend D53 was formed by mixing Dispersions D22 and D27, and Dispersion D54 was formed by combining Dispersions D24 and D19 as detailed in Table 30.

TABLE 29

| Ionic Elastomer Nanocomposite Blend Coating | | | | | | | | | | | | | | |
|---|---|---|---|---|---|---|---|---|---|---|---|---|---|---|
| Material | $SiO_2$ (w %) | Elastomer (w %) | Blend (w %) | | COATING | C60 | C61 | C62 | C63 | C64 | C65 | C66 | C67 | C68 |
| ELASTOMER BLEND DISPERSION | | | | | | | | | | | | | | |
| SURLYN 9120 | | 15 | 50 | D52 | (g) | 565 | | | | | | | | |
| SURLYN 1707 | | | 50 | | | | | | | | | | | |
| SURLYN 9120 | | 15 | 50 | D53 | (g) | | 565 | | | | | | | |
| SURLYN 7940 | | | 50 | | | | | | | | | | | |
| SURLYN 9120 | | 15 | 50 | D54 | (g) | | | 565 | | | | | | |
| SURLYN 8150 | | | 50 | | | | | | | | | | | |
| SURLYN 9120 | | 15 | | D22 | (g) | | | | 1131 | | 660 | | | |
| SURLYN 8150 | | 15 | | D16 | (g) | | | | 1131 | 660 | | | | |
| PRIMACOR 5980i | | 15 | | D3 | (g) | | | | | 660 | | | | |
| NUCREL 960 | | 15 | | D12 | (g) | | | | | | 660 | | | |
| SURLYN PC-350 | | 15 | 50 | D35 | (g) | | | | | | | 1319 | | |
| SURLYN 1707 | | | 50 | | | | | | | | | | | |
| SURLYN PC-350 | | 15 | 50 | D32 | (g) | | | | | | | | 1319 | |
| SURLYN 8150 | | | 50 | | | | | | | | | | | |
| NUCREL 960 | | 15 | 10 | D29 | (g) | | | | | | | | | 1319 |
| SURLYN 9120 | | | 90 | | | | | | | | | | | |
| NANOPARTICLE DISPERSION | | | | | | | | | | | | | | |
| $SiO_2$ | 30.6 | | | D51 | (g) | 185 | 185 | 185 | 739 | 431 | 431 | 431 | 431 | 431 |
| Flowrate (cc/min) | | | | | | 74.3 | 74.3 | 74.8 | 74.8 | 81.6 | 80.6 | 82.7 | 83.3 | 81.0 |

TABLE 30

| Ionic Elastomer Blend Dispersion | | | | |
|---|---|---|---|---|
| DISPERSION | SURLYN 9120 Dispersion D22 (g) | SURLYN 1707 Dispersion D24 (g) | SURLYN 7940 Dispersion D27 (g) | SURLYN 8150 Dispersion D19 (g) |
| D52 | 300 | 300 | | |
| D53 | 300 | | 300 | |
| D54 | 300 | | | 300 |

Coatings C69-C78:

Coatings C69-C78 further illustrate preparation of ionic elastomer nanocomposite blend coatings. Formulation and coating details are given in Table 31. Each ionomer blend/nanocomposite dispersion was prepared in the same manner as Coatings C60-C68. Each ionomer blend/nanoparticle dispersion was coated onto an unprimed PET substrate film in the same manner as Coatings C1-C12. Table 32 shows characterization results for Coatings C69-C78 including coating thickness of 10 m nominally, and visible transmission of greater than 92-93% and haze less than 1% for nanocomposite coatings with up to 40 w % nanoparticles. It is noted that that the optical characterization includes the PET substrate as well as the coating.

TABLE 31

| Ionic Elastomer Nanocomposite Blend Coating | | | | | | | | | | | | | | | |
|---|---|---|---|---|---|---|---|---|---|---|---|---|---|---|---|
| material | $SiO_2$ (w %) | Elastomer (w %) | Blend (w %) | | COATING | C69 | C70 | C71 | C72 | C73 | C74 | C75 | C76 | C77 | C78 |
| ELASTOMER BLEND DISPERSION | | | | | | | | | | | | | | | |
| PRIMACOR 5980i | | 15 | 44 | D34 | (g) | 690 | 628 | 563 | 494 | 494 | 494 | 565 | 2261 | | |
| SURLYN 9120 | | | 56 | D35 | (g) | | | | | | | | | 1319 | |
| PRIMACOR 5980i | | 15 | 10 | D36 | (g) | | | | | | | | | | 1319 |
| SURLYN 9120 | | | 90 | | | | | | | | | | | | |
| NANOPARTICLE DISPERSION | | | | | | | | | | | | | | | |
| $SiO_2$ | 19.3 | | | D41 | (g) | 60 | 122 | 187 | 256 | 256 | 256 | | | | |
| | 30.6 | | | D43 | (g) | | | | | | | 185 | 739 | 431 | 431 |
| Flowrate (cc/min) | | | | | | 79.1 | 78.0 | 76.9 | 75.5 | 75.5 | 75.5 | 72.6 | 72.6 | 79.9 | 80.5 |

TABLE 32

| Characterization of Ionic Elastomer Nanocomposite Blend Coating | | | | | | | | | | | |
|---|---|---|---|---|---|---|---|---|---|---|---|
| COATING | Blend | $SiO_2$ (w %) | Blend (w %) | Acid (w %) | $\Delta^1$ (w %) | Ion | Neutralization (%) | Thickness (um) | T (%) | H (%) | C (%) |
| C60 | SURLYN 9120 | 40 | 30 | 19 | 4 | $Na^+$, $Zn^{++}$ | 87 | 10.3 | 92.9 | 0.74 | 98.8 |
| | SURLYN 1707 | | 30 | 15 | | | | | | | |
| C61 | SURLYN 9120 | 40 | 30 | 19 | 4 | $Na^+$, $Li^+$, $Zn^{++}$ | 77 | 10.2 | 92.9 | 0.94 | 99.8 |
| | SURLYN 7940 | | 30 | 15 | | | | | | | |
| C62 | SURLYN 9120 | 40 | 30 | 19 | 0 | $Na^+$, $Zn^{++}$ | 79 | 9.8 | 92.8 | 0.61 | 99.9 |
| | SURLYN 8150 | | 30 | 19 | | | | | | | |
| C63 | SURLYN 9120 | 40 | 30 | 19 | 4 | $Na^+$, $Zn^{++}$ | 79 | 9.0 | 93.2 | 0.64 | 99.9 |
| | SURLYN 8150 | | 30 | 15 | | | | | | | |
| C64 | SURLYN 8150 | 40 | 30 | 19 | 1.5 | $Na^+$ | 60 | 10.3 | 92.8 | 0.57 | 99.9 |
| | PRIMACOR 5980i | | 30 | 20.5 | | | | | | | |
| C65 | SURLYN 9120 | 40 | 30 | 19 | 4 | $Na^+$, $Zn^{++}$ | 94 | 10.0 | 93.1 | 0.54 | 99.9 |
| | NUCREL 960 | | 30 | 15 | | | | | | | |
| C66 | SURLYN PC-350 | 40 | 30 | 15 | 0 | $Na^+$ | 57 | 10.6 | 93.2 | 0.52 | 99.9 |
| | SURLYN 1707 | | 30 | 15 | | | | | | | |
| C67 | SURLYN PC-350 | 40 | 30 | 15 | 4 | $Na^+$ | 50 | 10.6 | 93.0 | 0.54 | 99.9 |
| | SURLYN 8150 | | 30 | 19 | | | | | | | |
| C68 | NUCREL 960 | 40 | 6 | 15 | 4 | $Na^+$, $Zn^{++}$ | 109 | 9.8 | 92.7 | 0.62 | 99.9 |
| | SURLYN 9120 | | 54 | 19 | | | | | | | |
| C69 | PRIMACOR 5980i | 10 | 40 | 20.5 | 1.5 | $Na^+$, $Zn^{++}$ | 87 | 10.3 | 93.4 | 0.58 | 99.9 |
| | SURLYN 9120 | | 50 | 19 | | | | | | | |
| C70 | PRIMACOR 5980i | 20 | 35 | 20.5 | 1.5 | $Na^+$, $Zn^{++}$ | 77 | 10.9 | 93.3 | 0.53 | 99.9 |
| | SURLYN 9120 | | 45 | 19 | | | | | | | |
| C71 | PRIMACOR 5980i | 30 | 31 | 20.5 | 1.5 | $Na^+$, $Zn^{++}$ | 67 | 9.1 | 93.1 | 0.61 | 99.9 |
| | SURLYN 9120 | | 39 | 19 | | | | | | | |
| C72 | PRIMACOR 5980i | 40 | 26 | 20.5 | 1.5 | $Na^+$, $Zn^{++}$ | 58 | 11.0 | 93.1 | 0.63 | 99.3 |
| | SURLYN 9120 | | 34 | 19 | | | | | | | |
| C73 | PRIMACOR 5980i | 40 | 26 | 20.5 | 1.5 | $Na^+$, $Zn^{++}$ | 58 | 10.8 | 93.1 | 0.69 | 98.7 |
| | SURLYN 9120 | | 34 | 19 | | | | | | | |
| C74 | PRIMACOR 5980i | 40 | 26 | 20.5 | 1.5 | $Na^+$, $Zn^{++}$ | 58 | 10.1 | 93.1 | 0.68 | 99.1 |
| | SURLYN 9120 | | 34 | 19 | | | | | | | |
| C75 | PRIMACOR 5980i | 40 | 26 | 20.5 | 1.5 | $Na^+$, $Zn^{++}$ | 58 | 10.3 | 92.8 | 0.61 | 99.9 |
| | SURLYN 9120 | | 34 | 19 | | | | | | | |
| C76 | PRIMACOR 5980i | 40 | 26 | 20.5 | 1.5 | $Na^+$, $Zn^{++}$ | 58 | 8.7 | 93.0 | 0.60 | 99.9 |
| | SURLYN 9120 | | 34 | 19 | | | | | | | |

TABLE 32-continued

| Characterization of Ionic Elastomer Nanocomposite Blend Coating | | | | | | | | | | | | |
|---|---|---|---|---|---|---|---|---|---|---|---|---|
| COATING | Blend | $SiO_2$ (w %) | Blend (w %) | Acid (w %) | Δ[1] (w %) | Ion | Neutral-ization (%) | Thick-ness (um) | T (%) | H (%) | C (%) |
| C77 | PRIMACOR 5980i | 40 | 26 | 20.5 | 1.5 | $Na^+$, $Zn^{++}$ | 58 | 10.4 | 92.9 | 0.53 | 99.9 |
| | SURLYN 9120 | | 34 | 19 | | | | | | | |
| C78 | PRIMACOR 5980i | 40 | 6 | 20.5 | 1.5 | $Na^+$, $Zn^{++}$ | 111 | 10.1 | 92.7 | 0.58 | 99.9 |
| | SURLYN 9120 | | 54 | 19 | | | | | | | |

[1]Δ designates difference in acid content of polymers of blend

Ionic Elastomer Nanocomposite Film

Films F1-F10:

Films F1-F10 illustrate ionic elastomer nanocomposite films prepared by a melt-process. The composition details of Films F1-F11 are given in Table 33. Nanocomposite coatings described previously were separated from the PET substrate and used as the ionic elastomer nanocomposite in melt processing. For Films F1-F3 and F7-F10, pure (meth) acrylic acid elastomer was melt processed with the nanocomposite coating to decrease the nanoparticle concentration. For Films F74-F76, only the nanocomposite coating was melt-processed. For Film F8, neutralizing agent was added during the melt process. The ionic elastomer nanocomposites were melt-processed using a Plasti-corder (C.W. Brabender Instruments, Inc., South Hackensack, NJ). All nanocomposite formulations were compounded for 15 minutes at 150° C. and 75 rpm. After compounding, the nanocomposite was pressed into a film using an Auto Series Hot Press (Carver Inc., Wabash, IN). For the hot press process, a portion of the compounded material was placed between polyimide sheets which, in turn, was placed between polished aluminum plates. The nanocomposite was pressed into film using a two-stage hot press process. First, the nanocomposite was pressed with 900 kg force at the selected press temperature for 5 minutes. Most nanocomposites were pressed at 125° C. Higher press temperatures were required for nanocomposites with higher nanoparticle loadings. Hot press temperatures are detailed in the accompanying tables. In a second stage, the press automatically increased pressure to 10,900 kg force at the same temperature for 0.1 minute after which the press automatically opened. The pressed film was removed from between the aluminum sheets and cooled to room temperature before removal of the polyimide sheets. Characterization of the pressed films included thickness and optical characterization are detailed in Table 34. With the exception of the nanocomposite film with 60 w % nanoparticles, the nanocomposite films exhibit visible transmission greater than 90%. With exception of Films F6 and F9, the remaining eight nanocomposite films exhibit haze of 2.7-4.0%. Thermal gravimetric analysis (TGA) was performed on Films F1-F4 to determine nanoparticle concentration. As shown in Table 34, the solids content of Films F1-F4 correlate well with expected nanoparticle concentration. It is expected that the presence of the metal ions in the nanocomposite will increase the percent solids determined by the TGA.

TABLE 33

| Ionic Elastomer Nanocomposite Film | | | | | | | | | | | | | | |
|---|---|---|---|---|---|---|---|---|---|---|---|---|---|---|
| Material | $SiO_2$ (w %) | Elastomer (w %) | | FILM | F1 | F2 | F3 | F4 | F5 | F6 | F7 | F8 | F9 | F10 |
| ELASTOMER NANOCOMPOSITE | | | | | | | | | | | | | | |
| SURLYN 9120 | 40 | 60 | C45 | (g) | 12.5 | 25.0 | 37.5 | 50.0 | | | | | | |
| | 50 | 50 | C43 | (g) | | | | | 50.0 | | | | | |
| | 60 | 40 | C44 | (g) | | | | | | 50.0 | | | | |
| SURLYN 8150 | 40 | 60 | C46 | (g) | | | | | | | 12.5 | 25.0 | | |
| SURLYN 7940 | 40 | 60 | C48 | (g) | | | | | | | | | 12.5 | |
| SURLYN 1707 | 40 | 60 | C47 | (g) | | | | | | | | | | 25.0 |
| ELASTOMER | | | | | | | | | | | | | | |
| SURLYN 9120 | | 100 | | (g) | 37.5 | 25.0 | 12.5 | | | | | | | |
| SURLYN 8150 | | 100 | | (g) | | | | | | | 37.5 | 25.0 | | |
| SURLYN 7940 | | 100 | | (g) | | | | | | | | | 37.5 | |
| SURLYN 1707 | | 100 | | (g) | | | | | | | | | | 25.0 |
| NEUTRALIZING AGENT | | | | | | | | | | | | | | |
| ZnAc | | | | (g) | | | | | | | | 3.0 | | |
| Press Temperature (° C.) | | | | | 125 | 125 | 175 | 175 | 225 | 225 | 125 | 125 | 125 | 125 |

TABLE 34

| Characterization of Ionic Elastomer Nanocomposite Film | | | | | | | | | | |
|---|---|---|---|---|---|---|---|---|---|---|
| FILM | Ionomer | $SiO_2$ (w %) | Acid (w %) | Ion | Neutralization (%) | $SiO_2$ (w %) TGA[1] | Thickness (mil) | T (%) | H (%) | C (%) |
| F1 | SURLYN 9120 | 10 | 19 | $Na^+$, $Zn^{++}$ | 38 | 13.43 | 6.3 | 93.4 | 3.2 | 91.5 |
| F2 | | 20 | | | 38 | 22.86 | 8.7 | 92.8 | 3.8 | 93.7 |
| F3 | | 30 | | | 38 | 32.55 | 5.8 | 91.6 | 3.8 | 95.7 |
| F4 | | 40 | | | 38 | 42.94 | 9.4 | 90.0 | 3.9 | 96.4 |
| F5 | | 50 | | | 38 | NM[2] | 10.3 | 90.9 | 4.0 | 95.8 |
| F6 | | 60 | | | 38 | NM[2] | 10.9 | 85.7 | 5.4 | 92.9 |
| F7 | SURLYN 8150 | 10 | 15 | $Na^+$ | 45 | NM[2] | 6.3 | 93.9 | 3.1 | 94.2 |
| F8 | | 20 | | $Na^+$, $Zn^{++}$ | 120 | NM[2] | 5.6 | 93.8 | 2.7 | 94.4 |
| F9 | SURLYN 7940 | 10 | 15 | $Li^+$ | 60 | NM[2] | 6.5 | 93.1 | 5.0 | 94.2 |
| F10 | SURLYN 1707 | 20 | 15 | $Na^+$ | 60 | NM[2] | 7.8 | 93.2 | 3.5 | 94.7 |

[1]TGA designates $SiO_2$ content of nanocomposite measured by TGA;
[2]NM designates "not measured"

Film F12-F21:

Films F12-F21 further illustrate ionic elastomer nanocomposite films produced by a melt-process. Films F12-F21 were processed in the same manner as Films F1-F11. That is, the ionic elastomer nanocomposite of the coated films were removed from the PET substrate and melt-processed. The composition details for Films F12-F21 are given in Table 35 along with the temperature at which the nanocomposite was pressed into film. Films F12-F21 further illustrate melt-processed ionic elastomer nanocomposite films with nanoparticle loadings from 10 to 40 w %. Film F17 illustrates an ionic elastomer nanocomposite film where the neutralization agent was intentionally removed during the process. Film F16 illustrates an illustrates an ionic elastomer nanocomposite film with neutralization during melt processing. Film 17 illustrates use of a different neutralizing agent in the dispersion and melt processed film.

TABLE 35

| Ionic Elastomer Nanocomposite Film | | | | | | | | | | | | | | |
|---|---|---|---|---|---|---|---|---|---|---|---|---|---|---|
| Material | $SiO_2$ (w %) | Elastomer (w %) | | FILM | F12 | F13 | F14 | F15 | F16 | F17 | F18 | F19 | F20 | F21 |
| ELASTOMER NANOCOMPOSITE | | | | | | | | | | | | | | |
| PRIMACOR 5980i | 40 | 60 | C57 | (g) | 12.5 | 25.0 | 37.5 | 50.0 | | | | | | |
| | | | C58 | (g) | | | | | 25.0 | 25.0 | | | | |
| NUCREL 960 | 40 | 60 | C59 | (g) | | | | | | | 12.5 | 25.0 | 37.5 | 50.0 |
| ELASTOMER | | | | | | | | | | | | | | |
| PRIMACOR 5980i | | 100 | | (g) | 37.5 | 25.0 | 12.5 | | 25.0 | 25.0 | | | | |
| NUCREL 960 | | 100 | | (g) | | | | | | | 37.5 | 25.0 | 12.5 | |
| NEUTRALIZING AGENT | | | | | | | | | | | | | | |
| KOH | | | | (g) | | | | | 4.8 | | | | | |
| Press Temperature (° C.) | | | | | 125 | 125 | 125 | 175 | 125 | 125 | 125 | 125 | 125 | 125 |

TABLE 36

| Characterization of Ionic Elastomer Nanocomposite Film | | | | | | | | | |
|---|---|---|---|---|---|---|---|---|---|
| FILM | Copolymer | $SiO_2$ (w %) | Acid (w %) | Ion | Neutralization (%) | Thickness (mil) | T (%) | H (%) | C (%) |
| F12 | PRIMACOR 5980i | 10 | 20.5 | $Na^+$ | 75 | 4.2 | 93.7 | 3.2 | 93.2 |
| F13 | | 20 | | | 75 | 4.9 | 93.6 | 3.2 | 95.1 |
| F14 | | 30 | | | 75 | 7.7 | 93.0 | 3.4 | 93.8 |
| F15 | | 40 | | | 75 | 4.2 | 92.4 | 3.8 | 93.9 |
| F16 | | 20 | | $K^+$ | 75 | 7.7 | 93.0 | 3.5 | 95.4 |
| F17 | | 20 | | — | 0 | 4.2 | 93.0 | 6.9 | 94.9 |
| F18 | NUCREL 960 | 10 | 15 | $Na^+$ | 75 | 10.3 | 93.3 | 2.9 | 96.3 |
| F19 | | 20 | | | 75 | 4.8 | 93.9 | 2.7 | 96.8 |
| F20 | | 30 | | | 75 | 7.8 | 93.8 | 3.1 | 95.0 |
| F21 | | 40 | | | 75 | 16.3 | 91.0 | 3.8 | 96.5 |

Ionic Elastomer Nanocomposite Blend Film

Films F22-F43:

Films F22-F43 illustrate preparation of ionic elastomer nanocomposite blend films by a melt-process. Films F22-F43 were processed in the same manner as Films F1-F11. That is, an ionic elastomer nanocomposite coating was separated from the PET substrate film and melt-processed. For Films F22-F43, the nanocomposite coating was melt-processed with a second (meth)acrylic acid elastomer different from that of the coating to form an ionic elastomer nanocomposite blend film. Composition details and hot press temperatures are given in Tables 37 and 38. Characterization results in Table 39 show visible transmission greater than 91% and a range of haze values from 2.9 to 26.6%. The high haze values 10.1-26.6% correlate with higher acid difference between the (meth)acrylic elastomers of the blend. Optical characterization showed that transparent ionic elastomer nanocomposites may be achieved with higher acid difference by melt processing than is accessible by dispersing and coating alone. TGA results on Films F38-F41 correlate well with calculated nanoparticle loading. The TGA results provide technical support not only for the melt-processed nanocomposite blend films but also for the coated nanocomposite films from which they were derived.

TABLE 37

| Ionic Elastomer Nanocomposite Blend Film | | | | | | | | | | | | | | | |
|---|---|---|---|---|---|---|---|---|---|---|---|---|---|---|---|
| material | $SiO_2$ (w %) | Elastomer (w %) | | FILM | F22 | F23 | F24 | F25 | F26 | F27 | F28 | F29 | F30 | F31 | F32 |
| ELASTOMER NANOCOMPOSITE | | | | | | | | | | | | | | | |
| PRIMACOR 5980i | 40 | 60 | C55 | (g) | 10.0 | | 25.0 | | | | | | 25.0 | | |
| | | | C56 | (g) | 15.0 | 10.0 | | | | | | | | | 25.0 |
| | | | C57 | (g) | | 15.0 | | | | 25.0 | | | | 25.0 | |
| SURLYN 9120 | 40 | 60 | C45 | (g) | | | | 25.0 | 25.0 | | 25.0 | | | | |
| SURLYN 8150 | 40 | 60 | C46 | (g) | | | | | | | | 25.0 | | | |
| ELASTOMER | | | | | | | | | | | | | | | |
| SURLYN 1410 | | 100 | | (g) | 20.0 | | | 20.0 | | | | | | | |
| SURLYN 1601 | | 100 | | (g) | | 20.0 | | | 20.0 | | | | | | |
| NUCREL 699 | | 100 | | (g) | | | 20.0 | | | | 20.0 | | | | |
| SURLYN 1650 | | 100 | | (g) | | | | | | 20.0 | | 20.0 | | | |
| NUCREL 960 | | 100 | | (g) | | | | | | | | | 20.0 | | |
| SURLYN 1706 | | 100 | | (g) | | | | | | | | | | 20.0 | |
| SURLYN 1707 | | 100 | | (g) | | | | | | | | | | | 20.0 |
| PRIMACOR 5980i | | 100 | | (g) | 5.0 | 5.0 | 5.0 | | | 5.0 | | | 5.0 | 5.0 | 5.0 |
| SURLYN 9120 | | 100 | | (g) | | | | 5.0 | 5.0 | | 5.0 | | | | |
| SURLYN 8150 | | 100 | | (g) | | | | | | | | 5.0 | | | |
| Press Temperature (° C.) | | | | | 125 | 125 | 125 | 125 | 125 | 125 | 125 | 125 | 125 | 125 | 125 |

TABLE 38

| Ionic Elastomer Nanocomposite Blend Film | | | | | | | | | | | | | | | | |
|---|---|---|---|---|---|---|---|---|---|---|---|---|---|---|---|---|
| material | $SiO_2$ (w %) | Elastomer (w %) | Blend (w %) | | FILM | F33 | F34 | F35 | F36 | F37 | F38 | F39 | F40 | F41 | F42 | F43 |
| ELASTOMER NANOCOMPOSITE | | | | | | | | | | | | | | | | |
| PRIMACOR 5980i | 40 | 60 | | C55 | (g) | | | | | | | | | | | |
| | | | | C56 | (g) | 25.0 | 25.0 | | | 25.0 | | | | | | |
| | | | | C73 | (g) | | | | | | 37.5 | 25.0 | 16.8 | | | |
| | | | | C74 | (g) | | | | | | | | 20.7 | 50.0 | | |
| SURLYN 9120 | 40 | 60 | | C45 | (g) | | | | 25.0 | | | | | | | |
| SURLYN PC-350 | 40 | 60 | 30 | C67 | (g) | | | 25.0 | | | | | | | | |
| SURLYN 8150 | | | 30 | | | | | | | | | | | | | |
| SURLYN 9120 | 40 | 60 | 30 | C63 | (g) | | | | | | | | | | 25.0 | |
| SURLYN 8150 | | | 30 | | | | | | | | | | | | | |
| SURLYN 1707 | 40 | 50 | | C47 | (g) | | | | | | | | | | | 25.0 |
| ELASTOMER | | | | | | | | | | | | | | | | |
| NUCREL 960 | | 100 | | | (g) | | | | 20.0 | | | | | | | |
| SURLYN 1706 | | 100 | | | (g) | | | | | | | | | | | 25.0 |
| SURLYN 7940 | | 100 | | | (g) | 20.0 | | | | | | | | | | |
| SURLYN PC-350 | | 100 | | | (g) | | 20.0 | 12.5 | | | | | | | | |
| PRIMACOR 5980i | | 100 | | | (g) | 5.0 | 5.0 | | | 5.0 | 12.5 | | | | | |
| SURLYN 9120 | | 100 | | | (g) | | | | 5.0 | | | 25.0 | 12.5 | | 12.5 | |
| SURLYN 8150 | | 100 | | | (g) | | | 12.5 | | 20.0 | | | | | 12.5 | |
| Press Temperature (° C.) | | | | | | 125 | 125 | 125 | 125 | 125 | 125 | 125 | 175 | 175 | 125 | 125 |

TABLE 39

| Characterization of Ionic Elastomer Nanocomposite Blend Film | | | | | | | | | | | | |
|---|---|---|---|---|---|---|---|---|---|---|---|---|
| FILM | Elastomer Blend | $SiO_2$ (w %) | Blend (w %) | Acid (w %) | Δ[1] (w %) | Ion | Neutralization (%) | $SiO_2$ (w %) TGA[2] | Thickness (mil) | T (%) | H (%) | C (%) |
| F22 | PRIMACOR 5980i | 20 | 40 | 20.5 | 10.8 | $Na^+$ | 28 | NM[3] | 5.7 | 91.1 | 10.1 | 96.7 |
| | PRIMACOR 1410 | | 40 | 9.7 | | | | | | | | |
| F23 | PRIMACOR 5980i | 20 | 40 | 20.5 | 10.5 | $Na^+$ | 55 | NM[3] | 6.9 | 91.6 | 10.4 | 95.0 |
| | SURLYN 1601 | | 40 | 10 | | | | | | | | |
| F24 | PRIMACOR 5980i | 20 | 40 | 20.5 | 9.5 | $Na^+$ | 28 | NM[3] | 3.5 | 93.6 | 26.6 | 94.5 |
| | NUCREL 699 | | 40 | 11 | | | | | | | | |
| F25 | SURLYN 9120 | 20 | 40 | 20.5 | 9.3 | $Na^+$, $Zn^{++}$ | 28 | NM[3] | 11.3 | 91.2 | 3.6 | 96.1 |
| | SURLYN 1410 | | 40 | 9.7 | | | | | | | | |
| F26 | SURLYN 9120 | 20 | 40 | 19 | 9 | $Na^+$, $Zn^{++}$ | 74 | NM[3] | 11.8 | 91.5 | 3.6 | 96.0 |
| | SURLYN 1601 | | 40 | 10 | | | | | | | | |
| F27 | PRIMACOR 5980i | 20 | 40 | 20.5 | 8.5 | $Na^+$, $Zn^{++}$ | 47 | NM[3] | 5.4 | 92.4 | 4.8 | 95.7 |
| | SURLYN 1650 | | 40 | 12 | | | | | | | | |
| F28 | SURLYN 9120 | 20 | 40 | 19 | 8 | $Na^+$, $Zn^{++}$ | 47 | NM[3] | 7.7 | 93.0 | 3.4 | 94.3 |
| | NUCREL 699 | | 40 | 11 | | | | | | | | |
| F29 | SURLYN 8150 | 20 | 40 | 19 | 7 | $Na^+$, $Zn^{++}$ | 42 | NM[3] | 6.3 | 92.6 | 4.0 | 93.4 |
| | SURLYN 1650 | | 40 | 12 | | | | | | | | |
| F30 | PRIMACOR 5980i | 20 | 40 | 20.5 | 5.5 | $Na^+$ | 28 | NM[3] | 4.1 | 93.1 | 5.3 | 95.0 |
| | NUCREL 960 | | 40 | 15 | | | | | | | | |
| F31 | PRIMACOR 5980i | 20 | 40 | 20.5 | 5.5 | $Na^+$, $Zn^{++}$ | 58 | NM[3] | 8.2 | 93.1 | 2.9 | 95.8 |
| | SURLYN 1706 | | 40 | 15 | | | | | | | | |
| F32 | PRIMACOR 5980i | 20 | 40 | 20.5 | 5.5 | $Na^+$ | 58 | NM[3] | 9.3 | 91.8 | 3.4 | 95.5 |
| | SURLYN 1707 | | 40 | 15 | | | | | | | | |
| F33 | PRIMACOR 5980i | 20 | 40 | 20.5 | 5.5 | Na+, Li+ | 48 | NM[3] | 8.0 | 92.9 | 3.1 | 96.7 |
| | SURLYN 7940 | | 40 | 15 | | | | | | | | |
| F34 | PRIMACOR 5980i | 20 | 40 | 20.5 | 5.5 | $Na^+$ | 56 | NM[3] | 6.1 | 93.4 | 3.3 | 94.6 |
| | SURLYN PC-350 | | 40 | 15 | | | | | | | | |
| F35 | SURLYN 8150 | 20 | 40 | 19 | 4 | $Na^+$ | 78 | NM[3] | 6.2 | 93.1 | 6.1 | 95.6 |
| | SURLYN PC-350 | | 40 | 15 | | | | | | | | |
| F36 | SURLYN 9120 | 20 | 40 | 19 | 4 | $Na^+$, $Zn^{++}$ | 47 | NM[3] | 8.5 | 93.3 | 3.1 | 94.6 |
| | NUCREL 960 | | 40 | 15 | | | | | | | | |
| F37 | PRIMACOR 5980i | 20 | 40 | 20.5 | 1.5 | $Na^+$ | 51 | NM[3] | 7.6 | 93.9 | 2.9 | 94.2 |
| | SURLYN 8150 | | 40 | 19 | | | | | | | | |
| F38 | PRIMACOR 5980i | 10 | 40 | 20.5 | 1.5 | $Na^+$, $Zn^{++}$ | 44 | 12.60 | 6.9 | 92.8 | 3.6 | 93.6 |
| | SURLYN 9120 | | 50 | 19 | | | | | | | | |
| F39 | PRIMACOR 5980i | 20 | 35 | 20.5 | 1.5 | $Na^+$, $Zn^{++}$ | 52 | 22.55 | 6.5 | 93.8 | 3.2 | 92.0 |
| | SURLYN 9120 | | 45 | 19 | | | | | | | | |
| F40 | PRIMACOR 5980i | 30 | 31 | 20.5 | 1.5 | $Na^+$, $Zn^{++}$ | 62 | 32.33 | 7.8 | 91.9 | 3.7 | 95.5 |
| | SURLYN 9120 | | 39 | 19 | | | | | | | | |
| F41 | PRIMACOR 5980i | 40 | 26 | 20.5 | 1.5 | $Na^+$, $Zn^{++}$ | 75 | 42.53 | 6.8 | 93.3 | 4.0 | 95.4 |
| | SURLYN 9120 | | 34 | 19 | | | | | | | | |
| F42 | SURLYN 9120 | 20 | 40 | 19 | 0 | $Na^+$, $Zn^{++}$ | 43 | NM[3] | 7.6 | 93.2 | 3.0 | 95.2 |
| | SURLYN 8150 | | 40 | 19 | | | | | | | | |
| F43 | SURLYN 1707 | 20 | 40 | 15 | 0 | $Na^+$, $Zn^{++}$ | 62 | NM[3] | 9.6 | 92.5 | 3.8 | 94.5 |
| | SURLYN 1706 | | 40 | 15 | | | | | | | | |

[1]Δdesignates difference in acid content of polymers of blend;
[2]TGA designates $SiO_2$ content of nanocomposite measured by TGA;
[3]NM designates "not measured"

Film F44-F48:

Films F44-F48 further illustrate ionic elastomer nanocomposite blend films by a melt-process. Films F44-F48 were processed in the same manner as Films F23-F43. That is, an ionic elastomer nanocomposite coating was separated from the PET substrate film and melt-processed with a second (meth)acrylic acid elastomer to form an ionic elastomer nanocomposite blend. For Films F744-F748, the second ionic elastomer is a neutralized terpolymer which was found not to be dispersible in water but may be readily melt-processed. Composition details are given in Table 40 along with hot press temperatures. Characterization results in Table 41 show that the ionic elastomer nanocomposite blend films exhibit visible transmission greater than 93% and haze less than 4%.

TABLE 40

| Ionic Elastomer Nanocomposite Blend Film | | | | | | | | | |
|---|---|---|---|---|---|---|---|---|---|
| material | $SiO_2$ (w %) | Elastomer (w %) | | FILM | F44 | F45 | F46 | F47 | F48 |
| ELASTOMER NANOCOMPOSITE | | | | | | | | | |
| PRIMACOR 5980i | 40 | 60 | C55 | (g) | 25.0 | 25.0 | | | |
| SURLYN 8150 | 40 | 60 | C46 | (g) | | | 25.0 | 25.0 | |
| NUCREL 960 | 40 | 60 | C59 | (g) | | | | | 25.0 |

TABLE 40-continued

| Ionic Elastomer Nanocomposite Blend Film | | | | | | | | |
|---|---|---|---|---|---|---|---|---|
| material | $SiO_2$ (w %) | Elastomer (w %) | FILM | F44 | F45 | F46 | F47 | F48 |
| ELASTOMER | | | | | | | | |
| HPF 1000 | | 100 | (g) | 20.0 | | 20.0 | | 20.0 |
| SURLYN 9020 | | 100 | (g) | | 20.0 | | 20.0 | |
| PRIMACOR 5980i | | 100 | (g) | 5.0 | 5.0 | | | |
| SURLYN 8150 | | 100 | (g) | | | 5.0 | 5.0 | |
| NUCREL 960 | | 100 | (g) | | | | | 5.0 |
| Press Temperature (° C.) | | | | 125 | 125 | 150 | 150 | 125 |

TABLE 41

| Characterization of Ionic Elastomer Nanocomposite Blend Film | | | | | | | | | | | |
|---|---|---|---|---|---|---|---|---|---|---|---|
| FILM | Elastomer | $SiO_2$ (w %) | Blend (w %) | Acid (w %) | $\Delta^1$ (w %) | Ion | Neutral-ization (%) | Thick-ness (mil) | T (%) | H (%) | C (%) |
| F44 | PRIMACOR 5980i | 20 | 40 | 20.5 | 12 | $Na^+$, $Mg^{++}$ | 78 | 3.9 | 93.1 | 3.9 | 93.3 |
| | HPF 1000 | | 40 | 8.5 | | | | | | | |
| F45 | PRIMACOR 5980i | 20 | 40 | 20.5 | 10.5 | $Na^+$, $Zn^{++}$ | 43 | 5.3 | 93.3 | 3.6 | 96.9 |
| | SURLYN 9020 | | 40 | 10 | | | | | | | |
| F46 | SURLYN 8150 | 20 | 40 | 19 | 10.5 | $Na^+$, $Mg^{++}$ | 73 | 3.1 | 93.4 | 3.5 | 93.5 |
| | HPF 1000 | | 40 | 8.5 | | | | | | | |
| F47 | SURLYN 8150 | 20 | 40 | 19 | 9 | $Na^+$, $Zn^{++}$ | 38 | 3.5 | 93.7 | 3.6 | 94.7 |
| | SURLYN 9020 | | 40 | 10 | | | | | | | |
| F48 | NUCREL 960 | 20 | 40 | 15 | 6.5 | $Na^+$, $Mg^{++}$ | 78 | 5.7 | 93.3 | 3.7 | 95.2 |
| | HPF 1000 | | 40 | 8.5 | | | | | | | |

[1]Δdesignates difference in acid content of polymers of blend

Test Methods pH:

The pH of the ionomer aqueous dispersions was measured with pH test strips (Ricca Chemical Co., Arlington, TX).

Weight Percent Solids:

The weight percent solids was measured on both filtered and unfiltered dispersions. For an unfiltered dispersion, a nominal 3 gram sample of dispersion was placed in a small Pyrex Petri Dish (Corning Inc. Coming, NY). The sample was placed in a 120° C. preheated oven for 12 hours after which time the sample was removed from the oven and allowed to cool. The mass of dried dispersion and dish was measured. The weight percent solids was calculated from the mass of the dish, mass of dish+dispersion, and mass of dish+dried dispersion according to the equation below. For a filtered dispersion, a nominal 3 gram sample of dispersion was filtered into a small Pyrex Petri Dish via a one micron glass fiber filter (Pall Corp., Port Washington, NY) connected to a disposal syringe (Becton, Dickinson and co., Franklin Lakes, NJ). The sample was placed in a 120° C. preheated oven for 12 hours after which time the sample was removed from the oven and allowed to cool. The mass of dried dispersion and dish was measured. The weight percent solids was calculated from the mass of the dish, mass of dish+dispersion, and mass of dish+dried dispersion according to the equation below. All weight percent solids measurements were performed in duplicate.

$$\text{weight percent solids}=((\text{mass}_{dish+dried\ dispersion}-\text{mass}_{dish})/(\text{mass}_{dish+undried\ dispersion}-\text{mass}_{dish}))\times 100$$

Particle Size:

Particle size was measured with a Zetasizer NS (Malvern Instruments Ltd., Worcestershire, UK). The dispersions were diluted 1:10, 1:100, 1:1,000 and sometimes 1:10,000 using a NaOH solution that matched the pH of the dispersion. Three measurements were performed at each dilution and averaged. The particle size was selected once there was no significant change with dilution.

Transmission, Haze, Clarity (THC):

Luminous transmission, haze, and clarity were measured according to ASTM D1003-00 using a model 4725 Gardner Haze-Guard Plus (BYK-Gardner, Columbia, MD).

Haze:

Haze of the liquid dispersions was measured with an Ultrascan PRO Spectrophotometer (HunterLab, Reston, VA).

Film Thickness:

Film thickness was measured using a digital indicator model H0530E (Mitutoyo America Corporation, Aurora, IL).

Coating Thickness:

Coating thickness was measured using white interferometry and FTM-ProVis Lite software.

Thermal Gravimetric Analysis (TGA):

Nanoparticle concentration in the melt-processed nanocomposite films was measured by TGA. A Model TGA Q500 (TA Instruments, New Castle, DE) was used. Approximately, a 5 milligram sample of nanocomposite film or nanocomposite blend film was placed on a platinum pan that was previously tared by the instrument. The nanoparticle concentration was determined as the final weight in the sample after heating from 35° C. to 700° C. at 20° C./min.

Nuclear Magnetic Resonance (NMR):

Synthesized carboxylic acid silane chemistry was confirmed using a Bruker Avance 600 MHz NMR spectrometer equipped with a cryogenically cooled probe head (Bruker Corporation, Billerica, MA). The carboxylic acid silane/DMF solution was mixed with deuterated DMF. One dimensional (1D) $^1H$ and $^{13}C$ NMR data were collected at 25° C. One of the residual proto-solvent resonances was used as a secondary chemical shift reference in the proton dimension (δ=8.03 ppm).

Examples

Preparatory Example 1: NaOH Solution 3000 grams of deionized water was placed in a 3.78 liter clear glass jar. A Teflon coated stir bar was added to the jar. The jar was placed on a stir plate (RCT Basic Model Magnetic Stirrer/Hot Plate Combination, IKA Works, Inc., Wilmington, NC) and agitation initiated. 1156 grams of sodium hydroxide (NaOH) pellets was added to the jar. The NaOH pellets dissolved in the water forming a clear solution.

Preparatory Example 2: Acid Silane Solution 225 grams of succinic anhydride (SA) was placed in a 4 liter brown glass jug. A Teflon coated stir bar was added to the jug. The jug was placed on a stir plate. 2500 grams of N, N-dimethylformamide (DMF) was added to the jar and agitation initiated. Once the succinic anhydride dissolved, 400 grams of 3-aminopropyltrimethoxysilane (AMINO-TMOS) was added to the jug. The contents of the jug continued to be agitated for 24 hours at room temperature to complete the reaction to form the acid silane in DMF.

Preparatory Example 3: Ionic Elastomer Dispersion 27.76 kilograms of deionized water was placed in a 37.85 liter stainless steel reactor. 5.11 kilograms of SURLYN 9120 in pellet form was added to the reactor to achieve a 15 weight percent elastomer dispersion. SURLYN 9120 is a pre-neutralized (meth)acrylic acid elastomer with 38% neutralization with $Zn^{++}$. Agitation was initiated at 30 rpm. 1.20 kilograms of NaOH SOLUTION (PREPARATORY EXAMPLE 1) was added to the reactor. Agitation was increased to 120 rpm. The reactor was sealed to allow processing at higher temperatures and prevent loss of materials. Heat was initiated to a set point temperature of 150° C. Once the batch temperature reached 150° C. the contents of the reactor was maintained under continuous agitation at 150° C. for 2.5 hours. The resulting dispersion was filtered through a 200 m sock filter (Pall Corp., Port Washington, NY) and transferred to two 18.93 liter plastic lined metal pails. The process conditions along characterization results are detailed in Table 2. The pH of the resulting dispersion was 11.5. Particle size analysis indicated a bimodal dispersion of sizes of 23.25 nm and 140.5 nm. The dispersion was milky white with a measured haze of 81.6%. Similar values of dried weights of unfiltered and filtered dispersions give an indication that the elastomer is fully dispersed.

TABLE 2

Characterization of IONIC ELASTOMER DISPERSION (PREPARATORY EXAMPLE 3)

| PE | Elastomer | Elastomer (w %) | Acid (w %) | Ion | Neutralization (%) | pH | unfiltered (w %) | filtered (w %) | Particle Size[1] (nm) | | H (%) |
|---|---|---|---|---|---|---|---|---|---|---|---|
| 3 | SURLYN 9120 | 15 | 19 | $Na^+$, $Zn^{++}$ | 113 | 11.5 | 15.59 | 15.65 | 23.25 (13.8) | 140.5 (86.2) | 81.6 |

[1]Number in parentheses is percentage of particle size population

Preparatory Example 4: Silica Nanoparticle Dispersion 49.33 kilograms of aqueous colloidal silica dispersion (NALCO 2327) was placed in a 75.71 liter stainless steel reactor. Agitation was initiated. 15.58 kilograms of ACID SILANE SOLUTION (PREPARATORY EXAMPLE 2) was added to the reactor. The contents of the reactor were heated to 80° C. Upon reaching 80° C., the reactor was sealed, and the contents of the reactor maintained at 80° C. with continuous agitation for 24 hours. After 24 hours, the contents of the reactor were cooled and filtered with a 50 m filter and transferred to two 18.93 liter plastic lined metal drums. The pH of the nanoparticle dispersion was 5.5 and the nanoparticle concentration was calculated to be 31.3 wt %.

Preparatory Example 5: Silica Nanoparticle Dispersion 3000 grams of SILICA NANODISPERSION (PREPARATORY EXAMPLE 4) was placed in a 3.78 liter clear glass jar. A Teflon coated stir bar was added to the jar. The jar was placed on a stir plate and agitation initiated. 71.2 grams of aqueous ammonium hydroxide solution, nominally 28 wt %, was added to the nanoparticle dispersion. The contents of the jar were mixed for 20 minutes and then the stir bar was removed from the jar. The pH of the nanoparticle dispersion was 10.0 and the nanoparticle concentration was calculated to be 30.6 wt %.

Preparatory Example 6: Ionic Elastomer Nanocomposite Coating 1319 grams of IONIC ELASTOMER DISPERSION (PREPARATORY EXAMPLE 3) was placed in a clear glass jar. A Teflon coated stir bar was added to the jar. The jar was placed on a stir plate and agitation initiated. 431 grams of SILICA NANOPARTICLE DISPERSION (PREPARATORY EXAMPLE 5) was added to the jar. The ionomer/nanoparticle dispersion was mixed for 20 minutes. The ionomer/nanoparticle dispersion was coated onto an unprimed PET substrate film in a continuous roll-to-roll process where the dispersion was metered through a slot die onto a moving web. The ionomer/nanoparticle dispersion was metered by a metering pump and a mass flow meter. Volumetric flowrate for each ionomer/nanoparticle dispersion was 73.8 cc/min. The volatile components of the coating formulation (i.e. ionomer/nanoparticle dispersion) were removed in a three zone air floatation oven. The temperatures of each zone were 65.6° C., 79.4° C., and 135° C., respectively, from entrance to exit of the oven with each oven section nominally 3.05 m in length. Table 3 shows characterization results for the IONIC ELASTOMER NANOCOMPOSITE COATING (PREPARATORY EXAMPLE 6) including coating thickness of 9.0 micrometers, visible transmission of 93% and haze less than 1%. It is noted that that the optical characterization includes the PET substrate as well as the coating. The PET substrate was nominally 75 micrometers thick with 91.5% transmission, 0.65% haze, and 99.9% clarity.

TABLE 3

| Characterization of Ionic Elastomer Nanocomposite Coating | | | | | | | | | |
|---|---|---|---|---|---|---|---|---|---|
| PE | Elastomer | $SiO_2$ (w %) | Acid (w %) | Ion | Neutralization (%) | Thickness (um) | T (%) | H (%) | C (%) |
| 6 | SURLYN 9120 | 40 | 19 | $Na^+$, $Zn^{++}$ | 113 | 9.0 | 93.0 | 0.66 | 99.9 |

Working Example 1: Ionic Elastomer Nanocomposite Film 37.5 grams of SURLYN 9120 was placed in a preheated Plasti-corder (C.W. Brabender Instruments, Inc., South Hackensack, NJ) and melted at 150° C. and 75 rpm. 12.5 grams of IONIC ELASTOMER NANOCOMPOSITE COATING (PREPARATORY EXAMPLE 6) was removed from the PET substrate and added to the Plasti-corder and the contents compounded for 15 minutes at 150° C. and 75 rpm. After compounding, the nanocomposite was pressed into a film using an Auto Series Hot Press (Carver Inc., Wabash, IN). For the hot press process, a portion of the compounded material was placed between polyimide sheets which, in turn, was placed between polished aluminum plates. The nanocomposite was pressed into film using a two-stage hot press process. First, the nanocomposite was pressed with 900 kg force at 125° C. and held for 5 minutes. In a second stage, the press automatically increased pressure to 10900 kg force at the same temperature which was held for 0.1 minute after which the press automatically opened. The pressed film was removed from between the aluminum sheets and cooled to room temperature before removal of the polyimide sheets. A portion of the pressed film was pressed again using the same two-stage hot press process. Table 4 shows the characterization results for the IONIC ELASTOMER NANOCOMPOSITE FILM (PREPARATORY EXAMPLE 7). The film exhibited a transmission of 93.4% and a haze of 3.2%. TGA was used to measure nanoparticle concentration in the nanocomposite film. The TGA result of 13.43 w % correlates well with the calculated 10 w % nanoparticle concentration. It is noted that the metal ions will increase the TGA result.

TABLE 4

| Characterization of Ionic Elastomer Nanocomposite Film | | | | | | | | | | |
|---|---|---|---|---|---|---|---|---|---|---|
| PE | Ionomer | $SiO_2$ (w %) | Acid (w %) | Ion | Neutralization (%) | $SiO_2$ (w %) TGA[1] | Thickness (mil) | T (%) | H (%) | C (%) |
| 7 | SURLYN 9120 | 10 | 19 | $Na^+$, $Zn^{++}$ | 38 | 13.43 | 6.3 | 93.4 | 3.2 | 91.5 |

[1]TGA designates $SiO_2$ content of nanocomposite measured by TGA

Prophetic Example 1: Ionic Elastomer Nanocomposite

PROPHETIC EXAMPLE 1 illustrates continuous compounding of an ionic elastomer nanocomposite. An 18 mm twin screw extruder (Leistritz Extrsiontechnik GMBH, Nuremberg, Germany) is heated with the temperature profile: zone 1=260° C., zones 2, 3=265° C., zone 4-6=268° C., and zones 7, 8=271° C. IONIC ELASTOMERNANOCOMPOSITE COATING (PREPARATORY EXAMPLE 6) is removed from the PET substrate and fed to the extruder at a rate of 2.0 kg/hr. SURLYN 9120 is fed to the same extruder at a rate of 6 kg/hr. A strand die is attached to the end of the extruder. The extrudate in the form of a strand is passed through a water bath at the end of which was a pelletizer which cuts the ionic elastomer nanocomposite strand into pellets.

Prophetic Example 2: Multilayer Cast Web

PROPHETIC EXAMPLE 2 illustrates a coextruded 5-layer A:B:A:B:A cast web where the center and two outer A layers are a thermoplastic such as PET and the two inner B layers are an ionic elastomer nanocomposite. PET is extruded in a 25 mm twin screw extruder (Leistritz Extrsiontechnik GMBH, Nuremberg, Germany) and temperature profile: zone 1=232° C., zone 2=246° C.; zone 3=254° C., zone 4=260° C.; zone 5=265° C. The ionic elastomer nanocomposite in the form of pellets (PROPHETIC EXAMPLE 1) are extruded in an 18 mm twin screw extruder (Leistritz Extrsiontechnik GMBH, Nuremberg, Germany) with temperature profile: zone 1=260° C., zones 2, 3=265° C., zone 4–6=268° C., and zones 7, 8=271° C. The two extruders feed to a feedblock designed to generate the 5-layer A:B:A:B:A layer structure and die are at 271° C. The multilayer extrudate is cast onto a chill roll with the aid of electrostatic pinning and is wound on a winder. The feedrates and cast wheel speeds are adjusted to achieve a cast web thickness is nominally 500-2000 micrometers.

Prophetic Example 3: Oriented Multilayer Film

A 100 mm by 100 mm piece of 5-layer cast web of PROPHETIC EXAMPLE 2 is oriented using a KARO IV laboratory batch orientation (Bruckner Maschinenbau GMbH & Co KG, Siegsdorf, Germany). The cast web is loaded into the orienter. The cast web is preheated for 1 minute at the draw temperature between 95-120° C. The cast web is stretched at a rate of 20%/second. The draw ratio is between 2.5×2.5 and 4.0×4.0 (MD×TD). The oriented film is between 31 and 162 micrometers thick. Based on the description above it is well known that continuous roll to roll film of a desired thickness can be made in process where thick multilayer film is cast and then oriented in a tenter to produce rolls of film for example with a thickness of 150 μm.

Prophetic Example 4: Oriented Multilar Film with Coating

A roll of ORIENTED MULTILAYER FILM (PROPHETIC EXAMPLE 3) having a thickness of 150 um is coated with the IONIC ELASTOMER DISPERSION (PREPARATORY 3). 1319 grams of IONIC ELASTOMER DISPERSION (PREPARATORY EXAMPLE 3) is placed in a clear glass jar. A Teflon coated stir bar is added to the jar. The jar is placed on a stir plate and agitation initiated. 431 grams of SILICA NANOPARTICLE DISPERSION (PREPARATORY EXAMPLE 5) is added to the jar. The ionomer/nanoparticle dispersion is mixed for 20 minutes. The ionomer/nanoparticle dispersion is coated onto an unprimed PET substrate film in a continuous roll-to-roll process where the dispersion is metered through a slot die onto a moving web. The ionomer/nanoparticle dispersion is metered by a metering pump and a mass flow meter. Volumetric flowrate for each ionomer/nanoparticle dispersion is 73.8 cc/min. The volatile components of the coating formulation (ionomer/nanoparticle dispersion) are removed in a three zone air floatation oven. The temperatures of each zone are 65.6° C., 79.4° C., and 135° C., respectively, from entrance to exit of the oven with each oven section nominally 3.05 m in length.

Prophetic Example 5: Multilayer Film Article

The coated article of PROPHETIC EXAMPLE 4 was laminated to glass. A first 15 cm×15 cm soda lime glass layer approximately 3 mm in thickness is provided. A few drops of deionized water were placed onto the glass and the SURLYN 9120 nanocomposite ionomer layer was wet down to the glass. A squeegee was used to squeeze out and remove excess DI water between the glass and the ionomer film. The film was allowed to sit at room temperature for approximately 1 hour and was then placed into a 70° C. oven to bond the ionomer film to the glass. The ionomer glass composite construction is removed from the oven and allowed to cool providing a multilayer film article bonded to glass.

Prophetic Example 6: Multilayer Film Article

A multilayer optical film is produced by coextruding 224 alternating layers of PET and coPMMA with a cast web thickness of approximately 580 um. Ionic elastomer nanocomposite (PROPHETIC EXAMPLE 1) is coextruded as outer layers on each side of the PET:coPMMA optical stack. Each of the outer ionic elastomer nanocomposite layers is approximately 1500 μm thick. The cast web is preheated and stretched in the machine direction (MD) to a ratio of 3.7:1 at approximately 90° C., and then stretched in the traverse direction (TD) to a ratio of 3.9:1 at approximately 100° C. to produce a film that is approximately 248 μm thick where each ionic elastomer nanocomposite layer is 104 μm and optical stack is 40 um.

A two glass layer construction with the glass layers bonded together with the multilayer optical film is made by the following process. A first 15 cm×15 cm soda lime glass layer approximately 3 mm in thickness is provided. A few drops of deionized water are placed onto the glass and one side of the multilayer optical film with ionic elastomer skins is wet down to the glass. A squeegee is used to squeeze out and remove excess DI water between the glass and the nanocomposite layer. The film is allowed to sit at room temperature for approximately 1 hour. The exposed ionic elastomer skin layer is bonded to a second 15 cm×15 cm soda lime glass layer. Deionized water is placed in the center of the second glass layer and the ionic elastomer skin attached to the first glass layer is carefully placed in contact with the water such that the water allowed a near air free contact between the ionic elastomer skin layer and the second glass layer. The entire glass construction is allowed to sit for one hour. The glass assembly is then placed in an autoclave at 70° C. and pressurized to bond the ionic elastomer nanocomposite layer to the glass layers and remove air. After sufficient time, the glass assembly is removed from the autoclave. resulting in a two layer glass composite assembly.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations, or variations, or combinations of the specific embodiments discussed herein. Therefore, it is intended that this disclosure be limited only by the claims and the equivalents thereof.

What is claimed is:

1. A multilayer film comprising pluralities of first layers and polymeric second layers arranged along a thickness direction of the multilayer film, the first and second layers having different compositions, each first layer comprising:

at least one polymer, the at least one polymer comprising a first polymer comprising (meth)acrylic acid monomer units; and metal oxide nanoparticles dispersed in the at least one polymer, the metal oxide nanoparticles being surface modified with a surface modifying agent comprising a carboxylic acid silane of Formula 1:

Formula 1

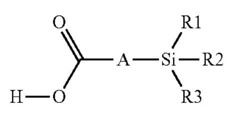

wherein:

R1 is a $C_1$ to $C_{10}$ alkoxy group;

R2 and R3 are independently selected from the group consisting of $C_1$ to $C_{10}$ alkyl and $C_1$ to $C_{10}$ alkoxy groups; and A is a linker group selected from the group consisting of $C_1$ to $C_{10}$ alkylene or arylene groups, $C_1$ to $C_{10}$ aralkylene groups, $C_2$ to $C_{16}$ heteroalkylene or heteroarylene groups, and $C_2$ to $C_{16}$ amide containing groups.

2. The multilayer film of claim 1, wherein each of the second layers comprises a polyester comprising terephthalate monomer units and ethylene glycol monomer units.

3. The multilayer film of claim 1, wherein each of the first and second layers has an average thickness less than 500 nm, and wherein the first and second layers number at least 50 in total.

4. The multilayer film of claim 3 being a visible light mirror film, an infrared mirror film, a reflective polarizer, or a notch optical filter.

5. The multilayer film of claim 1 having a luminous transmittance for substantially normally incident unpolarized light of at least 80 percent.

6. The multilayer film of claim 1, wherein the first and second layers alternate with one another along the thickness direction.

7. The multilayer film of claim 1 further comprising a plurality of polymeric third layers arranged along the thickness direction with the first and second layers.

8. The multilayer film of claim 1 further comprising a plurality of alternating polymeric first and second interference layers disposed on the pluralities of first and second layers.

9. The multilayer film of claim 8 having an average optical transmittance for substantially normally incident unpolarized light of at least 70 percent over a wavelength range extending at least from 450 nm to 650 nm and an average optical transmittance for substantially normally incident unpolarized light of no more than 50 percent over a wavelength range extending at least from 900 nm to 1000 nm.

10. The multilayer film of claim 1, wherein the at least one polymer further comprises a second polymer different from the first polymer blended with the first polymer, the second polymer comprising (meth)acrylic acid monomer units.

11. An optical stack comprising a glass layer and the multilayer film of claim 1 disposed on the glass layer.

12. A multilayer film comprising a first layer and a plurality of alternating polymeric first and second interference layers disposed on the first layer, the first layer comprising:

at least one polymer, the at least one polymer comprising a first polymer comprising (meth)acrylic acid monomer units; and metal oxide nanoparticles dispersed in the at least one polymer, the metal oxide nanoparticles being surface modified with a surface modifying agent comprising a carboxylic acid silane of Formula 1:

Formula 1

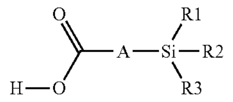

wherein:

R1 is a $C_1$ to $C_{10}$ alkoxy group;

R2 and R3 are independently selected from the group consisting of $C_1$ to $C_{10}$ alkyl and $C_1$ to $C_{10}$ alkoxy groups; and A is a linker group selected from the group consisting of $C_1$ to $C_{10}$ alkylene or arylene groups, $C_1$ to $C_{10}$ aralkylene groups, $C_2$ to $C_{16}$ heteroalkylene or heteroarylene groups, and $C_2$ to $C_{16}$ amide containing groups.

13. The multilayer film of claim 12 further comprising a second layer, at least a sub-plurality of the plurality of alternating polymeric first and second interference layers disposed between the first and second layers, the second layer comprising at least one polymer, the at least one polymer of the second layer comprising a first polymer comprising (meth)acrylic acid monomer units.

14. The multilayer film of claim 13, wherein the second layer further comprises:

metal oxide nanoparticles dispersed in the at least one polymer of the second layer, the metal oxide nanoparticles of the second layer being surface modified with a carboxylic acid silane surface modifying agent.

15. The multilayer film of claim 12, wherein each first interference layer of the plurality of alternating polymeric first and second interference layers comprises at least one polymer, the at least one polymer of the first interference layer comprising a polymer comprising (meth)acrylic acid monomer units, and wherein each second interference layer of the plurality of alternating polymeric first and second interference layers comprises an oriented polyester.

* * * * *